United States Patent
Janechek et al.

(10) Patent No.: US 11,112,057 B2
(45) Date of Patent: Sep. 7, 2021

(54) DISPLAY MOUNTING SYSTEM AND METHOD

(71) Applicant: Ergotron, Inc., St. Paul, MN (US)

(72) Inventors: Matthew J. Janechek, Maplewood, MN (US); John Kenneth Blomstrom, Mendota Heights, MN (US); Michael Anthony Apolloni, Edina, MN (US); John Waite, Bloomington, MN (US); Shaun Christopher Lindblad, Inver Grove Heights, MN (US); Peter Lee LaFleur Walls, Saint Paul, MN (US); David James Prince, Saint Paul, MN (US); Saeb Salih Asamarai, Columbia Heights, MN (US)

(73) Assignee: Ergotron, Inc., St. Paul, MN (US)

( * ) Notice: Subject to any disclaimer, the term of this patent is extended or adjusted under 35 U.S.C. 154(b) by 0 days.

(21) Appl. No.: 17/261,829

(22) PCT Filed: Jun. 10, 2020

(86) PCT No.: PCT/US2020/037006
§ 371 (c)(1),
(2) Date: Jan. 20, 2021

(87) PCT Pub. No.: WO2021/006987
PCT Pub. Date: Jan. 14, 2021

(65) Prior Publication Data
US 2021/0247020 A1    Aug. 12, 2021

Related U.S. Application Data

(60) Provisional application No. 62/872,574, filed on Jul. 10, 2019.

(51) Int. Cl.
*F16M 11/28*    (2006.01)
*F16M 11/20*    (2006.01)

(52) U.S. Cl.
CPC ........ *F16M 11/28* (2013.01); *F16M 11/2042* (2013.01); *F16M 11/2064* (2013.01); *F16M 11/2092* (2013.01); *F16M 2200/04* (2013.01)

(58) Field of Classification Search
CPC .... F16M 11/18; F16M 11/28; F16M 11/2064; F16M 11/2042; F16M 11/2092; F16M 2200/04
See application file for complete search history.

(56) References Cited

U.S. PATENT DOCUMENTS 741,382 A        10/1903    Seifried
4,326,694 A  *   4/1982    Destree .................. B25D 17/28
                                                       211/182

(Continued)

FOREIGN PATENT DOCUMENTS

EP    2744314 B1    3/2015
EP    3262908 B1    1/2019

(Continued)

OTHER PUBLICATIONS

"International Application Serial No. PCT/US2020/037006, International Search Report dated Sep. 4, 2020", 2 pgs.

(Continued)

*Primary Examiner* — Eret C McNichols
(74) *Attorney, Agent, or Firm* — Schwegman Lundberg & Woessner, P.A.

(57) ABSTRACT

A display mounting system including a support column, a moving bracket, an arm assembly, and a tilt assembly is described. The display mounting system includes one or more display attachment brackets to support one or more electronic displays. The display mounting system is used to hold one or more electronic displays over a worksurface or in front of a wall, and it allows the user of the display (Continued)

mounting system to easily change the orientation of one or more electronic displays according to user's preferences.

19 Claims, 24 Drawing Sheets

(56) References Cited

U.S. PATENT DOCUMENTS

| | | | |
|---|---|---|---|
| 5,738,316 A | 4/1998 | Sweere et al. | |
| 6,070,742 A | 6/2000 | Mcanally et al. | |
| 6,102,348 A | 8/2000 | Oneill | |
| 6,435,354 B1 | 8/2002 | Gray et al. | |
| 6,442,030 B1 | 8/2002 | Mammoser et al. | |
| 6,851,226 B2 | 2/2005 | MacGregor et al. | |
| 6,905,101 B1 | 6/2005 | Dittmer | |
| 6,945,504 B2 | 9/2005 | Chen et al. | |
| 7,026,551 B2 | 4/2006 | Franz et al. | |
| 7,152,836 B2 | 12/2006 | Pfister et al. | |
| 7,359,218 B2 | 4/2008 | Mcgrew | |
| 7,395,996 B2 | 7/2008 | Dittmer | |
| 7,398,950 B2 | 7/2008 | Hung et al. | |
| 7,451,957 B2 | 11/2008 | Nguyen | |
| 7,487,943 B1 | 2/2009 | Gillespie | |
| 7,493,177 B2 | 2/2009 | Ledbetter et al. | |
| 7,571,883 B2 | 8/2009 | Van Groesen et al. | |
| 7,628,361 B2* | 12/2009 | Gan | F16M 11/24 248/132 |
| 7,784,747 B2* | 8/2010 | Gan | F16M 11/24 248/132 |
| 7,793,903 B2 | 9/2010 | Dittmer et al. | |
| 7,815,154 B2* | 10/2010 | Oh | F16M 11/28 248/176.3 |
| 7,878,470 B2 | 2/2011 | Oh et al. | |
| 7,954,780 B2 | 6/2011 | Dittmer | |
| 7,984,888 B2 | 7/2011 | Park | |
| 8,051,782 B2 | 11/2011 | Nethken et al. | |
| 8,072,739 B2 | 12/2011 | Dittmer | |
| 8,191,487 B2 | 6/2012 | Theesfeld et al. | |
| 8,231,014 B2 | 7/2012 | Chen et al. | |
| 8,245,990 B2 | 8/2012 | Huang | |
| 8,254,092 B2 | 8/2012 | Russell et al. | |
| 8,313,074 B2* | 11/2012 | Wang | F16M 11/105 248/295.11 |
| 8,379,410 B2 | 2/2013 | Kitten | |
| 8,490,934 B2 | 7/2013 | Dittmer | |
| 8,561,955 B2 | 10/2013 | Stemple | |
| 8,693,172 B2 | 4/2014 | Russell et al. | |
| 8,794,579 B2 | 8/2014 | Sturman et al. | |
| 8,888,062 B2 | 11/2014 | Novin | |
| 9,004,430 B2 | 4/2015 | Conner | |
| 9,091,393 B2* | 7/2015 | Huang | F16M 11/42 |
| 9,121,543 B2 | 9/2015 | Dittmer et al. | |
| 9,167,707 B1* | 10/2015 | Wang | H05K 5/0204 |
| 9,578,779 B2 | 2/2017 | Yi | |
| D791,776 S | 7/2017 | Monsalve | |
| 9,702,501 B2* | 7/2017 | Ho | F16M 11/2014 |
| 9,857,020 B2* | 1/2018 | Yeh | F16M 11/046 |
| 10,010,169 B2 | 7/2018 | Grotenhuis | |
| 10,066,780 B2* | 9/2018 | Hsu | F16M 11/16 |
| 10,253,924 B2* | 4/2019 | Hsu | F16M 11/28 |
| 10,260,674 B2* | 4/2019 | Hsu | F16M 11/10 |
| 10,663,105 B2* | 5/2020 | Chen | F16M 11/2014 |
| 2006/0081735 A1 | 4/2006 | Chen et al. | |
| 2006/0186294 A1 | 8/2006 | Van et al. | |
| 2008/0210841 A1* | 9/2008 | Tseng | F16M 11/046 248/422 |
| 2009/0084913 A1 | 4/2009 | Grabania et al. | |
| 2009/0134285 A1 | 5/2009 | Huang et al. | |
| 2009/0159760 A1* | 6/2009 | Gan | F16M 11/24 248/121 |
| 2009/0179133 A1* | 7/2009 | Gan | F16M 11/24 248/422 |
| 2009/0189032 A1 | 7/2009 | Su | |
| 2010/0172072 A1 | 7/2010 | Monaco | |
| 2010/0181440 A1 | 7/2010 | Larsen et al. | |
| 2010/0294898 A1* | 11/2010 | Wang | F16M 11/10 248/122.1 |
| 2010/0327129 A1 | 12/2010 | Chen | |
| 2013/0032682 A1 | 2/2013 | Bell | |
| 2013/0256489 A1* | 10/2013 | Ergun | F16M 11/24 248/297.11 |
| 2014/0034799 A1* | 2/2014 | Fallows | F16M 11/425 248/297.21 |
| 2014/0208986 A1 | 7/2014 | Desroches et al. | |
| 2015/0001355 A1* | 1/2015 | Huang | F16M 11/42 248/123.11 |
| 2017/0051865 A1* | 2/2017 | Chen | F16M 11/046 |
| 2019/0090630 A1 | 3/2019 | Hazzard et al. | |
| 2019/0226629 A1* | 7/2019 | Chen | F16M 11/24 |
| 2019/0226630 A1* | 7/2019 | Chen | F16M 11/2014 |
| 2019/0293229 A1* | 9/2019 | Okuda | H04N 5/64 |
| 2020/0037988 A1* | 2/2020 | Kim | F16C 31/04 |

FOREIGN PATENT DOCUMENTS

| | | |
|---|---|---|
| GB | 2560148 A | 9/2018 |
| WO | WO-0024291 A1 | 5/2000 |
| WO | WO-2016128765 A1 | 8/2016 |
| WO | WO-2021006987 A1 | 1/2021 |

OTHER PUBLICATIONS

"International Application Serial No. PCT/US2020/037006, Written Opinion dated Sep. 4, 2020", 8 pgs.

* cited by examiner

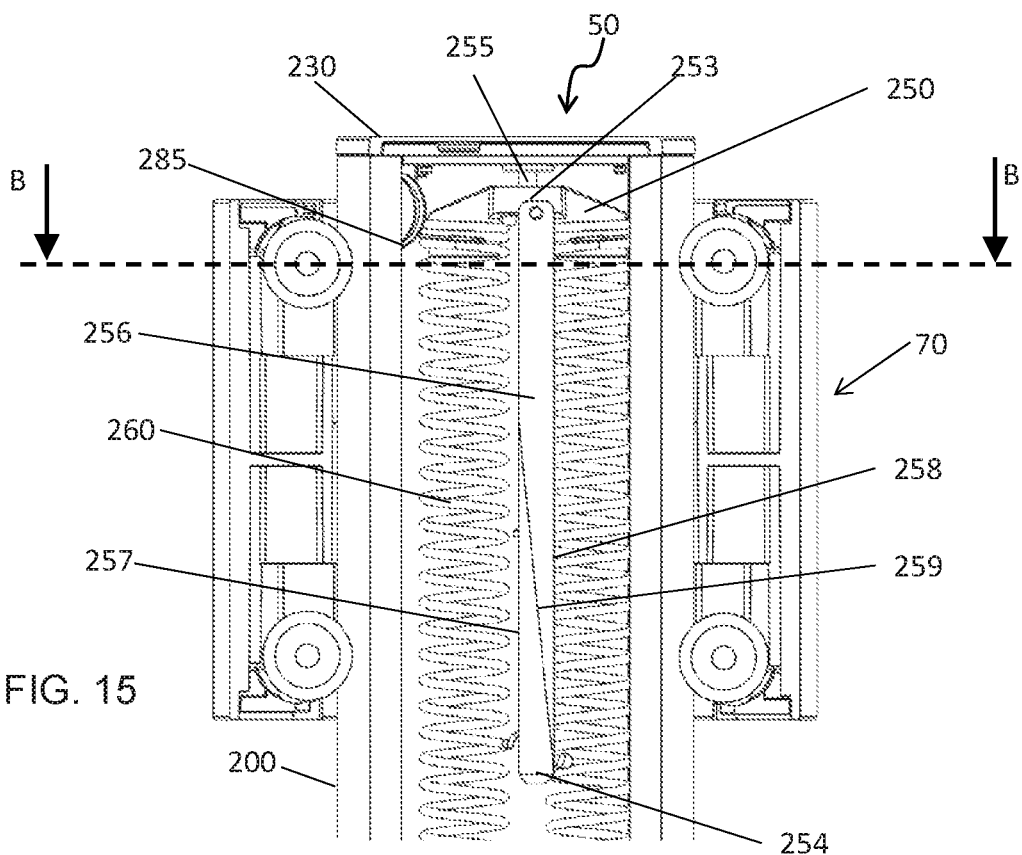
FIG. 15
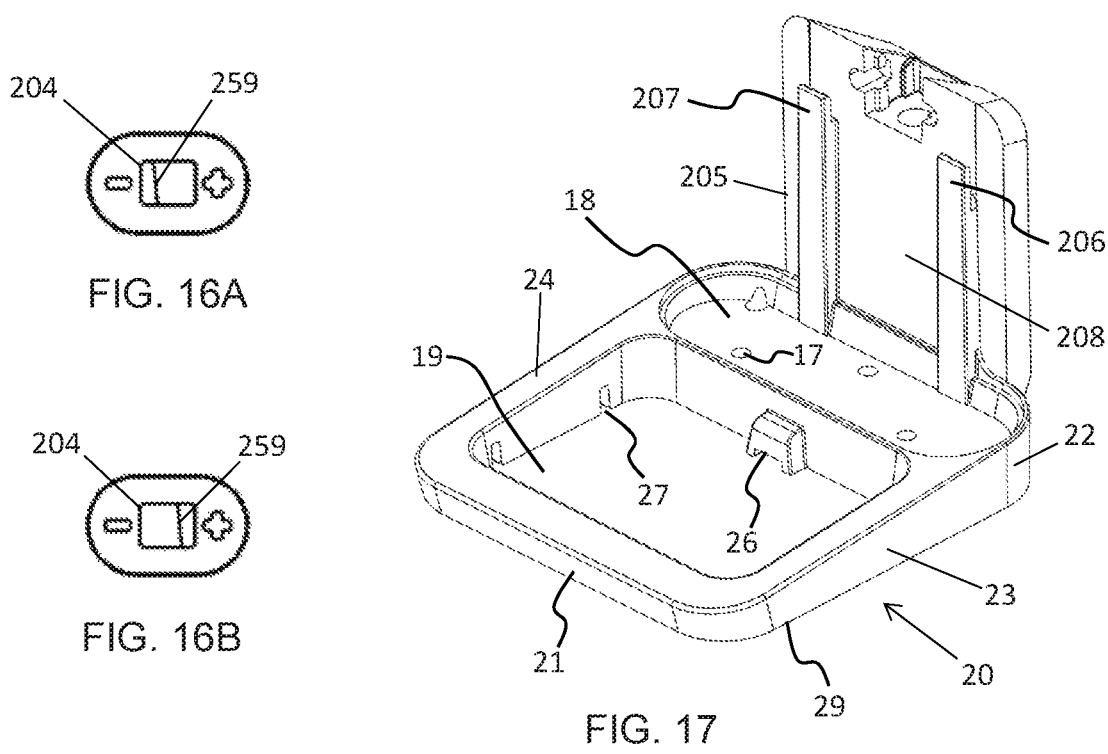
FIG. 16A
FIG. 16B
FIG. 17

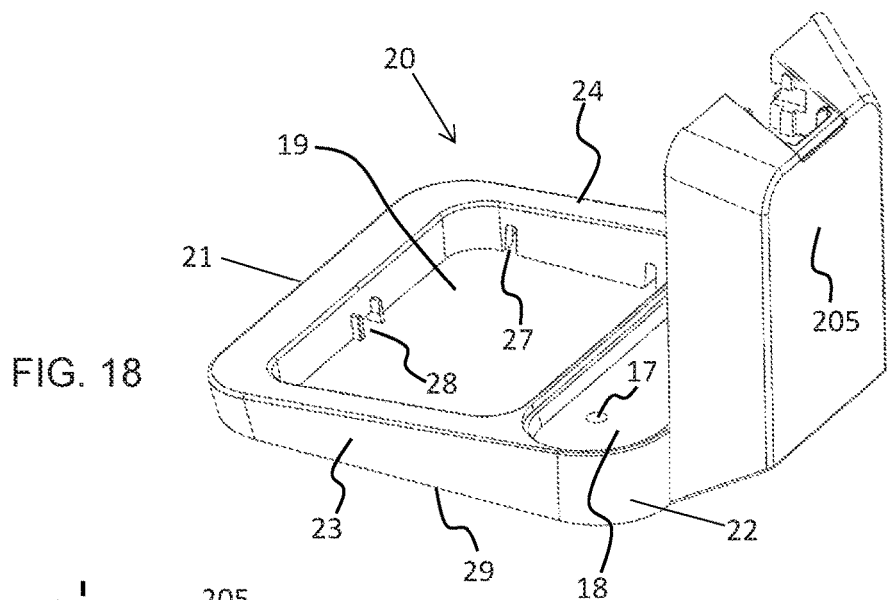
FIG. 18
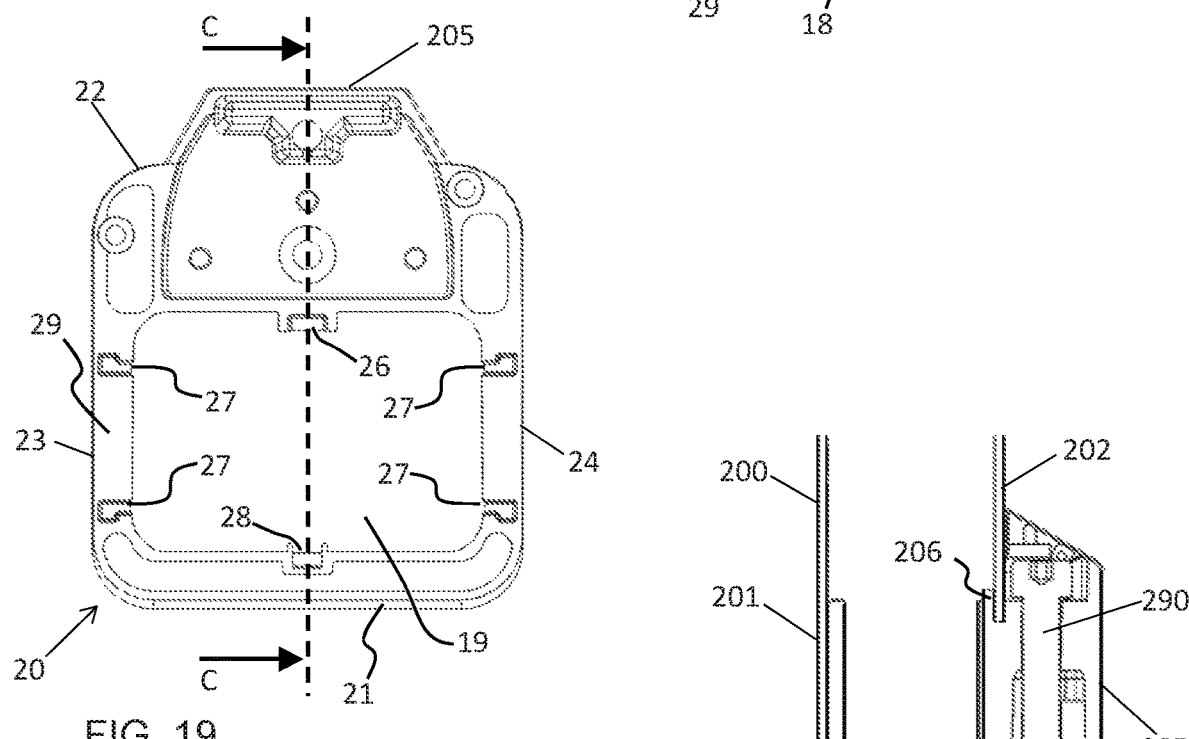
FIG. 19
FIG. 20

DISPLAY MOUNTING SYSTEM AND METHOD

CLAIM OF PRIORITY

This patent application is a U.S. National Stage Application which claims priority to PCT Application Serial Number PCT/US2020/037006, and entitled "DISPLAY MOUNTING SYSTEM AND METHOD," filed on Jun. 10, 2020, and published as WO 2021/006987 A1 on Jan. 14, 2021, which claims the benefit of priority of Janechek, et al. U.S. Provisional Patent Application Ser. No. 62/872,574, entitled "DISPLAY MOUNTING SYSTEM AND METHOD," filed on Jul. 10, 2019, which are hereby incorporated by reference herein in their entirety.

TECHNICAL FIELD

This document pertains generally, but not by way of limitation, to electronic display mounting systems.

BACKGROUND

Electronic displays, e.g., flat panel displays, can be supported by a mounting system to make them easily accessible by a user (e.g., to locate them over a desk surface). The mounting system can be freestanding (e.g., supported by a floor or by a desktop), coupled to a structure (e.g., a wall), or mobile (e.g., attached to a wheeled base). Mounting system can allow the user to easily alter the orientation of the electronic display (e.g., change a height, change and angle around a vertical axis, change an angle around a horizontal axis, or change a distance from the user) to accommodate users varying postures during the use of the electronic display.

BRIEF DESCRIPTION OF THE DRAWINGS

The following drawings are illustrative of particular non-limiting example configurations of the present invention and therefore do not limit the scope of the invention. The drawings are not to scale and are intended for use in conjunction with the explanations in the following detailed description. Example configurations of the present invention will hereinafter be described in conjunction with the appended drawings. The drawings illustrate generally, by way of example, but not by way of limitation, various configurations discussed in the present document.

FIG. 15 is a close-up view of the upper portion of the riser and the truck assemblies of FIG. 13.

FIG. 16A is a front view of an example of a weight adjustment indicator window at a low weight setting.

FIG. 16B is a front view of an example of a weight adjustment indicator window at a high weight setting.

FIG. 17 a front perspective view of an example of a base of the display mounting system of FIG. 9.

FIG. 18 a rear perspective view of the base of FIG. 17.

FIG. 19 a bottom view of the base of FIG. 17.

FIG. 20 is a side view of the base and support column assembly of the display mounting system of FIG. 9 as it is viewed according to the cross-section C-C of FIG. 19.

OVERVIEW

Figure 1:
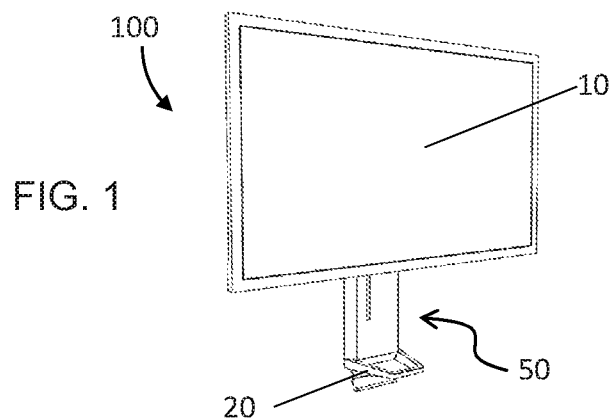
FIG. 1 is a perspective view of an example of a display mounting system for a single display.

This disclosure is directed to a display mounting system to position one or more electronic displays relative to a structure, a desk, or a cart. More particularly, the display mounting system can include a height adjustable portion, and an articulating arm coupled to the height adjustable portion.

DETAILED DESCRIPTION

The following detailed description is exemplary in nature and is not intended to limit the scope, applicability, or embodiment of the invention in any way. Rather, the following description provides some practical illustrations for implementing exemplary configurations of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

An electronic display device can be used for presentation of information (e.g., images, text, or video) which can be transmitted electronically. Electronic display devices can include television sets, computer monitors, digital signage, and others. In some example configurations, the electronic display device can be wired or wirelessly connected to an information source (e.g., a computer, a computing network, a cloud-based software, and others). In other example configurations, the electronic display device can have a computer included inside the display housing.

The electronic display device can be positioned in a location where its content (e.g., images) can be easily visible to a viewer. For example, in some example configurations, the electronic display device can be located proximate to a workstation and it can be connected to a computer located proximate to the workstation. A user of the workstation can perform various computing functions (e.g., writing, drawing, calculating, and the like) while viewing images displayed on the electronic display device by the computer. In other example configurations, electronic display can be positioned over a wall, on a floor stand or on a wheeled base. A display mounting system can be used to couple the electronic display to a structure in these various configurations.

The display mounting system can provide both height adjustment and articulation (e.g., tilt, pan, side motion, and forward or backward motion) for the electronic display. The present inventors have recognized that it would be desirable to isolate these motions (e.g., height adjustment can be independent of forward or backward motion) to provide better control of the display mounting system functions. Existing solutions which include a counterbalanced height adjustable arm coupled to an extension arm can combine height adjustment (e.g., tilting the arm up/down) and articulation (e.g., panning the height adjustable arm relative to the extension arm) functions, and thus, they make it difficult to manipulate the orientation of the electronic display. This disclosure describes various techniques to isolate the height adjustment from the articulation of displays. These techniques will make it easy to manipulate the display mounting system and encourage users to adjust an orientation of one or more electronic display frequently throughout the day to match their varying postures and create more ergonomic work environment.

This disclosure describes the construction of a display mounting system (e.g., the display mounting system 100 of FIGS. 1-2, and the display mounting system 1100 of FIGS. 51-52) in FIGS. 1-10 according to some example configurations of the current disclosure.

Figure 11:
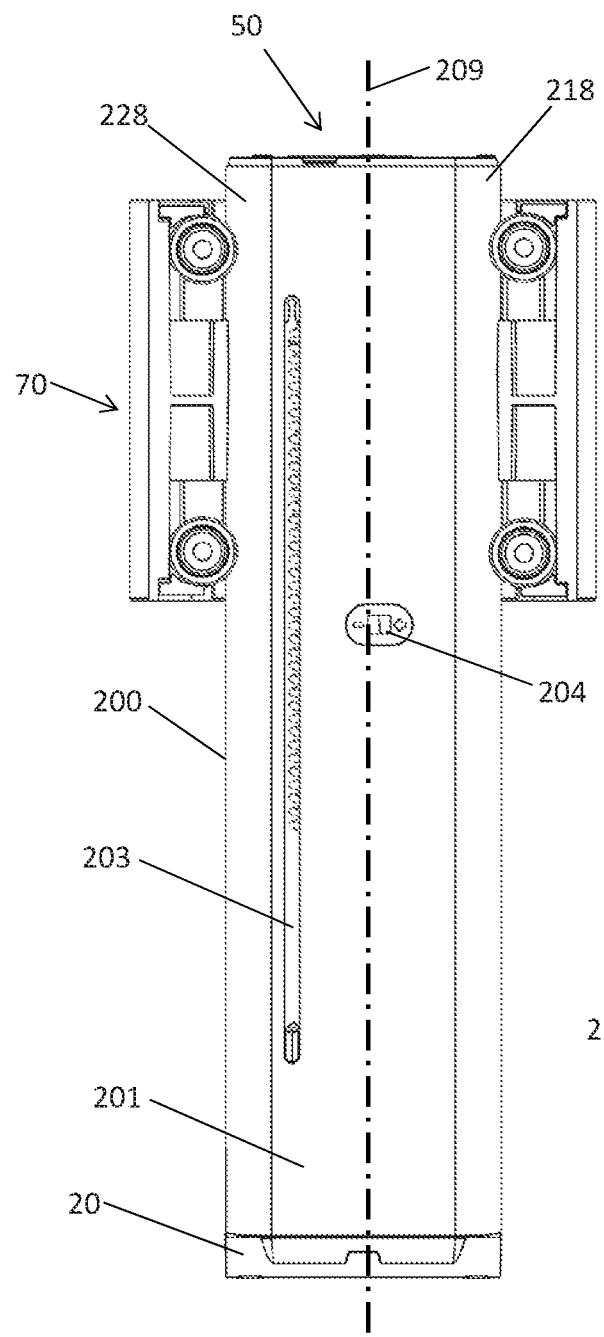
FIG. 11 is a front view of the riser and the truck assemblies of FIG. 9 as viewed according to cross-section A-A of FIG. 10.
Figure 12:
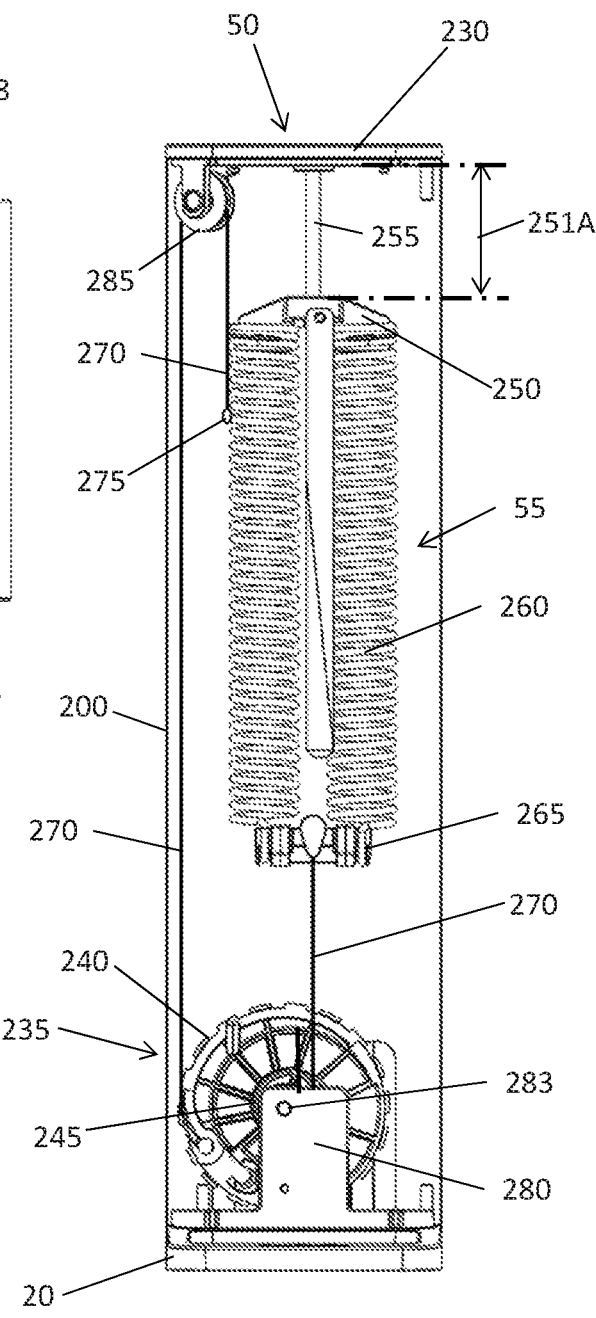
FIG. 12 is a front view of the riser assembly of FIG. 11 with the front face of the support column removed to show the counterbalance mechanism.

The display mounting system 100 can include a counterbalance mechanism (e.g., the counterbalance mechanism 55 of FIG. 12). This disclosure describes the construction and attachment of the counterbalance mechanism 55 to the display mounting system 100 in FIGS. 11-16 in an example configuration.

The display mounting system 100 can be mounted on a desk (e.g., the display mounting system 100 of FIG. 1). This disclosure describes the construction of a base 20 and mounting of the display mounting system 100 on a desk surface in FIGS. 17-20 in an example configuration.

The display mounting system 100 can include a vertically translating portion (e.g., truck assembly 70 of FIG. 21, and truck assembly 1070 of FIG. 56) to adjust a height of one or more electronic displays. This disclosure describes the construction of the truck assembly 70 in FIGS. 21-29, and the construction of the truck assembly 1070 in FIGS. 55-65 in some example configurations.

The display mounting system 100 can include an articulating arm assembly (e.g., the arm assembly 60 of FIG. 30) to change an orientation of one or more displays. This disclosure describes the construction of the articulating arm assembly 60 in FIGS. 30-35 in some example configurations.

The display mounting system 100 can include a mounting portion for coupling one or more electronic displays (e.g., the bow assembly 90 of FIG. 36, and the tilt assembly 40 of FIG. 43) to the display mounting system 100. This disclosure describes the construction of the mounting portion in FIGS. 36-43 in some example configurations.

Figure 44:
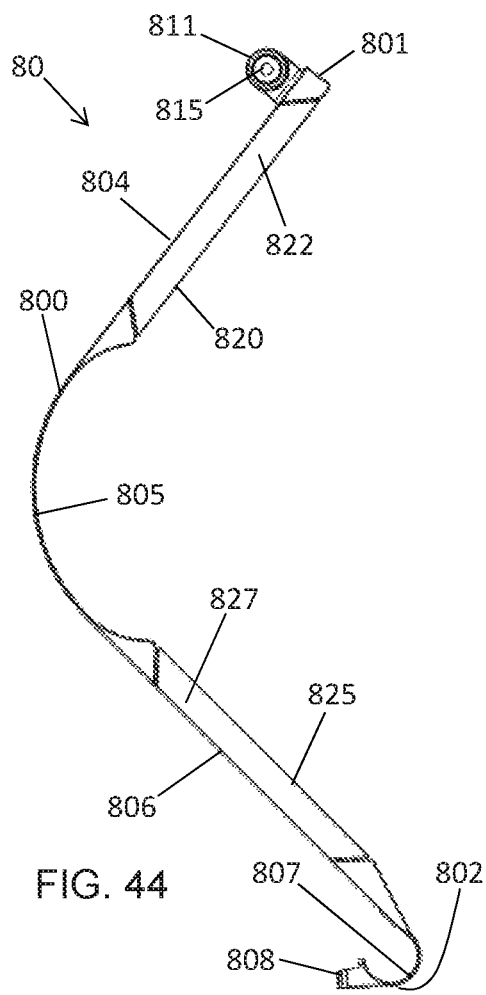
FIG. 44 is a side view of an example of a cable management bracket assembly.
Figure 46:
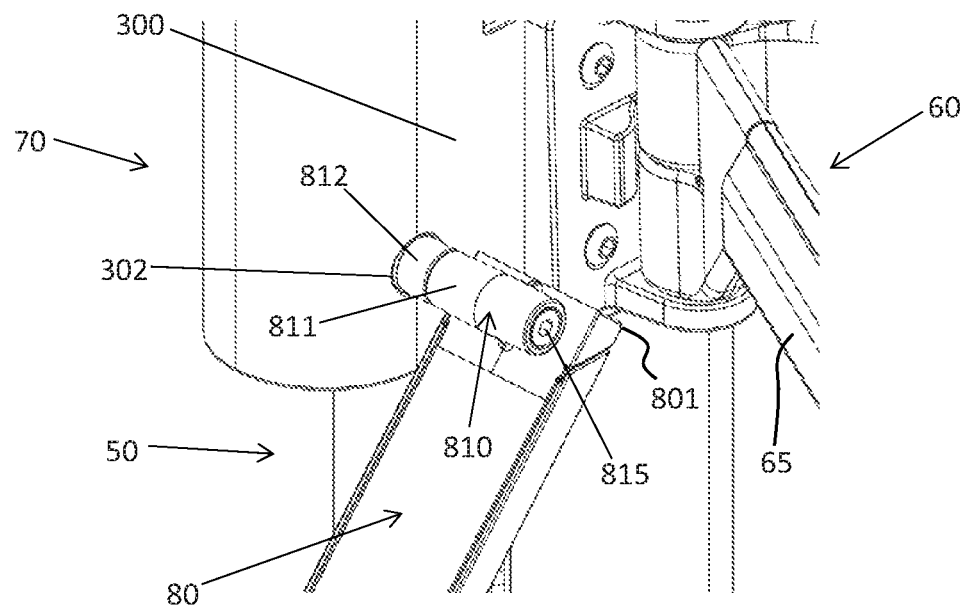
FIG. 46 is a close-up perspective view of an example of a coupling between the cable management channel and the truck assembly of FIG. 3.
Figure 47:
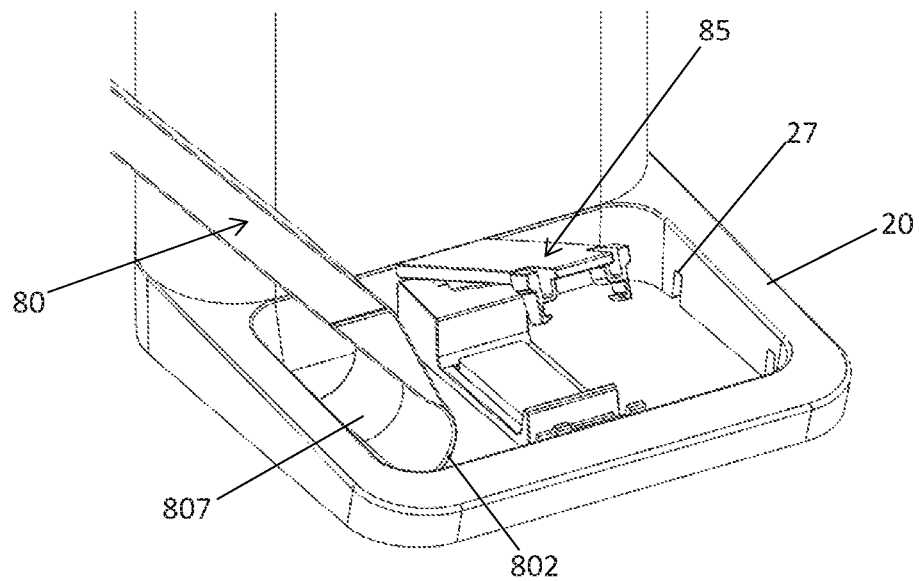
FIG. 47 is a close-up perspective view of an example of a coupling between the cable management channel and the base of FIG. 3.

The display mounting system 100 can include a cable management system (e.g., the cable management bracket assembly 80 of FIG. 44, and the cable clip 85 of FIG. 47). This disclosure describes the construction of the cable management system in FIGS. 44-50 in some example configurations.

Figure 53:
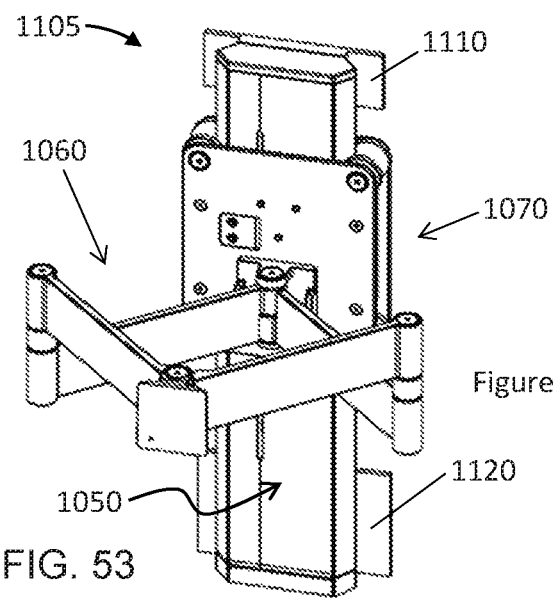
FIG. 53 is a perspective view of an example of a display mounting system for a wall mount.

The display mounting system 100 can be mounted on a wall (e.g., display mounting system 100 of FIG. 53). This disclosure describes the construction of the wall mounted display mounting system in FIGS. 53-54 in an example configuration.

The display mounting system (e.g., display mounting system 1100 of FIG. 51) can include a holder (e.g., the holding block 1080 of FIG. 66) to hold one or more portable electronic devices proximate the electronic displays. This disclosure describes the construction and attachment of the holding block 1080 to the display mounting system 1100 in FIGS. 66-68 in an example configuration.

Figure 2:
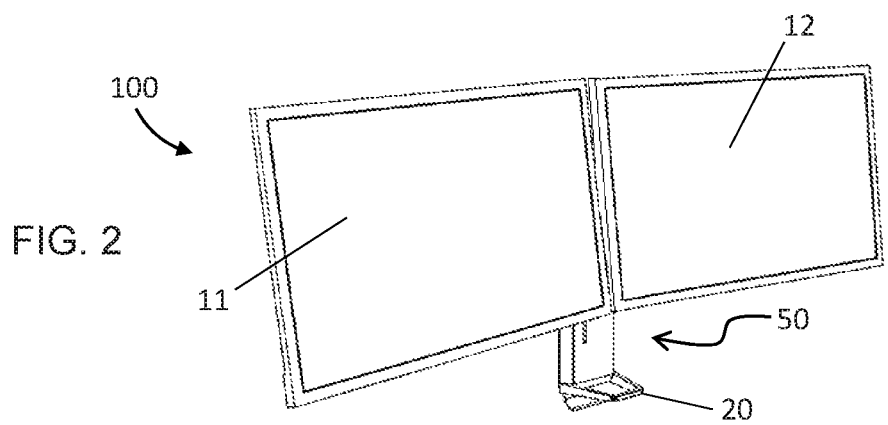
FIG. 2 is a perspective view of another example of a display mounting system for two displays.

FIGS. 1-2 are perspective views of a display mounting system 100. One or more electronic display devices (e.g., display 10 of FIG. 1) can be coupled to the display mounting system 100. In other configurations, a first electronic display 11, and a second electronic display 12 can be coupled to the display mounting system 100. The display mounting system 10 can be configured to hold the first electronic display 11 and the second electronic display 12 side by side in close proximity as illustrated in FIG. 2.

In some example configurations, the display mounting system 100 can include a riser assembly 50 and a base 20. The base can be useful to couple the display mounting system 100 to a workstation (e.g., a desk). In other example configurations, the display mounting system 1105 can include a riser assembly 1050 and wall mounting plates 1110 and 1120 to couple it to a wall 1035 (shown in FIGS. 53-54).

Figure 3:
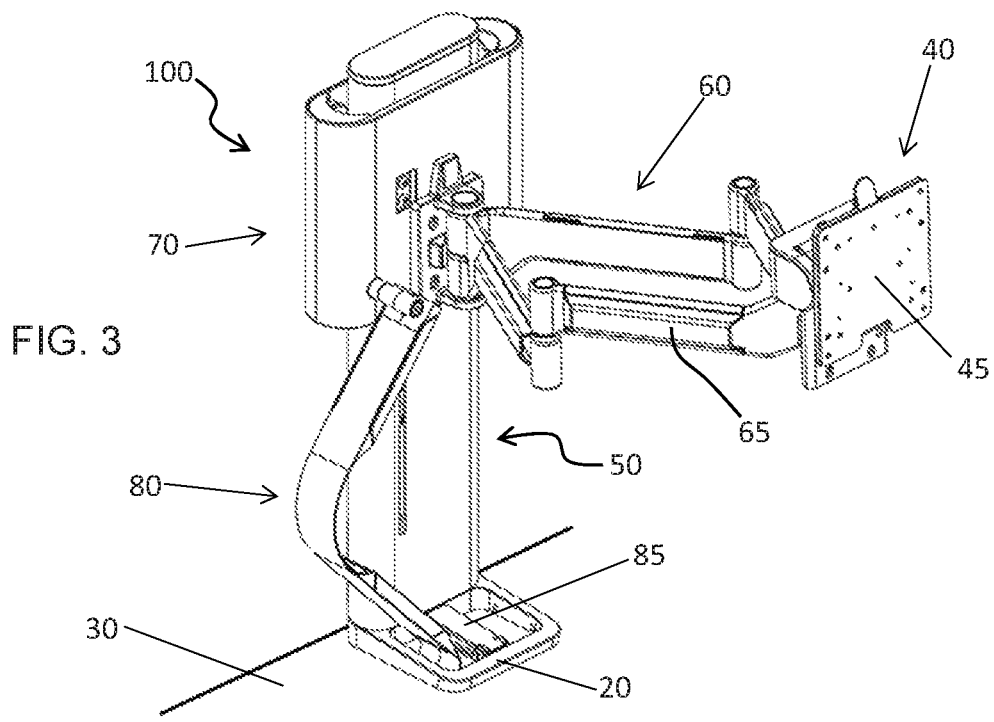
FIG. 3 is a perspective view of an example of a display mounting system for holding a single display over a desktop.
Figure 4:
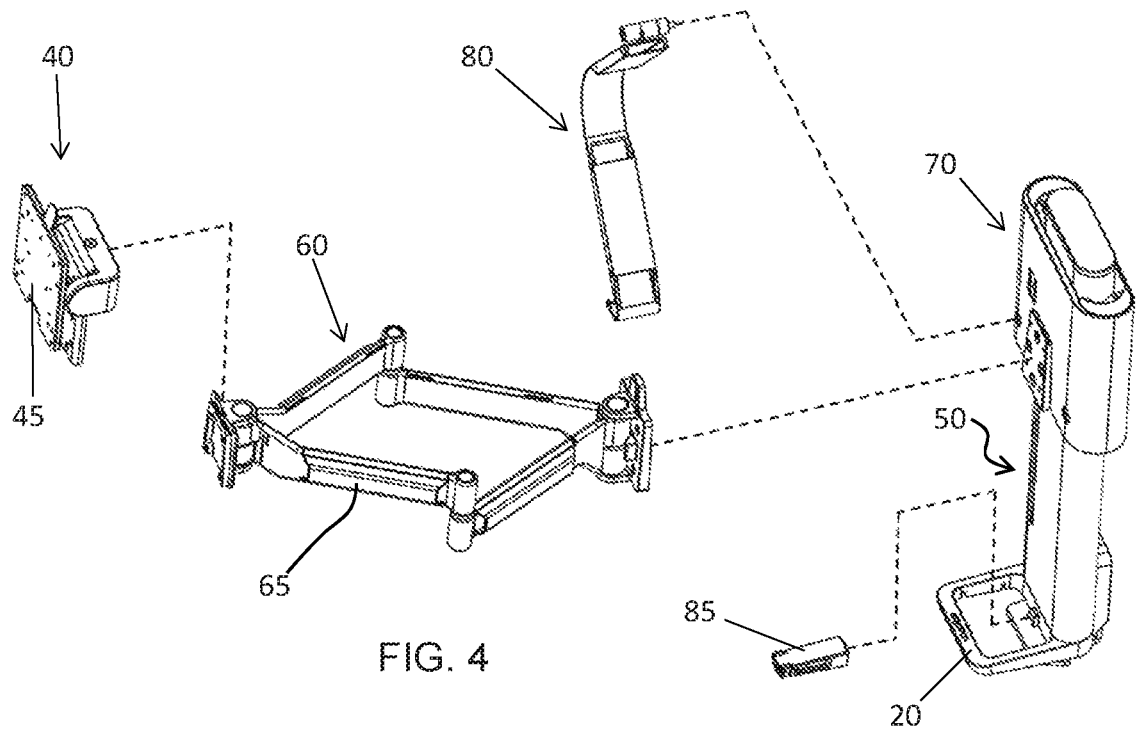
FIG. 4 is an exploded view of the display mounting system of FIG. 3.

FIG. 3 is a perspective view of a display mounting system of FIG. 1. The display mounting system 100 can be coupled to a structure (e.g., a desk surface 30) to hold an electronic display device (for example to hold an electronic display device over a desk surface 30). FIG. 4 is an exploded view of main sub-assemblies of the display mounting system 100. The display mounting system 100 can include a base 20, a riser assembly 50, a truck assembly 70, an arm assembly 60, a cable management bracket assembly 80, a cable management clip 85, a tilt assembly 40, and a display attachment bracket 45.

The base 20 can be placed over a desk surface 30 and it can be coupled to the riser assembly 50. An elongated riser assembly 50 can extend upward from the base 20. In some example configurations, the base 20 can be freestanding over the desk surface 30. In other examples, a clamp can be coupled to the base to fixedly attach the display mounting system 100 to an edge of the desk surface 30. In yet other configurations, the display mounting system 100 can be mounted to the desk surface 30 through a hole (e.g., grommet mount) located on the desk surface 30.

The truck assembly 70 can be movingly coupled to the riser assembly 50. The truck assembly 70 can move along at least a portion of the riser assembly 50. A counterbalance mechanism (e.g., a counterbalance mechanism similar to the counterbalance mechanism 55 shown in FIG. 12) can be included in the riser assembly 50. The counterbalance mechanism 55 can be coupled to the riser assembly 50 and to the truck assembly 70. The counterbalance mechanism 55 can lift at least a portion of the combined weight of all components (e.g., electronic display 10, arm assembly 60, and others) coupled to the truck assembly 70. In some example configurations, the truck assembly 70 can provide height adjustment for the display attachment bracket 45 relative to the desk surface 30.

The arm assembly 60 can be coupled to the truck assembly 70. The arm assembly 60 can provide articulation for the display attachment bracket 45 relative to the riser assembly 50. The position of the display attachment bracket can be adjusted relative to the riser assembly 50 by moving the arm assembly 60.

In some example configurations, a tilt assembly 40 can be coupled to the arm assembly 60. In some example configurations, the tilt assembly 40 can further include a detachable display attachment bracket 45. The display attachment bracket can be coupled to a display (e.g., the display 10 of FIG. 1). The tilt assembly 40 can be configured to accept the display attachment bracket 45. The tilt assembly 40 can adjust an angle of the display attachment bracket 45 relative to the riser assembly 50 around a horizontal first axis (not shown), and it can provide rotation of the display attachment bracket 45 relative to the desk surface 30 around a vertical second axis (not shown).

Figure 5:
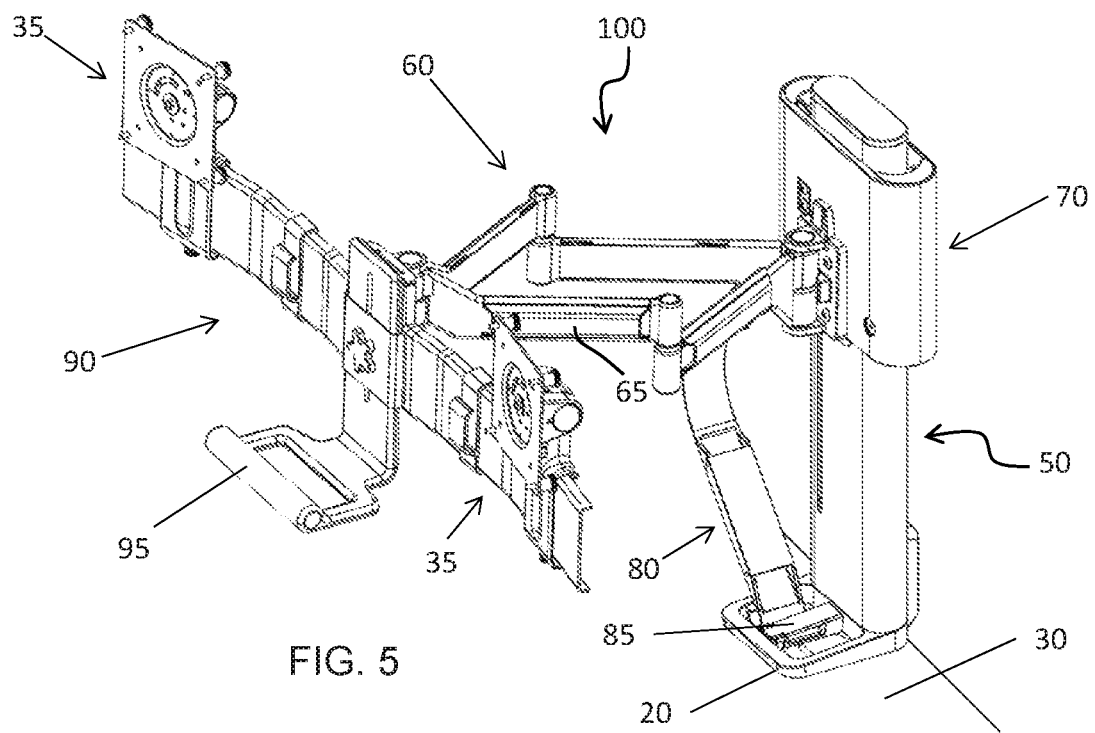
FIG. 5 is a perspective view of another example of a display mounting system for holding two displays over a desktop.
Figure 6:
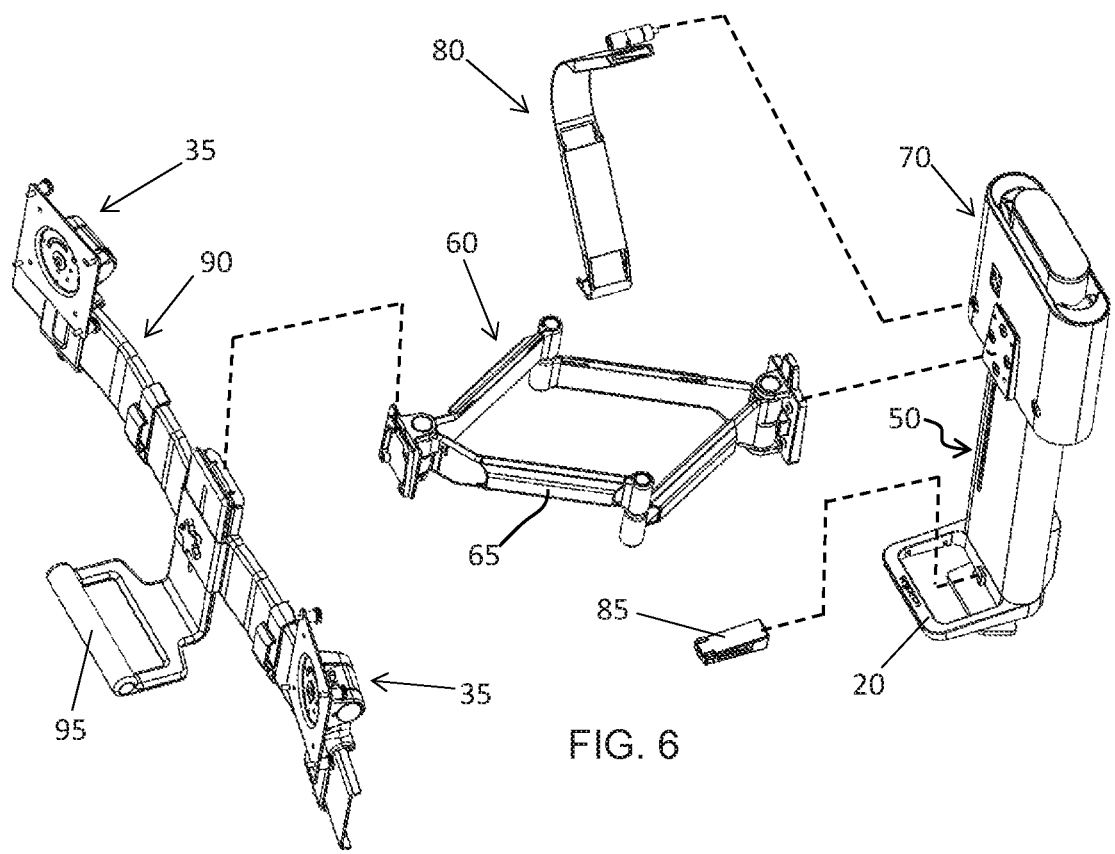
FIG. 6 is an exploded view of the display mounting system of FIG. 5.

FIG. 5 is a perspective view of the display mounting system 100 of FIG. 2. In some example configurations, a bow assembly 90, and one or more tilt assemblies 35 can be coupled to the display mounting system 100 to hold one or more electronic displays. FIG. 6 is an exploded view of main sub-assemblies of the display mounting system 100 including a bow assembly 90. The display mounting system 100 with the bow assembly 90 can provide height adjustment and articulation for the one or more displays coupled to the display mounting system 100.

In some example configurations, a handle 95 can be coupled to the display mounting system 100 as illustrated in FIG. 5. The handle 95 can help the user to easily manipulate the display mounting system 100 to change an orientation of the one or more electronic displays.

In some example configurations, the display mounting system 100 of FIGS. 3 and 5 can include a cable management bracket assembly 80, and one or more cable covers 65. The one or more cable covers 65 can be coupled to the arm assembly 60 to route the cables between the one or more electronic displays (e.g., electronic display 10 of FIG. 1) and the truck assembly 70. The cable management bracket assembly 80 can be coupled to the truck assembly 70 and it can be coupled to the base 20. The cable management bracket assembly 80 can route the cables between the truck assembly 70 and the base 20. One or more electronic cables (e.g., power cable, video cable, or the like) can be routed through the one or more cable covers 65 and the cable management bracket assembly 80. The one or more cable covers 65 and the cable management bracket assembly 80 can at least partially conceal the cables from outside view, and they can control the orientation of the one or more cables during height adjustment of the one or more displays.

Figure 7:
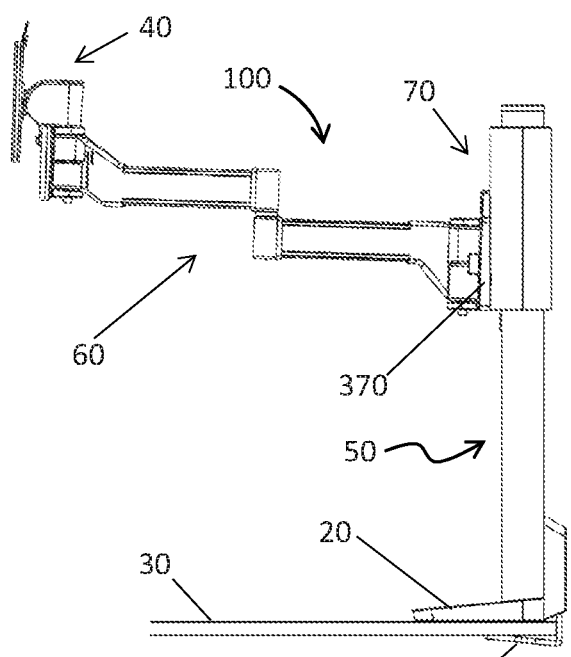
FIG. 7 is a side view of an example of a display mounting system in elevated position.
Figure 8:
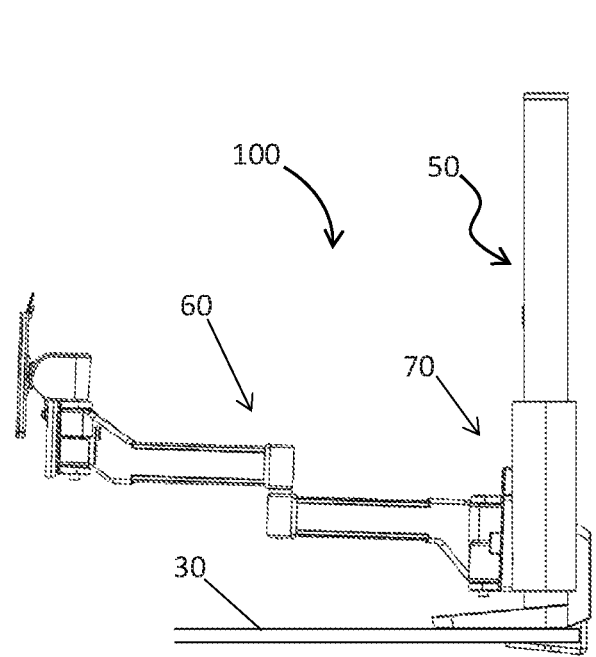
FIG. 8 is a side view of the display mounting system of FIG. 7 in lowered position.

FIGS. 7-8 are side views of the display mounting system 100 of FIG. 3. The arm assembly 60 is shown in extended orientation. A clamp bracket 25 can be coupled to the base 20. The clamp bracket 25 can couple the display mounting system 100 to the desk surface 30, (for example, it can fixedly attach the display mounting system 100 to an edge of the desk surface 30). The truck assembly 70 can be configured to move along at least a portion of the riser assembly. In some example configurations, the truck assembly can transfer between an elevated position (as illustrated in FIG. 7) and lowered position (as illustrated in FIG. 8).

Figure 9:
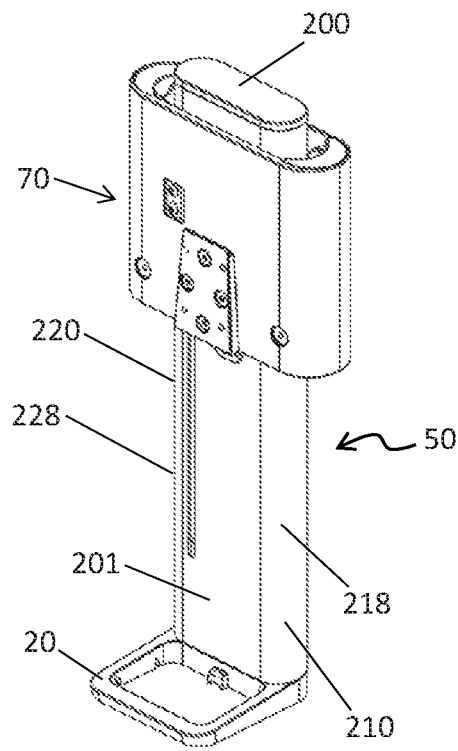
FIG. 9 is a perspective view of the riser and the truck assemblies of the display mounting system of FIG. 5.
Figure 10:
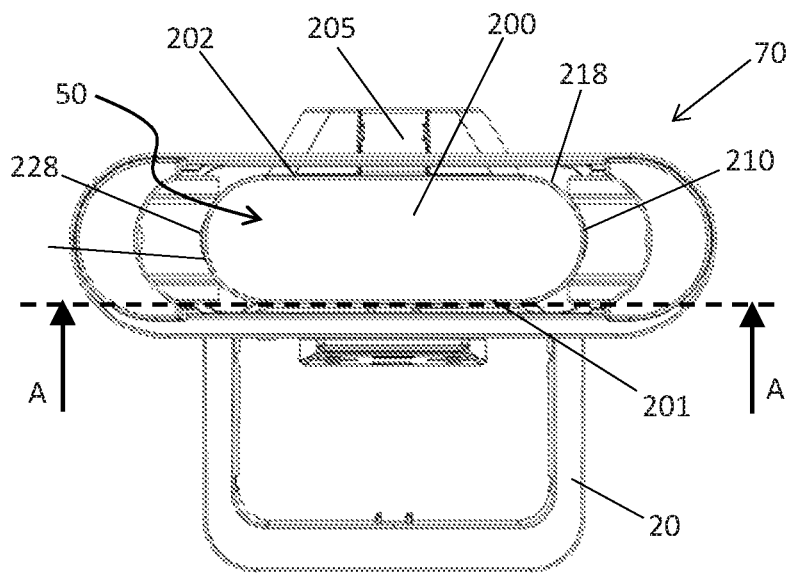
FIG. 10 is a top view of the riser and the truck assemblies of FIG. 9.

FIGS. 9-10 are a perspective view and a top view of the riser assembly 50 together with the truck assembly 70, respectively. The riser assembly 50 can include a support column 200. The support column 200 can be coupled to the base 20. In some example configurations, the support column 200 can extend upward from the base 20 in perpendicular direction to the lower surface of the base 20. In other example configurations, the support column 200 can extend upwards from the lower surface of the base 20 in an angular orientation (e.g., in an obtuse angle).

The support column 200 can include a front face 201 and a rear face 202 opposite the front face 201. The front face 201 and the rear face 202 of the support column 200 can be coupled to each other by a first side surface 210 and a second side surface 220 opposite the first side surface 218. The front face 201, the rear face 202, the first side surface 210, and the second side surface 220 of the support column 200 can form an elongated tubular structure. The support column 200 can be elongated in the axial direction 209 (shown in FIG. 11). The first side surface 210 and the second side surface 220 of the support column 200 can form the first guide surface 218 and the second guide surface 228, respectively.

The truck assembly 70 can be slidably engaged with the support column 200. The truck assembly 70 can at least partially overlap with the support column 200. Truck assembly can translate relative to the support column in the axial direction 209. The truck assembly 70 can include one or more guiding components (e.g., glides, wheels, or the like). The one or more guiding components of the truck assembly 70 (e.g., the wheel assemblies 320 and 330 of FIG. 23) can be in contact with the first 218 and the second 228 guide surfaces of the support column 200 to guide the truck assembly 70 during its translation relative to the support column 200.

In some example configurations, the first guide surface 218 and the second guide surface 228 can be in a circular contour as illustrated in FIG. 10. In other example configurations, the first 218 and the second 228 guide surfaces can be in other shapes including (but not limited to) oval, flat, and other shapes. Outside contour of the one or more guiding components of the truck assembly 70 (e.g., outside profile of the wheel 324 of FIG. 25) can match the contour of the first 218 and the second 228 guide surfaces.

FIG. 11 is a front view of the riser and truck assemblies. In some example configurations, the front face 201 of the support column support column 200 can further include an opening (e.g., a slot 203). The slot 203 can be an elongated opening formed in parallel to the axial direction 209. The slot 203 can provide access to an internal space of the support column 200 where the counterbalance mechanism 55 (shown in FIG. 12) can be located. A component of the truck assembly 70 (e.g., a hook, or the like) can penetrate through the slot 203 to couple with the counterbalance mechanism 55.

Figures 13, 14:
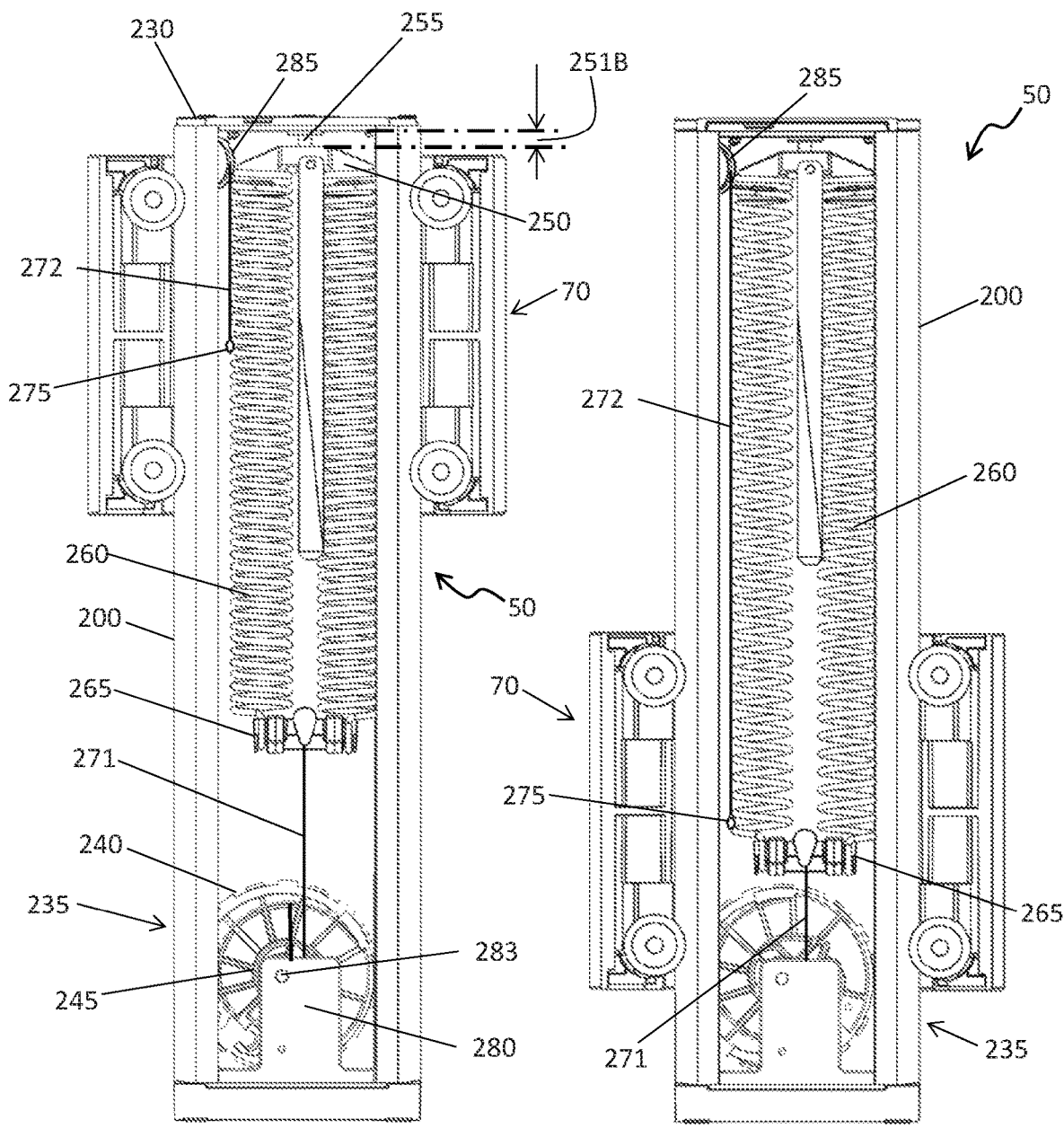
FIG. 13 is a front view of the riser and the truck assemblies of FIG. 9 as viewed according to cross-section A-A of FIG. 10 with the front face of the support column removed to show the counterbalance mechanism in elevated orientation.
FIG. 14 is a front view of the riser and the truck assemblies of FIG. 13 in lowered orientation.

FIGS. 12-14 are front views of the riser assembly 50 in various configurations. The riser assembly 50 can include a support column 200. The front face 201 of the support assembly 50 is removed in FIGS. 12-14 to show the components located inside the support column 200. A mounting bracket 280 can be coupled to the lower end of the support column 200, and a top bracket 230 can be coupled to the upper end of the support bracket 200. The span between the top bracket 230 and the mounting bracket 280 can define a length of the support bracket 200. A counterbalance mechanism 55 can be included inside the support column 200 between the top bracket 230 and the mounting bracket 280. The counterbalance mechanism 55 can be coupled to the support column 200 and to the truck assembly 70. The counterbalance mechanism 55 can include one or more energy storage members (e.g., one or more extension springs 260) and a wheel assembly 235. The counterbalance mechanism 55 can further include an adjustment screw 255, an adjustment bracket 250, and a connecting bracket 265. The adjustment bracket 250 and the connecting bracket 265 can be adapted to translate in the axial direction 209. The one or more springs 260 can be coupled to the adjustment bracket 250 on one end and coupled to the connecting bracket 265 on the other end. Additional information regarding this conversion can be found in commonly assigned U.S. Pat. No. 8,286,927 to Sweere et al., which is incorporated by reference in its entirety.

In some example configurations, the adjustment screw 255 can be coupled to the top bracket 230. The adjustment screw 255 can include a head (not shown) and a threaded shaft. The threaded shaft of the adjustment screw 255 can extend from the head along an axial direction (not shown) of the adjustment screw 255. The head of the adjustment screw 255 can be supported by the top bracket 230. The axial direction of the adjustment screw 255 can be parallel to the axial direction 209 of the support column 200.

The adjustment bracket 250 can have a threaded hole. The adjustment screw 255 can be threadingly engaged with the adjustment bracket 250 through the threaded hole of the adjustment bracket 250. The adjustment bracket 250 can be guided by the support column 200 to prevent it from rotating relative to the support column 200 as the adjustment screw 255 rotates around its axis. The adjustment bracket 250 can be configured to translate along the axial direction of the adjustment screw 255. The adjustment screw 255 can be used in combination with the adjustment bracket 250 to adjust a tension of the one or more springs 260.

A low-tension configuration of the one or more springs 260 is illustrated in FIG. 12. In the low-tension orientation, the adjustment bracket 250 can be located at a first distance 251A from the top bracket 230. A high-tension configuration of the one or more springs 260 is illustrated in FIG. 13. The adjustment bracket 250 can be translated closer to the top bracket in high-tension orientation. In the high-tension orientation, the adjustment bracket 250 can be located at a second distance 251B from the top bracket 230 where the second distance 251B is smaller than the first distance 251A. As the tension is increased on the one or more springs 260 (e.g., configuration shown in FIG. 13), the counterbalance mechanism 55 can lift a larger weight coupled to the wheel assembly 70.

FIG. 15 is a close-up view of the upper portion of the riser 50 and the truck 70 assemblies. In some example configurations, a weight adjustment indicator strip 256 can be coupled to the adjustment bracket 250. The indicator strip 256 can have a first edge 257 and a second edge 258 opposite the first edge 257. The indicator strip 256 can further include a third edge 253 and a fourth edge 254 opposite the third edge 253. The first edge 257, the second edge 258, the third edge 253, and the fourth edge 254 can form a planar surface with a width between the first edge 257 and the second edge 258, and a length between the third edge 253 and the fourth edge 254. The indicator strip 256 can have an elongated shape where the length is substantially larger than the width. The indicator strip 256 can be coupled to the adjustment bracket 250 proximate its third edge 253. The indicator strip 256 can be adapted to move with the adjustment bracket 250 during the adjustment of the tension of one or more springs 260.

A lift force indicator line 259 can be formed on the planar surface of the indicator strip 256 as illustrated in FIG. 15 according to an example configuration of the current disclosure. The indicator line 259 can be at an angle relative to the first side 257 and the second side 258 of the indicator strip 256. The indicator line 259 can be inclined from the first side 257 towards the second side 258 of the indicator strip 256 so that a distance measured between the first side 257 and the indicator line 259 in a direction that is perpendicular to the first side 257 can be larger if the measurement location is further away from the third side 253 of the indicator strip 256.

In an example configurations, a window 204 can be formed on the front face 201 of the support column 200 as illustrated in FIG. 11. The window 204 can be configured to at least partially overlap with the indicator strip 256. The planar surface of the indicator strip 256 (e.g., the surface on which the indicator line 259 is formed) can face towards the front face 201 of the support column 200 such that the indicator line 259 can be at least partially visible through the window 204. The location of the window 204 can be stationary relative to the support column 200. The adjustment bracket 250 and the indicator strip 256 can move relative to the support column 200 during the adjustment of the tension of one or more springs 260.

Some example configurations of the indicator line 259 as it can be visible through the window 204 are illustrated in FIGS. 16A-16B. The orientation of the indicator line 259 visible through the window 204 can be adapted to indicate a relative magnitude (e.g., low, high) of the lift force generated by the counterbalance mechanism 55.

In some example configurations when the tension is lowered on the one or more springs 260 (e.g., the adjustment bracket 250 is moved away from the upper end of the support column 200 and towards the window 204 as illustrated in FIG. 12), a lift force generated by the counterbalance mechanism 55 can be low. In this configuration, the indicator strip 256 can also move with the adjustment bracket 250 away from the upper end of the support column 200, and a portion of the indicator line 259 proximate the third side 253 of the indicator strip 256 (e.g., the indicator line 259 can be close to the first side 257) can be visible through the window 204 as illustrated in FIG. 16A.

In other example configurations, when the tension is increased on the one or more springs 260 (e.g., the adjustment bracket 250 is moved closer to the upper end of the support column 200 and away from the window 204 as illustrated in FIG. 13), a lift force generated by the counterbalance mechanism 55 can be high. In this configuration, the indicator strip 256 can also move with the adjustment bracket 250 towards the upper end of the support column 200, and a portion of the indicator line 259 proximate the fourth side 254 of the indicator strip 256 (e.g., the indicator line 259 can be farther away from to the first side 257) can be visible through the window 204 as illustrated in FIG. 16B.

In some example configurations, a magnitude of the lift force can be indicated by one or more numbers (e.g., numbers from 1 to 10) instead of an indicator line. The one or more numbers can be printed on the indicator strip 256, and depending on the spring adjustment, a number can be visible through the window 204. The number visible through the window 204 can be adapted to correspond to a level of adjustment (e.g., 1 being a lower lift force than 10).

In other configurations, a movement of the adjustment bracket 250 (and thus, a movement of the indicator strip 256) can be adapted to correlate to an actual lift force provided by the counterbalance mechanism 55. The movement of the adjustment bracket 250 can be an indication of the spring tension. The spring tension can be converted to a spring force using the spring parameters (e.g., spring stiffness, and initial tension). The calculated spring force can be converted to a lift force using the known cam and wheel geometry. The calculated lift force corresponding to a movement of the adjustment bracket 250 can be printed on the indicator strip 256, and it can be visible through the window 204.

The wheel assembly 235 can include a wheel 240 and a cam 245. In some example configurations, the wheel 240 and the cam 245 can be formed as integral parts of the wheel assembly 235. In other configurations, the wheel 240 and the cam 245 can be formed separately and coupled to each other to form the wheel assembly 235. An axle 283 can be coupled to the mounting bracket 280. The wheel assembly 235 can be coupled to the mounting bracket 280 through the axle 283. The wheel assembly 235 can be configured to rotate around the axle 283.

In an example configuration, the counterbalance mechanism 55 can include a tensile member 270 (e.g., a rope, wire, cord, or the like). One end of the rope 270 can be coupled to the connecting bracket 265. The rope 270 can engage with a portion of the wheel assembly 235 and extend towards an idler pulley 285 coupled to the top bracket 230 proximate the upper end of the support column 200. The rope 270 can further wrap around the idler pulley 285 to change direction and extend towards the lower end of the support column 200. A loop 275 can be formed at the other end of the rope 270. The loop 275 can be coupled to the truck assembly 70.

In another example configuration, the counterbalance mechanism 55 can include two or more tensile members as illustrated in FIGS. 13-14. For instance, a first tensile member 271 can be coupled between the cam 245 and the connecting bracket 265. A second tensile member 272 can have a loop 275 on one end. The loop 275 can be coupled to the truck assembly 70. The second tensile member 272 can be routed around the idler pulley 285 and the other end of the second tensile member 272 can be coupled to the wheel assembly 235.

FIG. 13 illustrates an orientation of the truck assembly 70 located proximate the upper end of the height adjustment range (e.g., the truck assembly 70 is proximate the upper end of the support column 200). In this orientation, the first tensile member 271 can be coupled between the connecting bracket 265 and the cam 245, and the second tensile member 272 can be coupled between the wheel 240 and the truck assembly 70 (e.g., the loop 275 located at the end of the second tensile member 272 can engage with a component, e.g., hook, of the truck assembly 70). In this orientation, the second tensile member 272 can be wrapped around the wheel 240.

FIG. 14 illustrates an orientation of the truck assembly 70 located proximate the lower end of the height adjustment range (e.g., the truck assembly 70 is proximate the lower end of the support column 200). As the truck assembly 70 translates towards the lower end of the height adjustment range, the loop 275 translates with the truck assembly 70, and thus, increasing the distance between the idler pulley 285 and the loop 275. Increased length of the second tensile member 272 between the idler pulley 285 and the loop 275 can be provided by the rotation (e.g., in clockwise direction) of the wheel assembly 235 (e.g., by unwrapping a portion of the second tensile member 272 that was wrapped around the wheel 240). The cam 245 can also rotate with the wheel assembly 235, therefore, a portion of the first tensile member 271 can be wrapped around the cam 245. Wrapping a portion of the first tensile member 271 can pull the connecting bracket 265 towards the wheel assembly 235 by further stretching the one or more springs 260 as illustrated in FIG. 14. Further stretching the springs 260 can increase the spring force. However, increasing spring force can be adapted to be converted to a constant lift force applied to the truck assembly 70 via the loop 275 by varying the radius of the cam 245 continuously at the contact point between the cam 245 and the first tensile member 271.

Referring again to FIG. 12, the one or more springs 260, the rope 270, and the wheel assembly 235 can cooperate to help counterbalance a force applied to the truck assembly 70. Counterbalancing the force applied to the truck assembly 70 can help maintain the amount of force required to translate the truck assembly 70 with respect to the support column 200. Stated another way, the counterbalance mechanism 55 can be adapted to support the truck assembly 70 such that the amount of force necessary to translate the truck assembly 70 with respect to the support column 200 remains substantially constant, despite increasing force created by the springs 260 during translation. Additionally, the counterbalance mechanism 55 can help maintain a position of the truck assembly 70 with respect to the support column 200, such as by providing a lift force equivalent to the combined weight of the truck assembly 70 and all the components coupled to it, including (but not limited to) one or more displays (shown in FIGS. 1-2).

In an example configuration, the truck assembly 70 can be operationally coupled to the counterbalance mechanism 55 and coupled to the electronic display 10 (shown in FIG. 1). The counterbalance mechanism 55 can help maintain the position (e.g., height) of the truck assembly 70 (and thereby the display 10) with respect to the desk surface 30. Moreover, if the user desires to change the position (e.g., raise or lower) of the display 10, the counterbalance mechanism 55 can help maintain the amount of force necessary to change the position of the truck assembly 70 (and thereby the display 10) such that the amount of force necessary to change the position of the truck assembly 70 with respect to the desk surface 30 can be substantially constant.

FIGS. 17-19 are perspective views of the base 20 according to an example configuration of the current disclosure. The base 20 can include a flat bottom surface 29. The bottom surface 29 can be adapted to be placed on a desk surface 30. The base 20 can include a front end 21 and a rear end 22. The front end 21 and the rear end 22 of the base 20 can be connected by right-side wall 23 and the left-side wall 24. In some example configurations, the base 20 can have a hollow portion 19 between the front end 21, the rear end 22, the right-side wall 23, and the left-side wall 24. One or more features can be formed in and around the hollow portion 19 of the base 20 to secure the cable management components (e.g., cable management bracket assembly 80 and cable management clip 85 of the display mounting system 100 of FIG. 3) as it will be apparent in the following sections of this disclosure.

In some example configurations, a first clip 26 can be formed proximate the rear end 22, and a second clip 28 can be formed proximate the front end 21 of the base 20. One or more recesses 27 can be formed on the left-side wall 24 of the base 20. The one or more recesses 27 can initiate from the bottom surface 29 of the base 20 and extend upwards into the left-side wall 24. The one or more recesses 27 can merge with the hollow portion 19 of the base 20. In some configurations, the one or more recesses 27 can also be formed on the right-side wall 23 of the base 20. A shallow cavity 18 can be formed proximate the rear end 22 of the base 20. One or more apertures 17 can be formed inside the shallow cavity 18. The shallow cavity 18 can be adapted to receive the lower end of the riser assembly 50 (e.g., the mounting bracket 280 of FIG. 12 can be located inside the shallow cavity 18). One or more screws (not shown) can be inserted through the one or more apertures 17 to engage with the mounting bracket 280 to secure the mounting bracket 280 to the base 20.

A clamp screw housing 205 can be located proximate the rear end of the base 20, and it can extend upwards from the base 20. In some example configurations, the clamp screw housing 205 can be formed as an integral part of the base 20. In other example configurations, the clamp screw housing 205 can be formed as a stand-alone component and coupled to the base 20 during the assembly process. In yet other configurations, the clamp screw housing 205 can be formed as an integral part of the support column 200.

One or more tabs (e.g., the first tab 206 and the second tab 207) can be formed on to the front face 208 of the support clamp screw housing 205. The one or more tabs 206 can be adapted to receive a portion of the rear face 202 of the support column 200. A portion of the rear face 202 of the support column 200 can be inserted between the one or more tabs 206 and the front face 208 of the clamp screw housing 205 to further secure the riser assembly 50 to the base 20.

FIG. 20 is a cross-sectional view of the lower end of the riser assembly 50. An L-shaped clamp bracket 25 can be coupled to the clamp screw housing 205. A clamp nut 295 can be fixedly attached to the clamp bracket 25. The clamp nut 295 can have a threaded hole. A clamp screw 290 can be coupled to the clamp screw housing 205. The clamp screw 290 can be threadingly engaged with the clamp nut 295. As the clamp screw 290 is rotated, the clamp bracket 25 can be pulled towards the bottom surface of the base 20. The base can be located proximate an edge of the desk surface 30. The edge of the desk surface 30 can be located between the base 20 and the L-shaped clamp bracket 25 as illustrated in FIG. 15 according to an example configuration of the current disclosure. The desk surface 30 can be clamped between the base 20 and the clamp bracket 25 to fixedly attach the riser assembly 50 proximate to the edge of the desk surface 30.

Figure 21:
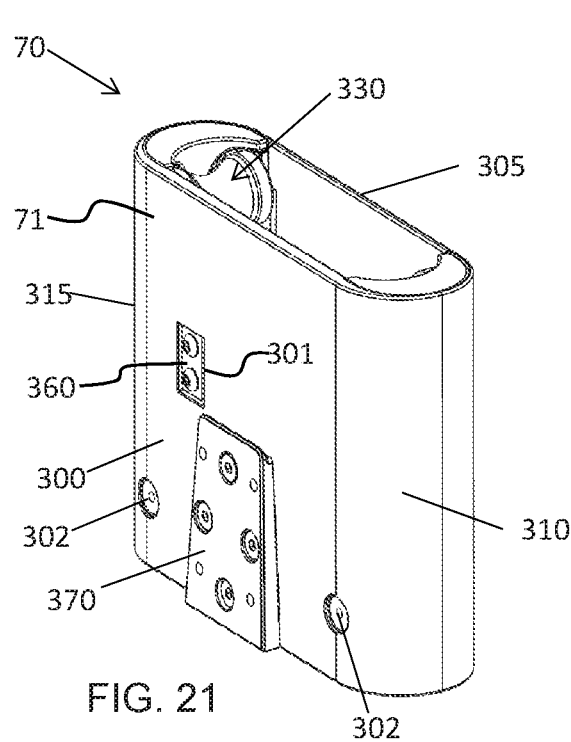
FIG. 21 is a perspective view of an example of a truck assembly.
Figure 22:
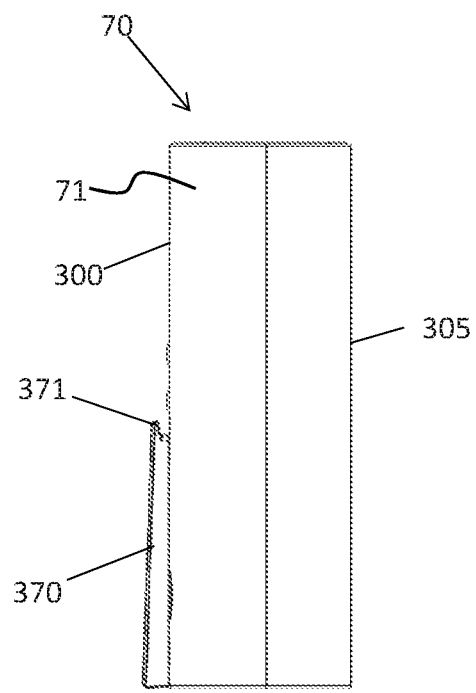
FIG. 22 is a side view of the truck assembly of FIG. 21.

FIGS. 21 and 22 are a perspective view and a side view of the truck assembly 70, respectively. The truck assembly 70 can include a truck body 71. The truck body 71 can include a front plate 300 and rear plate 305 opposite to the front plate 300. The truck body 71 can further include a first side plate 310 and a second side plate 315 opposite the first side plate 310. The first side plate 310 and the second side plate 315 can connect the front plate 300 and the rear plate 305. In some example configurations, the front plate 300 and the rear plate 305 can be substantially flat, and the first side plate 310 and the second side plate 315 can be substantially rounded. In some example configurations, the truck body 71 can be formed in one piece (e.g., the front plate 300, the rear plate 305, the first side plate 310, and the second side plate 315 can be formed as an integral parts of the truck body 71). In other configurations, the front plate 300, the rear plate 305, the first side plate 310, and the second side plate 315 can be formed separately and they can be configured to be coupled together during the assembly process to form the truck body 71.

In some example configurations, one or more threaded holes 302 can be formed on the truck body 71 (for example, threaded holes 302 can be formed over the front plate 300). The one or more threaded holes 302 can be used to couple the cable management bracket assembly 80 to the truck assembly 70. The one or more threaded holes 302 can be located proximate to the first 310 and the second side 315 plates to couple the cable management bracket assembly 80 to either side of the truck body 71.

Figure 23:
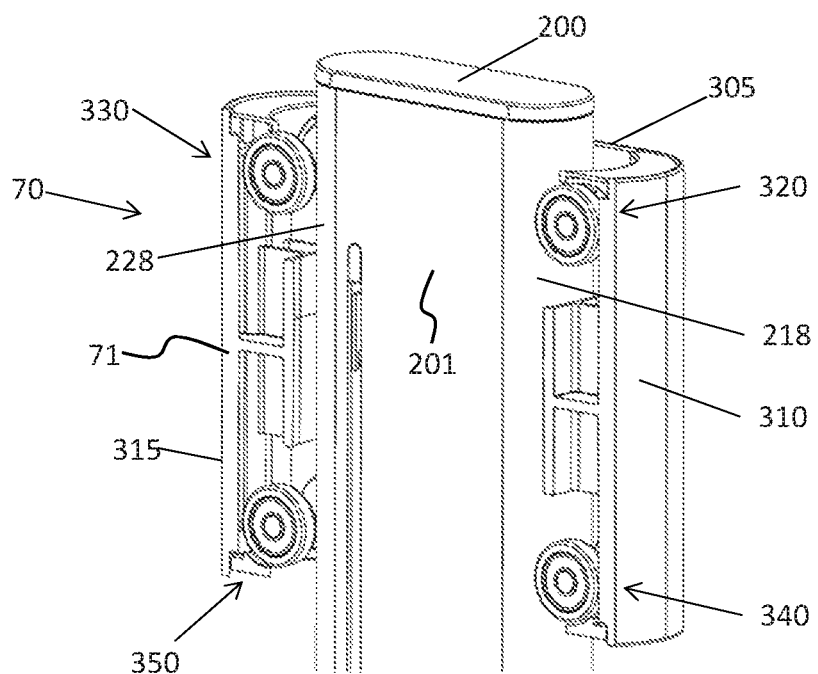
FIG. 23 is a perspective view of the riser and truck assembly of FIG. 11.
Figure 24:
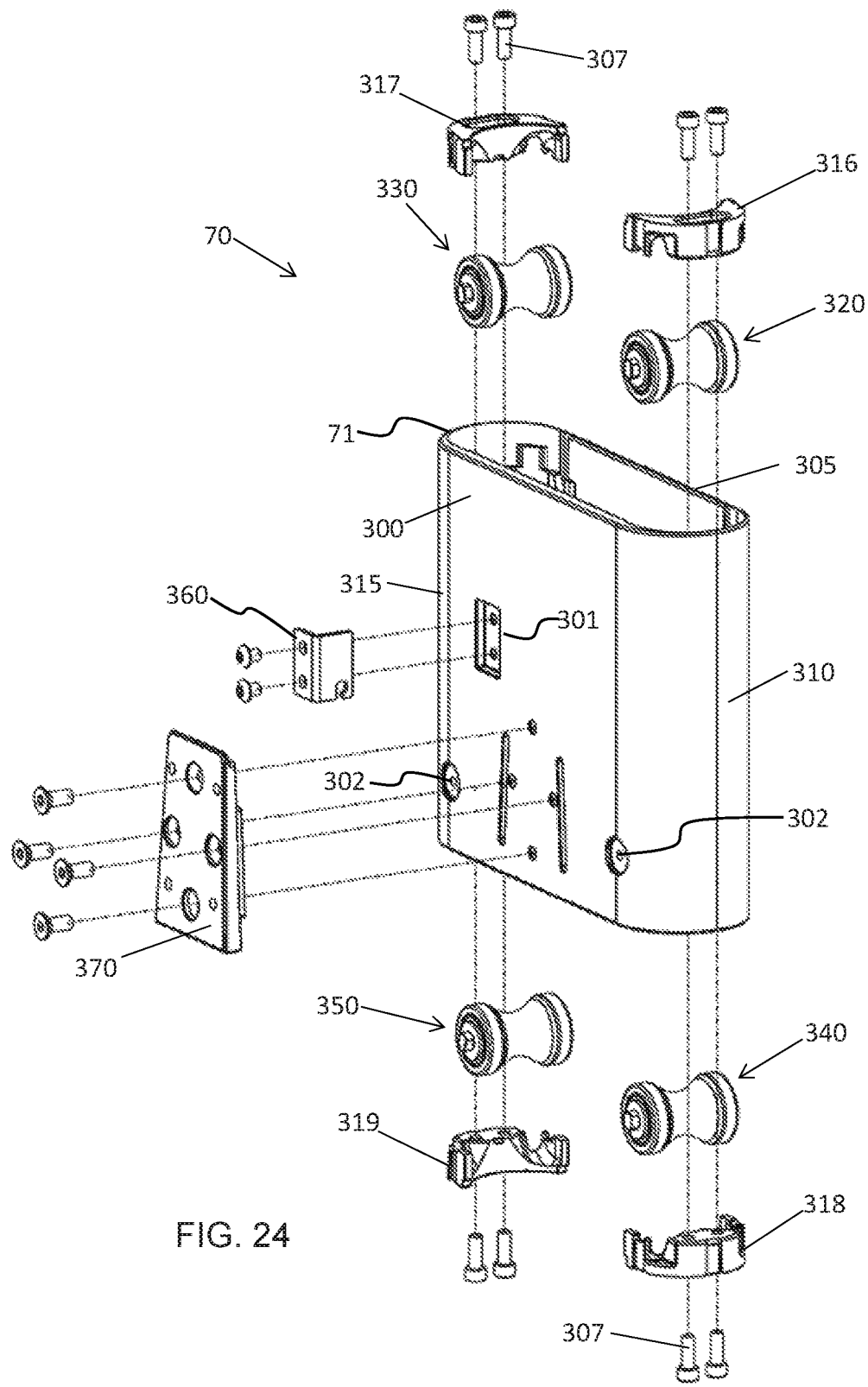
FIG. 24 is an exploded view of the truck assembly of FIG. 21.

FIGS. 23 and 24 are a perspective view and an exploded view of the truck assembly 70, respectively. FIG. 23 shows a partial cross-section of the truck assembly 70 to show the internal components. The truck assembly 70 can include a first wheel assembly 320, a second wheel assembly 330, a third wheel assembly 340, and a fourth wheel assembly 350. Wheel assemblies 320, 330, 340, and 340 can be coupled to the truck body 71. The first wheel assembly 320 and the third wheel assembly 340 can be located on one side of the support column 200. The first wheel assembly 320 and the third wheel assembly 340 can be configured to be in contact with the first guide surface 218 of the support column 200. The second wheel assembly 330 and the fourth wheel assembly 350 can be located on the other side of the support column 200. The second wheel assembly 330 and the fourth wheel assembly 350 can be configured to be in contact with the second guide surface 228 of the support column 200. The wheel assemblies 320, 330, 340, and 350 can guide the truck assembly 70 over the support column 200 during the translation of the truck assembly 70 relative to the support column 200.

The truck assembly 70 can further include a hook bracket 360 and an arm attachment bracket 370. The hook bracket 360 can be fixedly attached to the front plate 300 of the truck body 71. An aperture 301 can be formed on the front plate 300. The hook bracket 360 can be formed in various shapes (e.g., an L-shape as illustrated in FIG. 24). One end of the hook bracket 360 can be inserted through the aperture 301 to penetrate into the space between the front plate 300 and the rear plate 305.

In an example configuration, the hook bracket 360 can be inserted through the slot 203 located on the front face 201 of the support column 200 when the riser assembly 50 is coupled with the truck assembly 70 as shown in FIG. 9. The hook bracket 360 can be configured to be coupled to the loop 275 of the tensile member 270 to provide lift assist for the truck assembly 70. The rope 270 can lift the truck assembly 70 towards the upper end of the support column 200. A counterbalancing force created by the counterbalance mechanism 55 can be applied to the truck assembly 70 to counter at least a portion of the combined weight of the truck assembly 70 and all the components (e.g., an electronic display 10 of FIG. 1, and others) coupled to the truck assembly 70.

The arm attachment bracket 370 can be fixedly attached to the front plate 300 of the truck assembly 70. A tip 371 can be formed on the upper end of the arm attachment bracket 370. The tip 371 can be useful to couple the arm assembly 60 to the truck assembly 70 as it will be apparent in the following sections.

Figure 25:
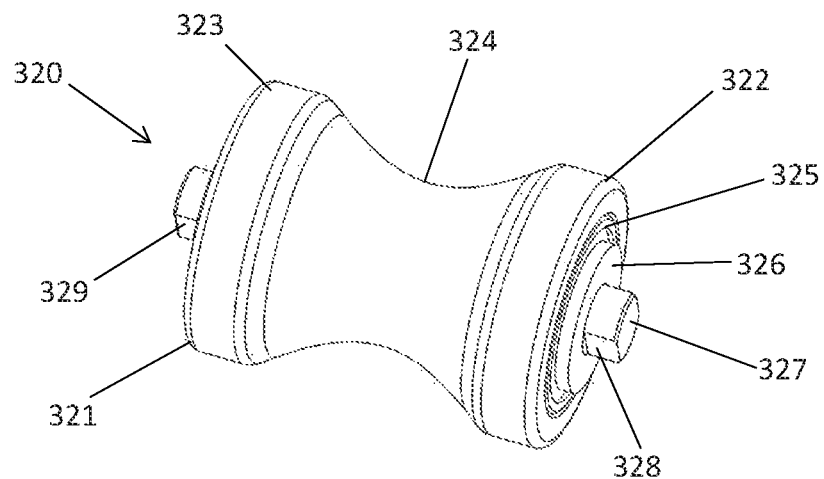
FIG. 25 is a perspective view of an example of a wheel assembly.
Figure 26:
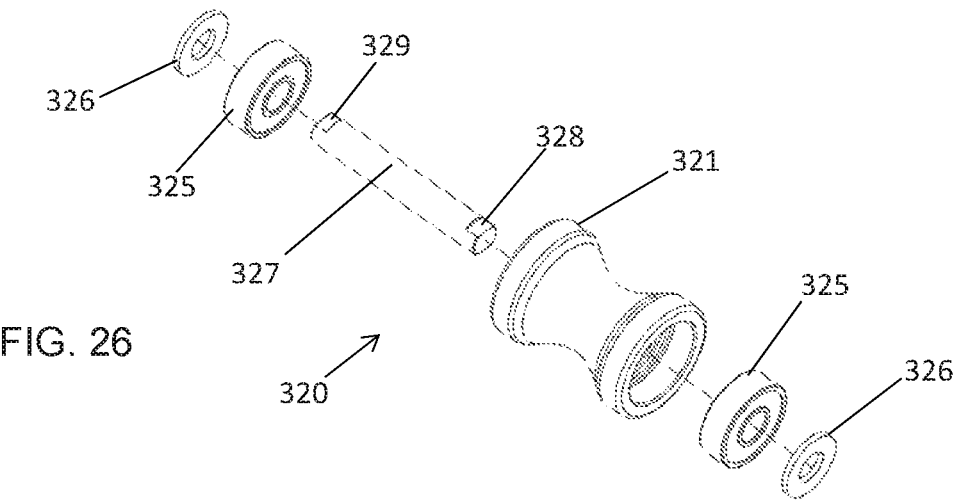
FIG. 26 is an exploded view of the wheel assembly of FIG. 25.

FIGS. 25 and 26 are a perspective view and an exploded view of the first wheel assembly 320, respectively. In an example configuration, the first wheel assembly 320 can have a first wheel 321, one or more bearings 325, and an axle 327. The first wheel can have a first end 322 and a second end 323. The first wheel 321 can have an opening along its axis between the first end 322 and the second end 323. An outside diameter of the first wheel 321 can vary between the first end 322 and the second end 323. The first wheel 321 can have a larger outside wheel diameter proximate to the first end 322 and the second end 323 as shown in FIG. 25. The first wheel 321 can have a concave profile 324 between the first end 322 and the second end 323. In some example configurations, the smaller wheel diameter can be located proximate the center of the first wheel 321. The concave profile 324 of the first wheel 321 can approximately match the outside profile of the first guide surface 218.

All wheel assemblies can be constructed the same as the first wheel assembly 320. Wheel assemblies can include wheels having an outside profile to match the shape of the guide surfaces located on the sides of the support column 200. Outside profile of the wheels can be any shape including (but not limited to) tapered, round, oval, flat, and others.

In an example configuration, the one or more bearings 325 can be placed inside the first wheel 321 proximate the first end 322 and the second end 323. An outside diameter of the bearing 325 can be tight fit to an inside diameter of the first wheel 321. The one or more bearings 325 can have a center opening. An axle 327 can be inserted through the openings on the one or more bearings 325. The axle 327 can be partially located inside the center opening of the first wheel 321. The axle 327 can form the rotation axis for the wheel assembly 320. The one or more bearings 325 can provide rotation assistance for the wheel assembly 320 during the translation of the truck assembly 70 relative to the support column 200. In other example configurations, the first wheel assembly 320 can be built without having the one or more bearings 325. Flat bushings or grease can be applied to an inside diameter of the first wheel 321 (e.g., at the first wheel and axle interface) to reduce the friction and provide rotation assistance.

The axle 327 can have a round cross-section in its middle section. The first wheel 321 and the one or more bearings 325 can be located over the middle section of the axle 327. IN an example configuration, at least one flat section (e.g., a first flat section 328 and a second flat section 329) can be formed proximate to one or both ends of the axle 327. At least one flat section (e.g., the first flat section 328) can extend out of the bearing 325 as illustrated in FIG. 25.

Figure 27:
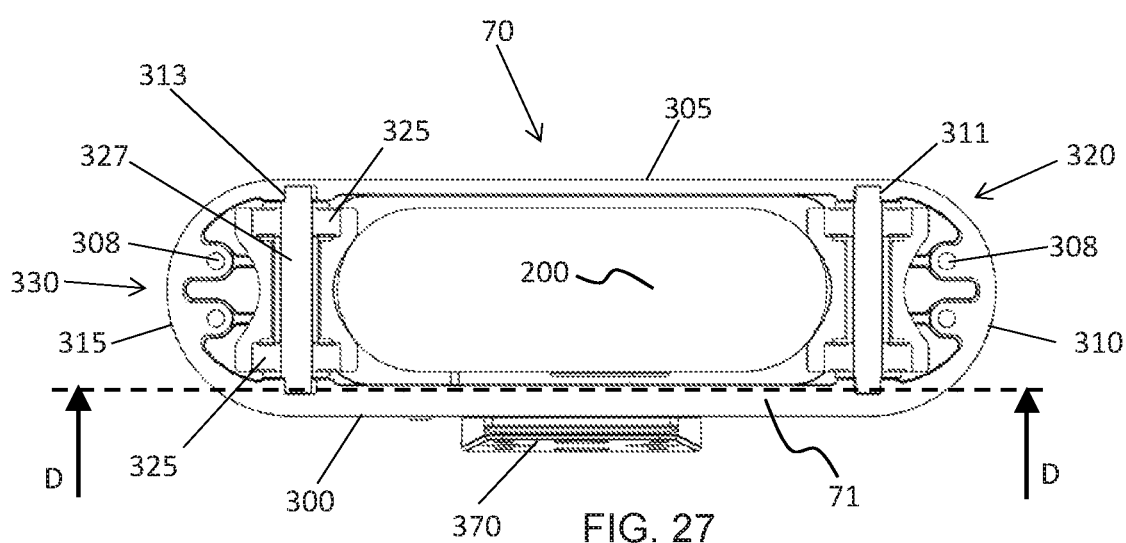
FIG. 27 is a top view of the riser and the truck assembly as it is viewed according to the cross-section B-B of FIG. 15.
Figure 28:
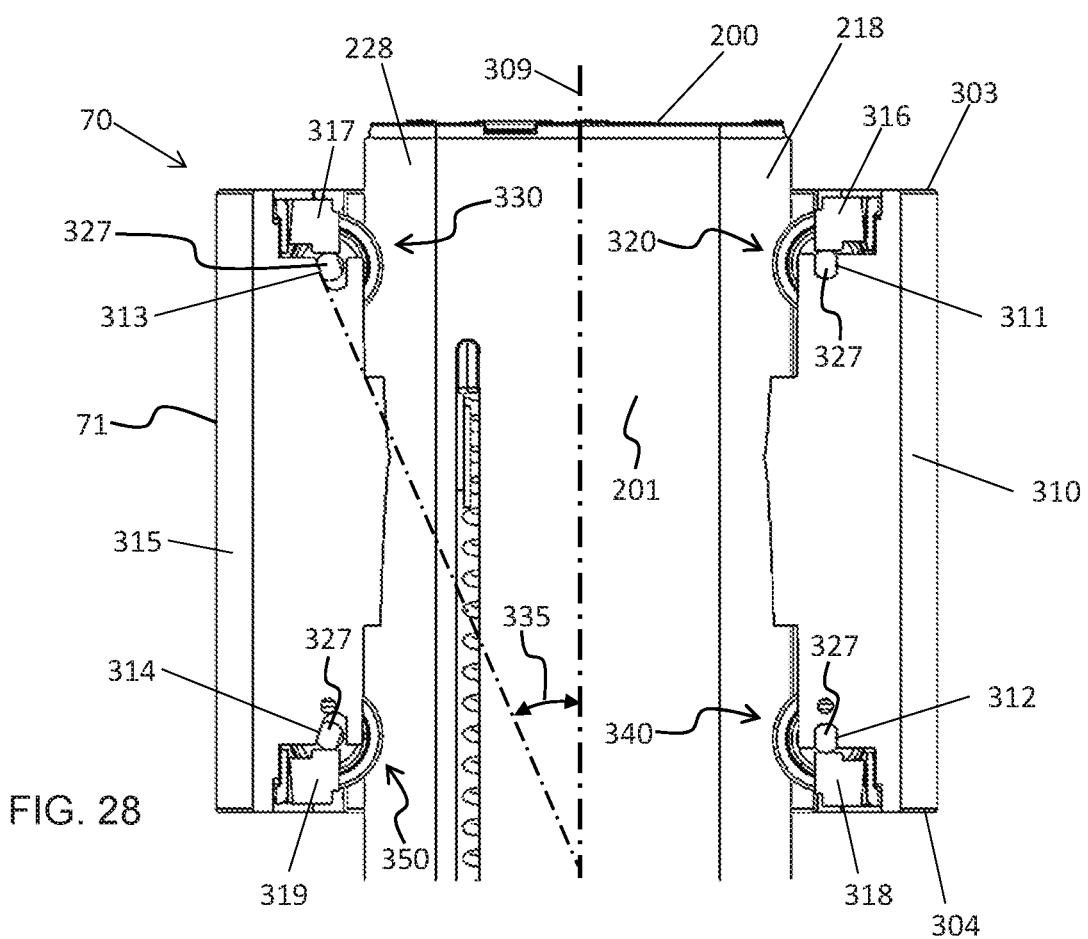
FIG. 28 is a front view of the upper portion of the riser and truck assembly as it is viewed according to the cross-section D-D of FIG. 27.

FIG. 27 is a cross-sectional top view of the truck assembly 70. FIG. 28 is a cross-sectional front view of the truck assembly 70. The truck body 71 can be formed as an elongated hollow body including the front plate 300, the rear plate 305, the first side plate 310, and the second side plate 315. The truck body 71 can be an elongated structure (e.g., it can be elongated in an axial direction 309) between an upper end 303 and a lower end 304. The axial direction 309 of the truck body 71 and the axial direction 209 of the support column 200 can be parallel.

In an example configuration, the support column 200 can be located inside the hollow section of the truck body 71 as illustrated in FIG. 27. The first wheel assembly 320 and the third wheel assembly 340 can be coupled to the truck body 71 proximate the first side plate 310. The third wheel assembly 330 and the fourth wheel assembly 350 can be coupled to the truck body 71 proximate the second side plate 315 as illustrated in FIG. 28. The concave profile 324 of the wheel (e.g., the first wheel 321) can substantially match the outside profile of the guide surface (e.g., the first guide surface 218).

A first set of slots 311-312 and a second set of slots 313-314 can be formed into the front plate 300 and the rear plate 305 of the truck body 71 proximate the first side plate 310 and the second side plate 315, respectively. The first set of slots 311 and 312 can be separated from each other in the axial direction 309 of the truck body 71 and they can be formed proximate the upper end 303 and the lower end 304 of the truck body 71, respectively. Similarly, the second set of slots 313 and 314 can be separated from each other in the axial direction 309 of the truck body 71 and they can be formed proximate the upper end 303 and the lower end 304 of the truck body 71, respectively. The first flat section 328 and the second flat section 329 of the axle 327 can be configured to fit inside the first set of slots (e.g., slots 311-312) and the second set of slots (e.g., slots 313-314).

The first set of slots (e.g., slots 311-312) can be configured as a tight fit around the first flat section 328 and the second flat section 329 of the axle 327. After the axle 327 is inserted in to the first set of slots, the axle 327 cannot move relative to the truck body 71. The second set of slots (e.g., slots 313-314) can include at least one edge that can be built at an angle 335 with the axial direction 309 of the truck body 71 as illustrated in FIG. 28. There can be a clearance inside the second set of slots 313-314 such that when the axle 327 is translated against the inclined edge (e.g., against the inclined edge of the slot 313), the axle 327, and thus, the wheel assembly (e.g., second wheel assembly 330) can be translated towards the center of the truck body 71.

The truck body 71 can further include one or more apertures 308 proximate the first side plate 310 and the second side plate 315. The one or more apertures 308 can be formed proximate to upper end 303 and the lower end 304 of the truck body 71. In some example configurations, the one or more apertures can be elongated along the entire length of the truck body 71 from the upper end 303 to the lower end 304.

Figure 29:
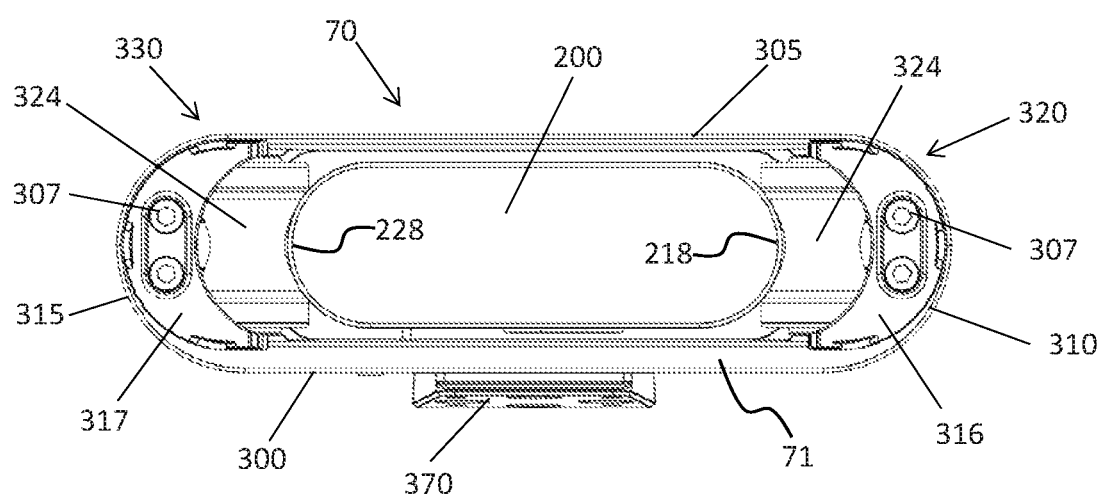
FIG. 29 is a top view of the riser and the truck assembly of FIG. 9.

FIG. 29 is a top view of the truck assembly 70. The support column 200 can be located inside the hollow section of the truck body 71. The truck assembly can further include a first clamp 316, a second clamp 317, a third clamp 318, and a fourth clamp 319. The first clamp 316, the second clamp 317, the third clamp 318, and the fourth clamp 319 can be configured to secure the first wheel assembly 320, the second wheel assembly 330, the third wheel assembly 340, and the fourth wheel assembly 350 on to the truck body 71, respectively. One or more screws 307 can be inserted through one or more apertures (not shown) located on the clamps (e.g., the first clamp 316). The one or more screws 307 can threadingly engage with the one or more apertures 308 located on the truck body 71 to press the clamps (e.g., the first clamp 316) on to the truck body 71.

A section of the clamps (e.g., the first clamp 316) can be configured to press against the axle 327 to trap the axle inside the slots (e.g., the first slot 311). During the assembly, the first wheel assembly 320 and the third wheel assembly 340 can be securely coupled to the truck body 71 by using the first clamp 316 and the third clamp 318, respectively. The support column 200 can be inserted into the hollow section of the truck body 71 between the wheel assemblies. The first guiding surface 218 of the support column 200 can be rested against the concave surfaces 324 of the first 320 and the third 340 wheel assemblies. Then, the screws 307 coupled to the second clamp 317 and the fourth clamp 319 can be tightened to press the second 317 and the fourth 319 clamps against the axles 327 of the second 330 and fourth 350 wheel assemblies, respectively. The axles 327 of the second 330 and fourth 350 wheel assemblies can translate against the inclined edges of slots 313 and 314, and thus, the second 330 and fourth 350 wheel assemblies can translate towards the center of the truck body 71 until the concave surfaces 324 of the second 330 and the fourth 350 wheel assemblies contact the second guiding surface 228 of the support column 200.

Figure 30:
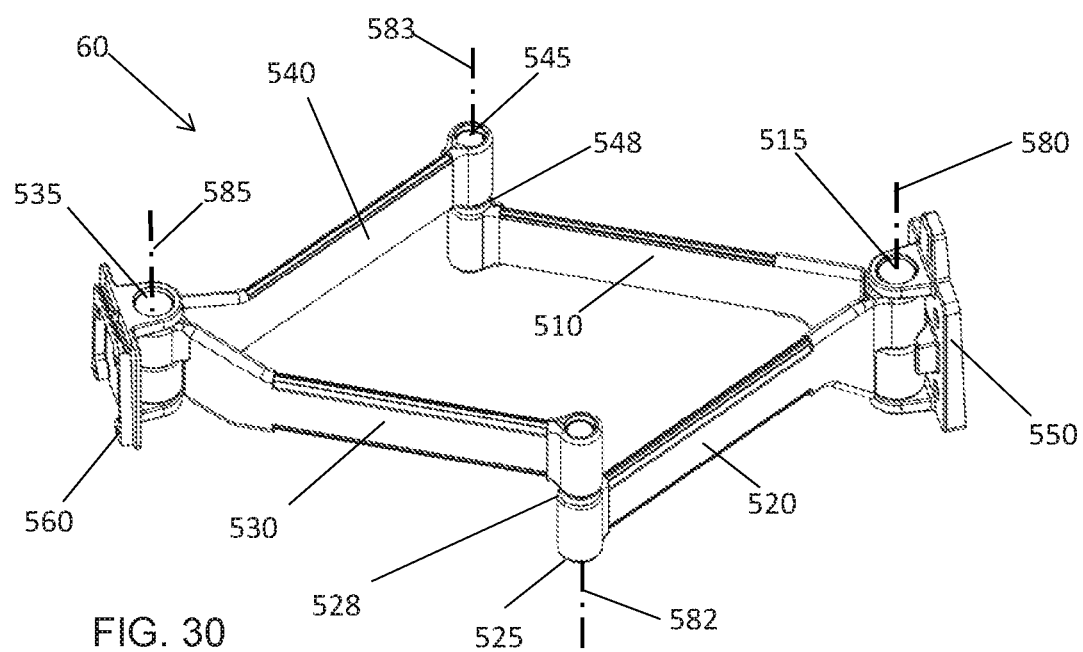
FIG. 30 is a perspective view of an example of an arm assembly.
Figure 31:
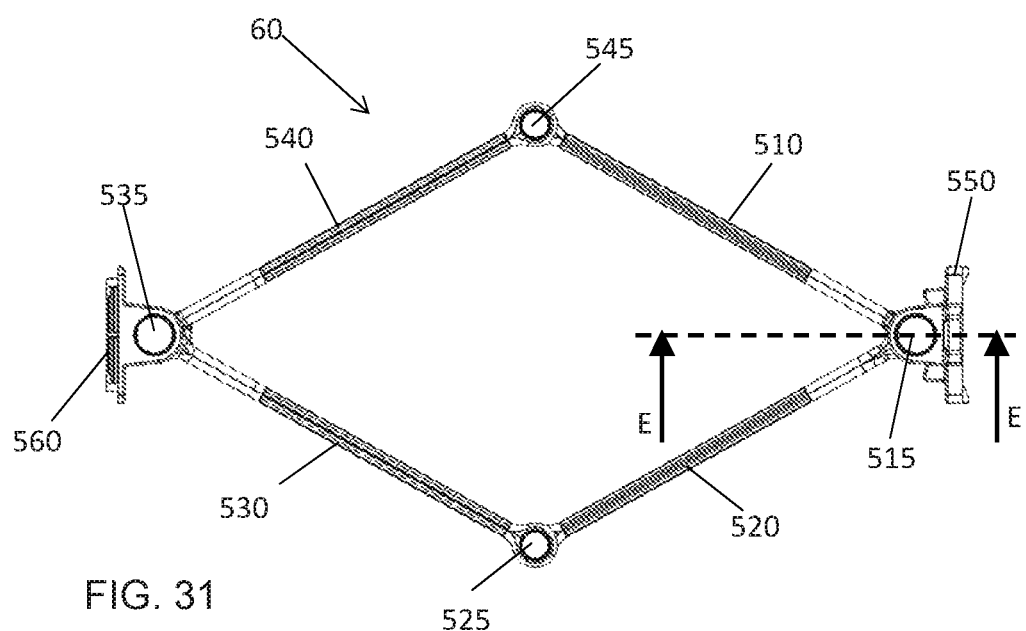
FIG. 31 is a top view of the arm assembly of FIG. 30.
Figure 32:
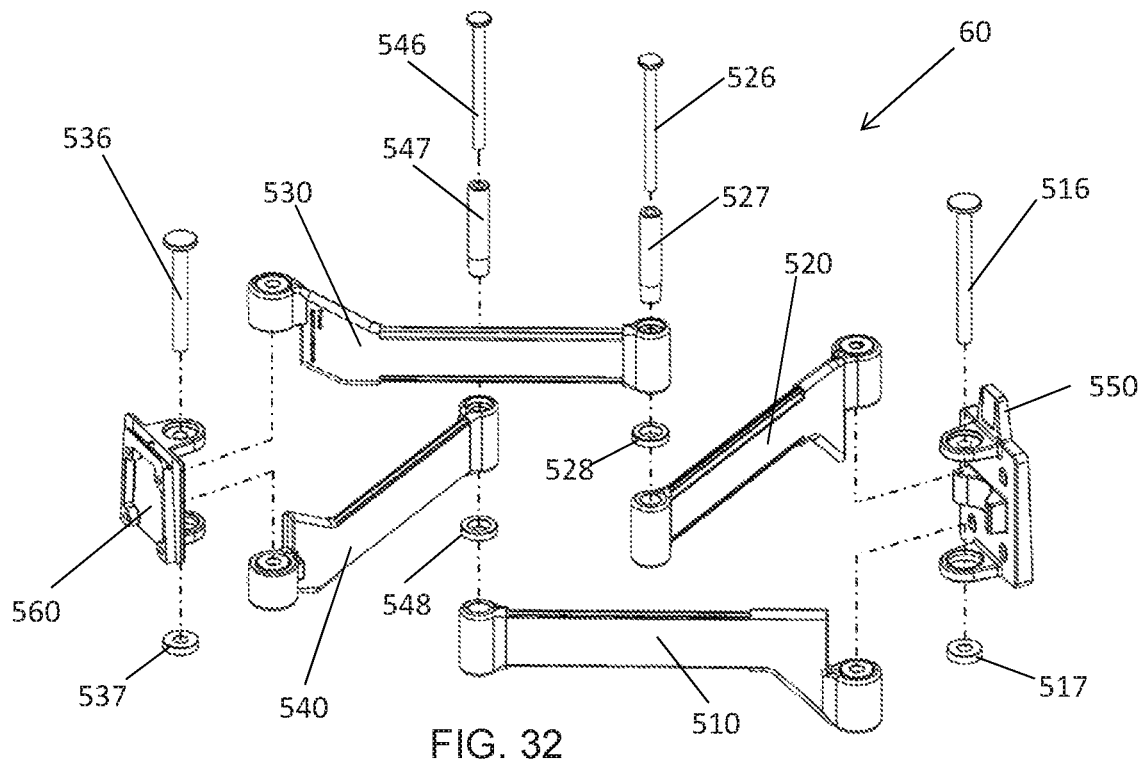
FIG. 32 is an exploded view of the arm assembly of FIG. 30.

FIGS. 30-31 show a perspective view and top view of the arm assembly 60 of FIG. 5 in an expanded configuration, respectively. FIG. 32 is an exploded view of the main components of the arm assembly 60. The arm assembly 60 can include a first arm 510, a second arm 520, a third arm 530, and a fourth arm 540. The arm assembly 60 can further include a rear bracket 550 and a front bracket 560. The first arm 510 and the second arm 520 can be rotatingly coupled to the rear bracket 550 (e.g., at a first hinge 515), and the third arm 530 and the fourth arm 540 can be rotatingly coupled to the front bracket 560 (e.g., at a third hinge 535.)

In some example configurations, the first arm 510 and the second arm 520 can be configured to rotate relative to the rear bracket 550 around the same axis (e.g., a first axis 580). In other example configurations, the first arm 510 and the second arm 520 can be configured to rotate relative to the rear bracket 550 around two separate axes (not shown) that can be away from each other. Similarly, in some example configurations, the third arm 530 and the fourth arm 540 can be configured to rotate relative to the front bracket 560 around the same axis (e.g., a third axis 585). In other example configurations, the third arm 530 and the fourth arm 540 can be configured to rotate relative to the front bracket 560 around two separate axes (not shown) that can be away from each other.

The second arm 520 and the third arm 530 can be rotatingly coupled at a second hinge 525. The second arm 520 and the third arm 530 can be configured to rotate relative to each other around a second axis 582. The first arm 510 and the fourth arm 540 can be rotatingly coupled at a fourth hinge 545. The first arm 510 and the fourth arm 540 can be configured to rotate relative to each other around a fourth axis 583. The first axis 580, the second axis 582, the third axis 585, and the fourth axis 583 can be parallel to the axial direction 209 of the support column 200 of FIG. 11.

In some example configurations, the rear bracket 550 of the arm assembly 60 can be coupled to a height adjustable truck assembly (e.g., the truck assembly 70 of FIG. 3). Accordingly, the first arm 510 and the second arm 520 can be rotatably coupled to the truck assembly 70 (e.g., at the first hinge 515). In other configurations, the rear bracket 550 can be built an integral part of the front plate 300 of the truck assembly 70.

Figure 33:
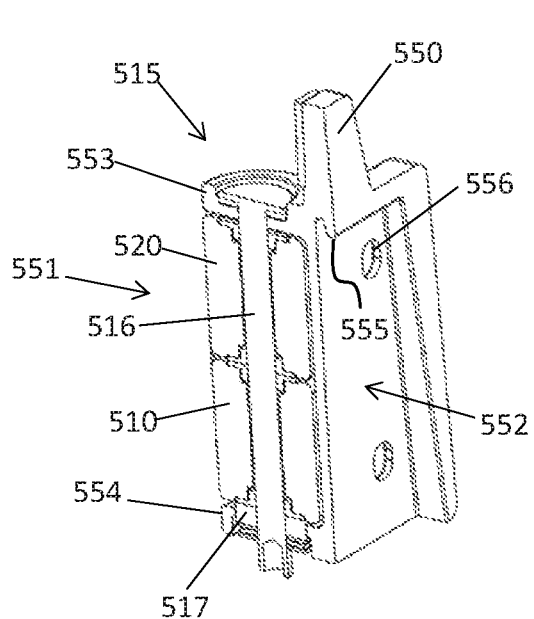
FIG. 33 is a close-up view of the rear end of the arm assembly of FIG. 30 as it is viewed according to the cross-section E-E of FIG. 31.
Figure 34:
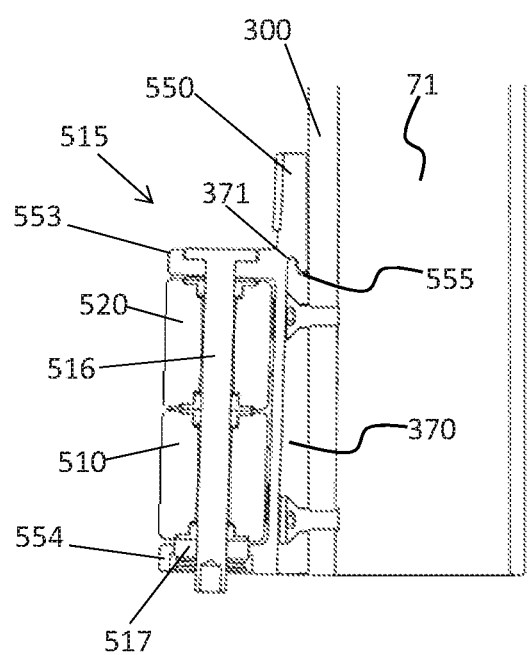
FIG. 34 is a close-up view of the rear end of the arm assembly of FIG. 30 coupled to the truck assembly as it is viewed according to the cross-section E-E of FIG. 31.

FIG. 33 is a cross-sectional view of the first hinge 515, and FIG. 34 is a cross-sectional view of the first hinge 515 as the rear bracket 550 is coupled to the arm attachment bracket 370 of the truck assembly 70 of FIG. 7. The rear bracket 550 can have a front portion 551 and a rear portion 552. The rear portion 552 can be configured to be coupled to the arm attachment bracket 370. The front portion 551 can include a first bracket 553 and a second bracket 554 extending from the body of the rear bracket 550 in transverse direction. The first bracket 553 and the second bracket 554 can be parallel to each other and they can be spaced apart from each other. In some example configurations, the first bracket 553 and the second bracket 554 can be formed as an integral part of the rear bracket 550. In other configurations, the first bracket 553 and the second bracket 554 can be formed separately, and they can be coupled to the rear bracket 550 during the assembly operation.

One end of the first arm 510 and the second arm 520 can be placed between the first bracket 553 and the second bracket 554 of the rear bracket 550 in stacked up fashion as illustrated in FIG. 33. A known mechanical component 516 (e.g., a rivet, screw, or the like) can be inserted through apertures located on the first bracket 553, the first arm 510, the second arm 520, and the second bracket 554 to form the first hinge 515. In some example configurations, a hollow bushing 517 can be located inside the second bracket 554 to provide support for the first hinge 515.

In some configurations, an elongated first ridge 555 can be formed on the rear portion 552 of the rear bracket 550. The first ridge 555 can be adapted to engage with the tip 371 of the arm attachment bracket 370 as illustrated in FIG. 34. One or more apertures 556 can be formed on the rear portion 552 of the rear bracket 550. One or more mechanical fasteners (e.g., screws) can be inserted through one or more apertures 556. The one or more mechanical fasteners can engage with the arm attachment bracket 370 to secure the rear bracket 550 on the arm attachment bracket 370.

Figure 35:
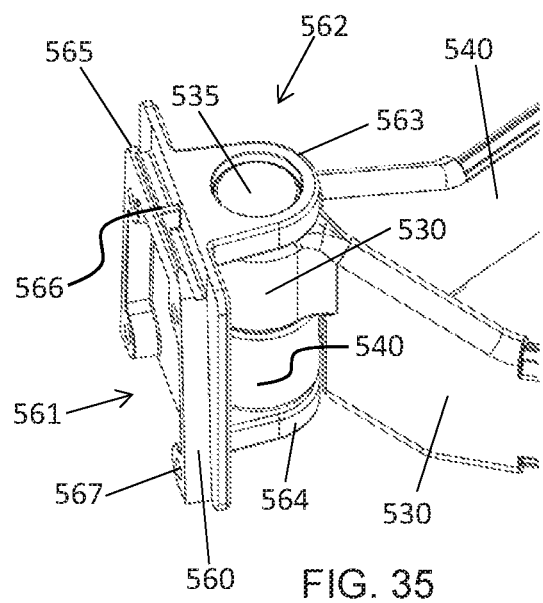
FIG. 35 is a close-up perspective view of the front end of the arm assembly of FIG. 30.

FIG. 35 is a close-up perspective view of the third hinge 535. The front bracket 560 can have a front portion 561 and a rear portion 562. The front portion 561 can be configured to be coupled to a display mounting assembly (e.g., the tilt assembly 40 of FIG. 4). The rear portion 562 can include a first bracket 563 and a second bracket 564 extending from the body of the front bracket 560 in transverse direction. The first bracket 563 and the second bracket 564 can be parallel to each other and they can be spaced apart from each other. In some example configurations, the first bracket 563 and the second bracket 564 can be formed as an integral part of the front bracket 560. In other configurations, the first bracket 563 and the second bracket 564 can be formed separately, and they can be attached to the front bracket 560 during the assembly operation.

One end of the third arm 530 and the fourth arm 540 can be placed between the first bracket 563 and the second bracket 564 of the front bracket 560 in stacked up fashion as illustrated in FIG. 35. A known mechanical fastener 536 (e.g., a rivet, screw, or the like) can be inserted through apertures located on the first bracket 563, the third arm 530, the fourth arm 540, and the second bracket 564 to form the third hinge 535. In some example configurations, a hollow bushing 537 can be located inside the second bracket 564 to provide support for the third hinge 535.

In some example configurations, the front portion 561 of the front bracket 560 can include an elongated second ridge 565 proximate the upper end of the front bracket 560. A bead 566 can be formed in transverse direction to the second ridge 565. The bead 566 can be connected the second ridge 565 to divide the second ridge 565 in to two sections along its length. The front portion 561 of the front bracket can further include one or more threaded holes 567. The second ridge 565, the bead 566 and the one or more threaded holes 567 can be useful for coupling a display mounting assembly (e.g., the tilt assembly 40 of FIG. 4) to the front bracket 560 as it will be apparent in the following sections of this disclosure.

In some example configurations, a display mounting assembly (e.g., the tilt assembly 40 and the display attachment bracket 45 of FIG. 3, or the tilt assembly 35 and the bow assembly 90 of FIG. 5) can be coupled to the front bracket 560. The rear bracket 550 can be coupled to the truck assembly 70 of the display mounting system 100. The display mounting system 100 can be configured to change an orientation of the one or more displays (e.g., display 10 of FIG. 1, or displays 11-12 of FIG. 2) coupled to the display mounting system 100.

Figure 36:
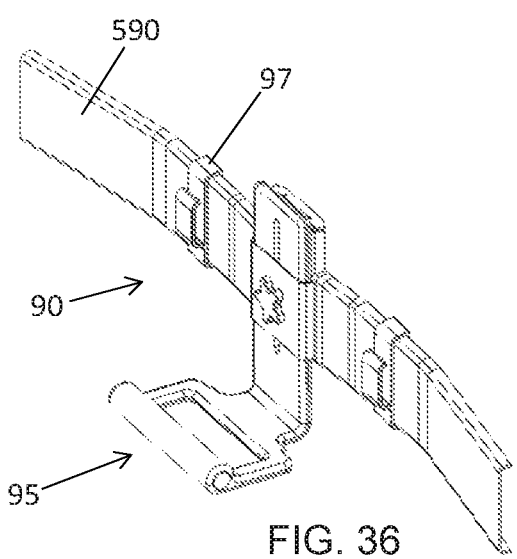
FIG. 36 is a perspective view of an example of a bow assembly.
Figure 37:
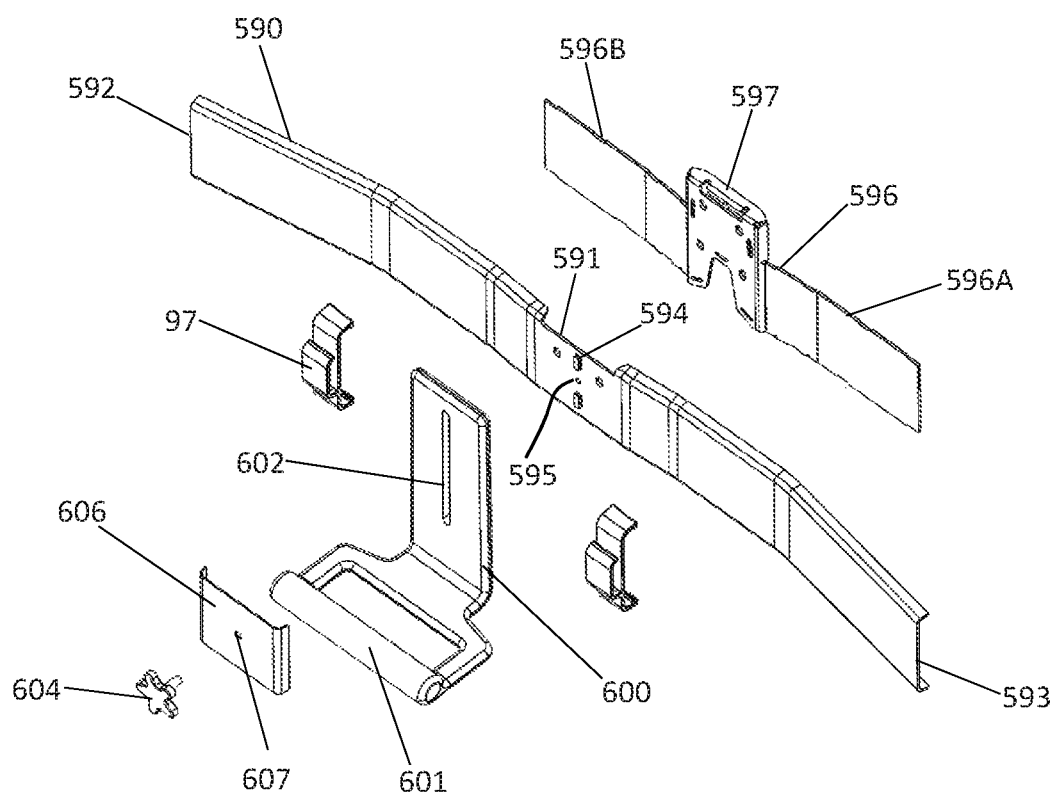
FIG. 37 is an exploded view of the bow assembly of FIG. 36.

FIGS. 36 and 37 are a perspective view and an exploded view of the bow assembly 90, respectively, according to an example configuration of the current disclosure. The bow assembly 90 can include a crossbar 590. The crossbar 590 can be an elongated component between a first end 592 and a second end 593. The crossbar 590 can be formed in various shapes (including one or more flat sections, one or more curved sections, or a combination of one or more flat and curved sections) between the first end 592 and the second end 593. In some example configurations, a recess 591 can be formed into the crossbar 590 proximate to its center. The front bracket 560 can be configured to be at least partially located inside the recess 591 when the bow assembly 90 is coupled to the arm assembly 70.

The crossbar 590 can be formed in various cross-sections (e.g., U-shaped as illustrated in FIGS. 36-37, C-shaped, oval, flat, or the like). The crossbar 590 can be formed from various materials known in engineering (e.g., stamped sheet metal, cast aluminum, fiber reinforced plastic, or the like).

In some example configurations, the bow assembly 90 can include a stiffener bracket 596. The stiffener bracket can have a center portion 597 and side wings 596A and 596B. The side wings 596A and 596B can be coupled to the center portion 597 of the stiffener bracket 596. The center portion 597 of the stiffener bracket 596 can be located proximate the center of the crossbar 590 (e.g., at least partially located inside the recess 591). The side wings 596A and 596B can be located inside the cross-section of the crossbar 590. The crossbar 590 and the stiffener bracket 596 can be coupled by various methods known in engineering (e.g., welding, mechanical fasteners, or the like).

In some example configurations, the bow assembly 90 can include a handle assembly 95. The handle assembly 95 can provide assistance for the user of the display mounting system 100 to easily change an orientation of the displays coupled to the display mounting system 100.

The handle assembly 95 can be coupled to the crossbar 590 proximate to its center. The handle assembly 95 can include a handle bracket 600, a brace 606, and a knob 604. The handle bracket 600 can be formed in any shape (e.g., L-shape as illustrated in FIG. 37).

The crossbar 590 can further include one or more bosses 594 and a threaded hole 595 formed proximate to its center (e.g., across the recess 591). An elongated slot 602 can be formed on the handle bracket 600. In an assembled configuration, the one or more bosses 594 of the crossbar 590 can be located inside the elongated slot 602 of the handle bracket 600. The handle bracket 600 can translate relative to the crossbar 590 along the elongated slot 602.

The handle assembly 95 can include a brace 606. The brace 606 can be formed in any cross-section (e.g., U-shaped). The handle bracket 600 can be at least partially located inside the cross-section of the brace 606. The brace 606 can include an aperture 607. In some example configurations, the handle assembly 95 can further include a knob 604. The knob 604 can include a handle portion and a threaded boss coupled to the handle portion. The threaded boss of the knob 604 can be inserted through the aperture 607 of the brace 606 and it can be inserted through the elongated slot 602 of the handle bracket 600. The threaded boss of the knob 604 can threadingly engage with the threaded hole 595 of the crossbar 590 to secure the handle assembly 95 to the crossbar 590.

The handle assembly 95 can include a user interface portion 601. The user interface portion 601 can be coupled to the handle bracket 600. In an assembled configuration, the user interface portion 601 can be exposed below the one or more displays coupled to the bow assembly 90. User can easily access the user interface portion to change an orientation of the one or more displays coupled to the display mounting system 100.

The bow assembly 90 can further include one or more clips 97. The one or more clips 97 can be coupled to the crossbar 590. One or more cables (e.g., power cables, video cables, or the like) connected to the one or more displays can be coupled to the one or more clips 97 to route the one or more cables along the crossbar 590. The one or more clips 97 can be formed to match the profile of the crossbar 590. The one or more clips 97 can be adapted to be coupled to the crossbar 590 anywhere along the length of the crossbar 590.

Figure 38:
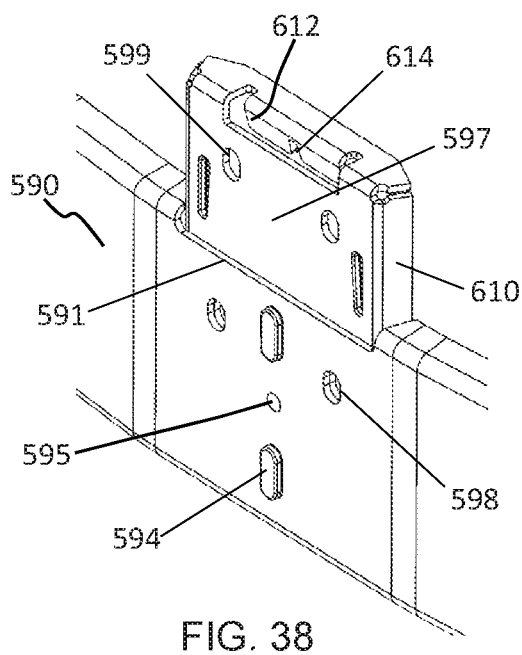
FIG. 38 is a close-up view of the center portion of the crossbow of the bow assembly of FIG. 36.
Figure 39:
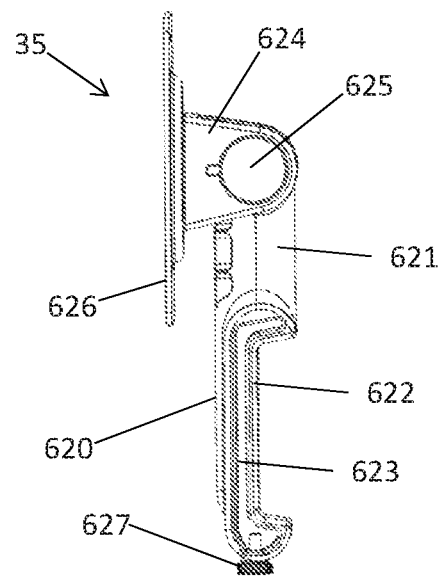
FIG. 39 is a side view of an example of a tilt assembly.
Figure 40:
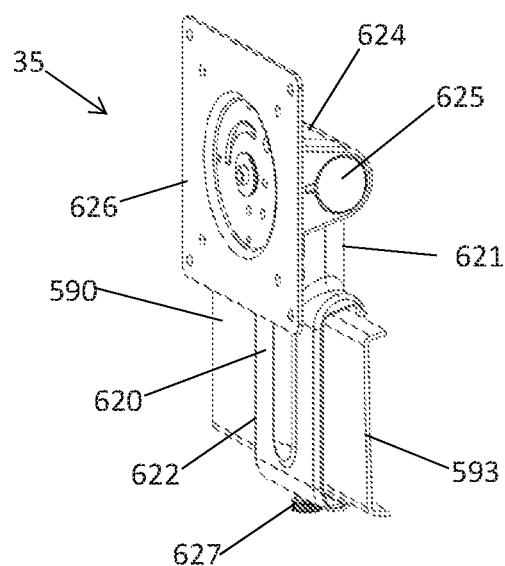
FIG. 40 is a perspective view of the tilt assembly of FIG. 39 as it is coupled to the crossbow of the bow assembly of FIG. 36.

FIG. 38 is a close-up view of the center portion of the bow assembly 90. The center portion 597 of the stiffening bracket 590 can at least partially overlap with the crossbar 590. An upper section 610 of the center portion 597 of the stiffening bracket 596 can extend above the crossbar 590. One or more apertures 599 can be formed on the center portion 597 of the stiffening bracket 596, and one or more apertures 598 can be formed on the crossbar 590 proximate to its center. In some example configurations, at least some apertures 598 located on the crossbar 590 can overlap with at least some of the apertures 599 located on the center portion 597 of the stiffening bracket 596.

In some example configurations, a tab 612 can be formed in the upper section 610 of the center portion 597 of the stiffening bracket 596. The tab 612 can be formed in an angle from the center portion 597. A notch 614 can be formed on the tab 612. When the bow assembly 90 is coupled with the arm assembly 60, the tab 612 can be configured to engage with the ridge 565 formed on the front portion 561 of the front bracket 560. The bead 566 can be inserted into the notch 614 to locate the bow assembly 90 over the front bracket 560. After the bow assembly 90 is positioned over the front bracket 560, one or more mechanical fasteners (e.g., screws, not shown) can be inserted through the one or more apertures 598 located on the crossbar 590 and the one or more apertures 599 located on the stiffening bracket 596. One or more mechanical fasteners can engage with the one or more threaded holes 567 located on the front bracket 560 to secure the bow assembly 90 on the arm assembly 60.

In some example configurations, the one or more tilt assemblies 35 can be coupled to the bow assembly 90 to hold one or more electronic displays as illustrated in FIG. 5. In some example configurations, the tilt assembly 35 can include an upright 620. The upright 620 can include an upper section 621 and a lower section 622 coupled to the upper section 621. The lower section 622 can include a receptacle with an opening 623. The opening 623 can be in any shape including (but not limited to) C-shaped, oval, flat, or the like. The opening 623 can be configured to receive at least a portion of the crossbar 593.

The tilt assembly 35 can include a tilt mount 624. The tilt mount 624 can be rotatingly coupled to the upper section 621 of the upright 620 around a hinge 625. The tilt assembly 35 can further include a display mount 626. The display mount 626 can be coupled to the tilt mount 624. The display mount 626 can have a planar surface and it can be configured to be coupled to an electronic display (e.g., electronic display 11 or 12 of FIG. 2). The display mount 626 and the tilt mount 624 can be adapted to rotate around a horizontal axis defined by the hinge 625 to change an angle of the display relative to the upright 620.

In some example configurations, the upper section 621 of the upright 620 can be made of two portions (not shown). One portion of the upper section 621 can be configured to rotate relative to the other portion of the upper section around a vertical axis (not shown) to change an orientation of the display coupled to the tilt assembly 35.

In yet other example configurations, the display mount 626 can be rotatingly coupled to the tilt mount 624 around a tilt axis that is perpendicular to the face of the display mount 626. The display mount 626 can be configured to rotate relative to the tilt mount 624 to change an orientation of the display.

Figure 41:
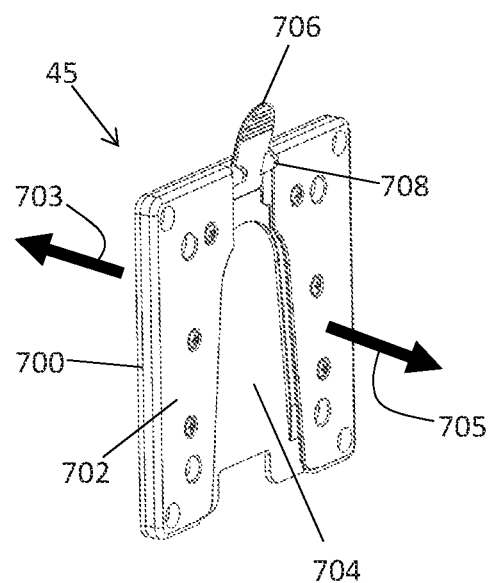
FIG. 41 is a perspective view of an example of a display attachment bracket.

FIG. 41 is a perspective view of the display attachment bracket 45. The display attachment bracket can have a front face 700 and a rear face 702 opposite to the front face 700. The front face 700 of the display attachment bracket 45 can face a forward direction 703 towards an electronic display (e.g., the display 10 of FIG. 1), and rear face 702 of the display attachment bracket can face a backward direction 705 opposite the forward direction 703. An electronic display (e.g., the display 10 of FIG. 1) can be attached to the front face 700. A wedge section 704 can be formed in the rear face 702 of the display attachment bracket 45. The wedge section 702 can be adapted to receive a quick connect bracket 710. A flexible tab 706 can be coupled to the display attachment bracket 45. The flexible tab 706 can include one or more hooks 708. The one or more hooks 708 can extend away from the flexible tab 706 in backwards direction 705.

Figure 42:
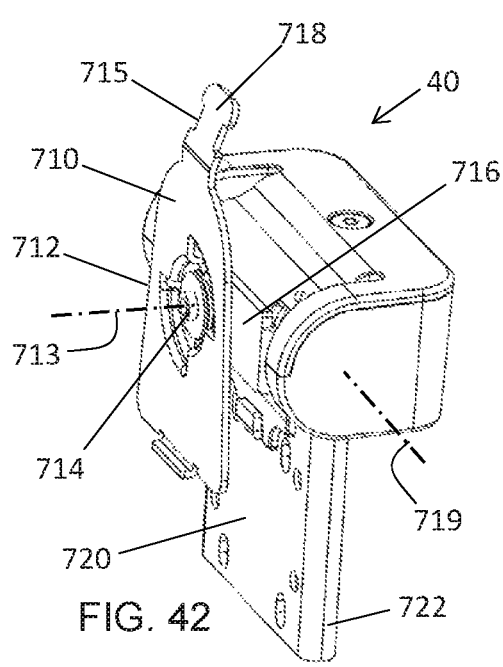
FIG. 42 is a perspective view of another example of a tilt assembly.

FIG. 42 is a perspective view of the tilt assembly 40. The tilt assembly can include a tilt bracket 716 and a connecting bracket 720. The tilt bracket 716 can be rotatably coupled to the connecting bracket 720. The tilt bracket 716 can rotate around a tilt axis 719. The tilt axis 719 can be in a horizontal plane (e.g., in a plane parallel to the desk surface 30 of FIG. 3).

In some example configurations, the tilt assembly 40 can include a quick connect bracket 710. The quick connect bracket 710 can be rotatingly coupled with the tilt bracket 716 at a rotation hinge 714. The quick connect bracket 710 can rotate around a rotation axis 713 relative to the tilt bracket 716. The rotation axis 713 can be perpendicular to the face of the quick connect bracket 710. An extension tab 718 can be formed at an edge of the quick connect bracket 710. On or more notches 715 can be formed on the extension tab 718.

In some example configurations, the quick attach bracket 45 can include one or more tapered edges 712. The one or more tapered edges 712 can be configured to engage with the wedge section 704 of the display attachment bracket 45. The tapered edges 712 of the quick connect bracket 710 can slide into the wedge section 704 of the display attachment bracket 45. The one or more hooks 708 located on the flexible tab 706 of display attachment bracket 45 can engage with the one or more notches 715 located on the extended tab 718 of the quick connect bracket 710 to secure the display attachment bracket 45 to the tilt assembly 40. The one or more hooks 708 engaged with the one or more notches 715 can prevent the removal of the display attachment bracket 45 from the tilt assembly 40. User of the display mounting system 100 can selectively bend the flexible tab 706 in forward direction 703 to disengage the one or more hooks 708 from the one or more notches 715 to disconnect the display attachment bracket 45 from the tilt assembly 40.

In some example configurations, the connecting bracket 720 can include side walls 721 and 722. The side walls 721 and 722 can be formed as an integral part of the connecting bracket 720. The connecting bracket 720 can further include one or more apertures 727. The connecting bracket 720 can be adapted to receive the front bracket 560 of the arm assembly 70 between the side walls 721 and 722.

Figure 43:
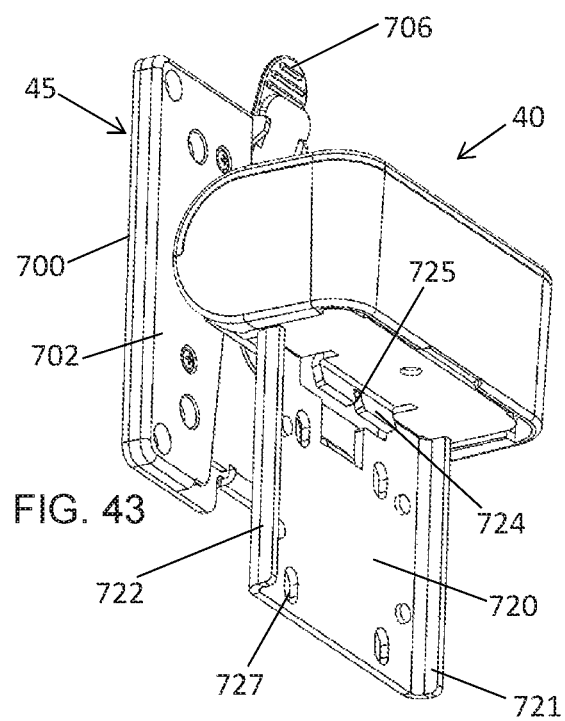
FIG. 43 is a perspective view of an assembly of the display attachment bracket of FIG. 41 with the tilt assembly of FIG. 42.

FIG. 43 is a perspective view showing the coupling of the display attachment bracket 45 with the tilt assembly 40. In some example configurations, a tab 724 can be formed on the connecting bracket 720. A notch 725 can be formed on the tab 724. When the tilt assembly 40 is coupled with the arm assembly 60, the tab 724 can be configured to engage with the ridge 565 formed on the front portion 561 of the front bracket 560. The bead 566 can be configured to enter into the notch 725 to locate the tilt assembly 40 over the front bracket 560. After the tilt assembly 40 is positioned over the front bracket 560, one or more mechanical fasteners (e.g., screws, not shown) can be inserted through the one or more apertures 727 located on the connecting bracket 720. The one or more mechanical fasteners can engage with the one or more threaded holes 567 located on the front bracket 560 to secure the tilt assembly 40 on the arm assembly 60.

Figure 45:
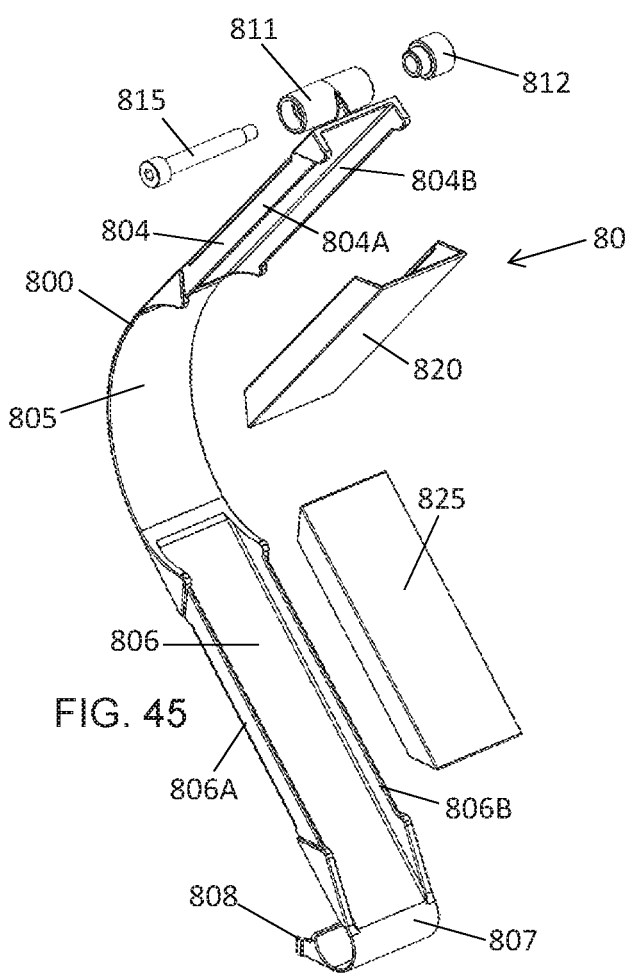
FIG. 45 is an exploded view of the cable management bracket assembly of FIG. 44.

FIGS. 44 and 45 are the side view and exploded view of the cable management bracket assembly 80, respectively. The cable management bracket assembly 80 can include a cable routing channel 800. The cable routing channel 800 can include a first end 801 and a second end 802. The cable routing channel 800 can further include a first section 804 proximate the first end 801 and a second section 806 proximate the second end 802. The first section 804 can have side walls 804A and 804B, and the second section 806 can have side walls 806A and 806B.

The cable routing channel 800 can have a flexible middle section 805 between the first section 804 and the second section 806. The first section 804, the second section 806, and the middle section 805 of the cable routing channel 800 can be formed as integral parts of the same component. The middle section 805 can be made in a thin cross-section so that it can be configured to flex and change a distance between the first end 801 and the second end 802 of the cable routing channel 800. In some example configurations, the first section 804 and the second section 806 of the cable routing channel 800 can be rotatingly coupled at a mechanical hinge (e.g., eliminating the need for the flexible section).

A hinge assembly 810 can be coupled to the cable routing channel 800) proximate to the first end 801. The hinge assembly 810 can include a hollow hinge housing 811 and a hollow bushing 812. The hinge housing 811 can be formed as an integral part of the cable routing channel 800. In some example configurations, the hinge housing 811 can be formed as a separate component and attached to the cable routing channel 800 in an assembly operation.

FIG. 46 is a close-up view of the coupling of cable management bracket assembly 80 with the truck assembly 70. The cable management bracket assembly 80 can be coupled to the truck body 71 through the threaded hole 302 located on the front plate 300. The hollow bushing 812 can be at least partially inserted into the hinge housing 811. A mechanical fastener 815 (e.g., a screw) can be inserted through the hinge housing 811 and the bushing 812. The mechanical fastener 815 can be adapted to threadingly engage with the threaded hole 302 located on the front plate 300 of the truck body 71 to secure the first end 801 of the cable routing channel 800 to the truck assembly 70. The first end 801 of the cable management bracket assembly 80 can be adapted to rotate relative to the truck assembly 70 as the truck assembly 70 translates relative to the support column 200.

A flexible section 807 can be formed as part of the cable routing channel 800 proximate to the second end 802. The cable routing channel 800 can further include one or more tabs 808. The one or more tabs 808 can be coupled to the cable routing channel 800 proximate to the second end 802. The one or more tabs 808 can be inserted in to the one or more recesses 27 (shown in FIG. 17) to couple the second end 802 of the cable routing channel 800 to the base 20. The flexible section 807 can be configured to flex and allow the second section 806 to rotate relative to the base 20. In some example configurations, the flexible section 807 can be replaced by a mechanical hinge.

FIG. 47 is a close-up view of the coupling of cable management bracket assembly 80 with the base 20. A flexible section 807 can be formed proximate to a second end 802 of the cable management bracket assembly 80. The second end 802 of the cable management bracket assembly 80 can be coupled to the base 20 through the one or more recesses 27. The flexible section 807 can allow the second end 802 of the cable management bracket assembly 80 to rotate relative to the base 20 as the truck assembly 70 translates relative to the support column 200.

In some example configurations, the cable management bracket assembly 80 can further include a first cover 820 and a second cover 825. The first cover 820 and the second cover 825 can have a U-shaped cross-section. The first cover 820 can be coupled to the side walls 804A and 804B of the first section 804 to form a first tubular passageway 822 over the first section 804. The second cover 825 can be coupled to the side walls 806A and 806B of the second section 804 to form a second tubular passageway 827 over the second section 806.

The one or more cables (e.g., power cables, video cables, or the like, connected to the electronic display 10 of FIG. 1) can be routed from the electronic display 10 towards the truck assembly 70 through the cable covers 65 (shown in FIG. 3). The one or more cables can exit the cable covers 65 proximate the truck assembly 70 and enter in to the first passageway 822 proximate to the first end 801 of the cable routing channel 800. The one or more cables can be concealed under the first cover 820 until they exit the first passageway 822 proximate to the middle section 805 of the cable routing channel 800. The one or more cables can be exposed over the middle section 805 until they enter in to the second passageway 827 proximate the middle section 805. The one or more cables can be concealed under the second cover 825 until they exit the second passageway 827. The one or more cables can exit the second passageway 827 proximate the second end 802 of the cable routing channel 800.

In some example configurations, a cable management clip 85 (e.g., the cable management clip 85 of FIGS. 3 and 5) can be used to tightly hold the one or more cables proximate to the base 20. In some example configurations, the cable management clip 85 can be located inside the hollow portion 19 of the base 20.

Figure 48:
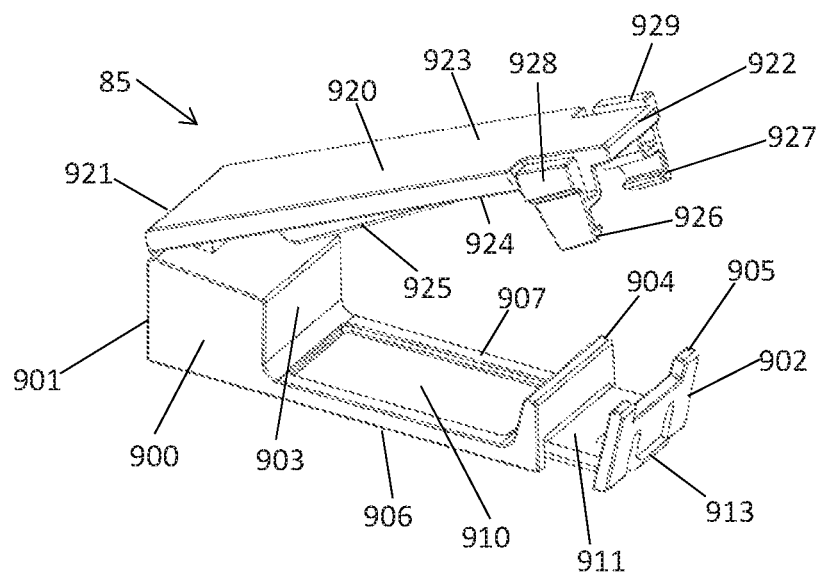
FIG. 48 is a front perspective view of an example of a cable management clip in an open configuration.
Figure 49:
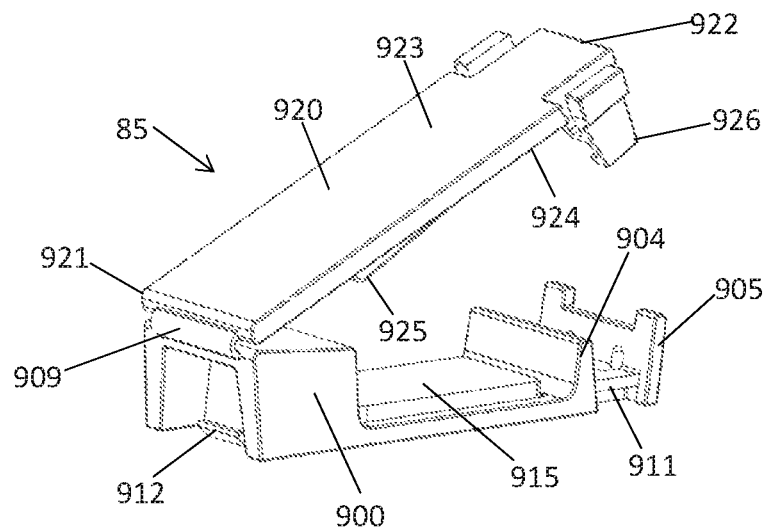
FIG. 49 is a rear perspective view of the cable management clip of FIG. 48 in an open configuration.
Figure 50:
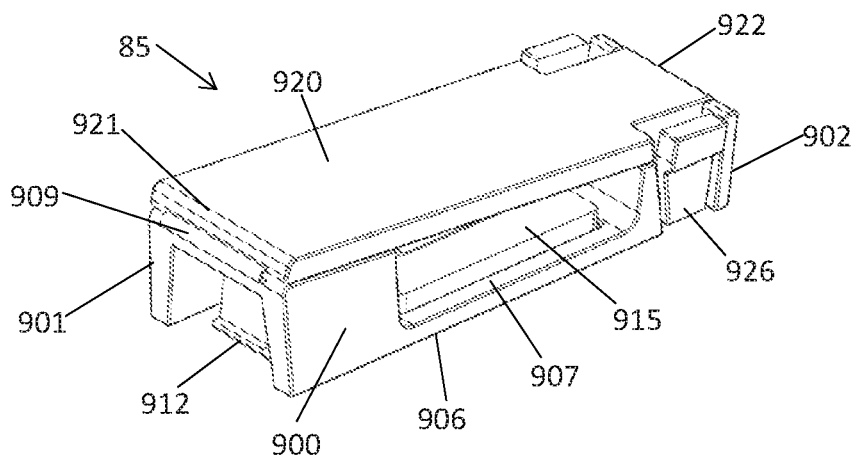
FIG. 50 is a rear perspective view of the cable management clip of FIG. 48 in a closed configuration.

FIGS. 48-49 are front and rear perspective views of the cable management clip 85 of FIG. 3 and FIG. 5 in an open configuration, respectively, according to an example configuration of the current disclosure. FIG. 50 is a rear perspective view of the cable management clip 85 of FIG. 49. The cable management clip 85 can include a base portion 900 and a clamp portion 920. The base portion 900 can be adapted to be coupled to the base 20 of the display mounting system 100.

The base portion can include a first end 901 and a second end 902 opposite the first end. The base portion 900 can be an elongated component between the first end 901 and the second end 902. The base portion 900 can further include a lower surface 906 and an upper surface 907. The lower surface 906 can be placed over a desk surface 30.

The base portion can include a rear wall 903, a middle wall 904, and a front wall 905. In some example configurations, a recessed section 910 can be formed on the upper surface 907 of the base portion 900 between the rear wall 903 and the middle wall 904. A bridge section 911 can be formed between the middle wall 904 and the front wall 905 of the base portion 90. In some example configurations, a compressible block 915 (e.g., a rubber pad, or the like) can be located inside the recessed section 910.

A first hook 912 and a second hook 913 can be formed proximate the rear end 901 and the front end 902 of the base portion 900, respectively. The base portion 900 can be coupled to the base 20 of the display mounting system 100 using the first hook 912 and the second hook 913. The first hook 912 can be adapted to engage with the first clip 26 proximate the rear end 22 of the base 20, and the second hook 913 can be adapted to engage with the second clip 28 proximate the front end 21 of the base 20.

The clamp portion 920 can be rotatingly coupled with the base portion 900 via a hinge 909. In some example configurations, the hinge 909 can be formed from a flexible material (e.g., plastic, ABS, or the like). The base portion 900, the clamp portion 920, and the hinge 909 can be formed together as integral parts of the same component. In other example configurations, a mechanical hinge (e.g., door hinge with a pin) can be used to rotatingly couple the clamp portion 920 with the base portion 900.

The clamp portion 920 can have a rear end 921, a front end 922, an upper surface 923, and a lower surface 924. The clamp portion 920 can be an elongated structure between the rear end 921 and the front end 922. The clamp portion 920 can further include a third hook 926 and a fourth hook 927 proximate to the front end 922. In the closed orientation as illustrated in FIG. 50, the third hook 926 and the fourth hook 927 can be adapted to engage with the bridge section 911 of the base portion 900 to keep the clamp portion 920 in closed orientation. A first lever 928 can be coupled to the third hook 926, and a second lever 929 can be coupled to the fourth hook 927. The first lever 928 and the second lever 929 can deflect together with the third hook 926 and the fourth hook 927, respectively. The user of the display mounting system 100 can manipulate the first lever 928 and the second lever 929 to disengage the third hook 926 and the fourth hook 927 from the bridge section 911, respectively, to return the clamp portion 920 to an open configuration as illustrated in FIGS. 48-49.

One or more beads 925 can be formed on the lower surface 924 of the clamp portion 920. The one or more beads 925 can press against the one or more cables located inside the cable management clip 85 (e.g., located between the rear wall 903 and middle wall 904 of the base portion 900). The one or more cables can be clamped between the one or more beads 925 and the compressible block 915 to tightly hold the one or more cables inside the cable management clip 85 when the cable management clip 85 is in closed orientation as illustrated in FIG. 50.

Figure 51:
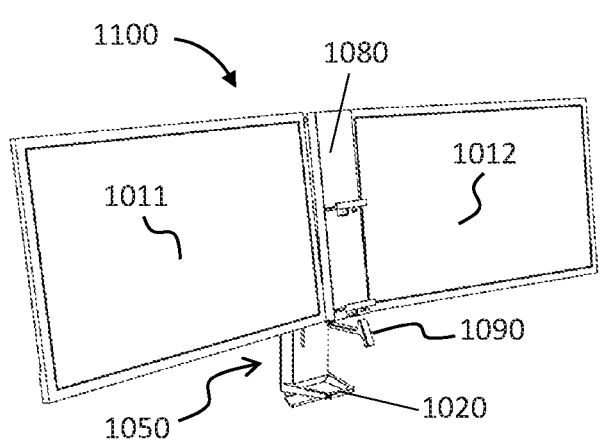
FIG. 51 is a perspective view of another example of a display mounting system for two displays and a portable electronic device holding bracket.
Figure 52:
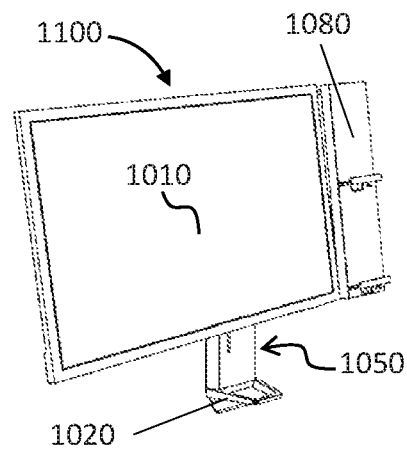
FIG. 52 is a perspective view of yet another example of a display mounting system for a single display and a portable electronic device holding bracket.
Figure 54:
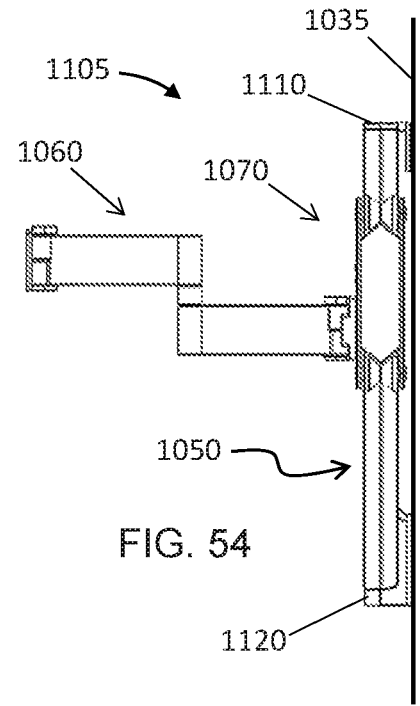
FIG. 54 is a side view of the display mounting system of FIG. 53.

FIGS. 51-52 shows the display mounting system 1100 with an auxiliary equipment holding block 1080. In some configurations, the holding block 1080 can be coupled to the display mounting system 100 (for example, to hold an auxiliary equipment such as a portable electronic device, phone, tablet, or the like) between the first display 1011 and the second display 1012 as illustrated in FIG. 53. In other sample configurations, the holding block 1080 can be coupled to the display mounting system 100 on the side of the display 1010 as illustrated in FIG. 54.

In some example configurations, a handle 1090 can be coupled to the display mounting system 1100 to help the user to easily manipulate the display mounting system 1100 to change an orientation of the one or more electronic displays.

In some example configurations, the display mounting system 1105 can be attached to a structure (e.g., a wall). FIGS. 53-54 are a perspective view and a side view of a display mounting system 1105, respectively. The display mounting system 1105 can include an upper wall mounting plate 1110, and a lower wall mounting plate 1120. The upper wall mounting plate 1110 can be coupled to the upper end of the riser assembly 1050. The lower wall mounting plate 1120 can be coupled to the lower end of the riser assembly 1050. The upper wall mounting plate 1110 and the lower wall mounting plate 1120 can be fixedly attached to a structure (e.g., a wall) to secure the display mounting system 1105 to the structure 1035. The upper 1110 and lower 1120 wall mounting plates can be offset from the riser assembly 1050 not to interfere with the truck assembly 1070 as it translates between elevated position and lowered position.

Figure 55:
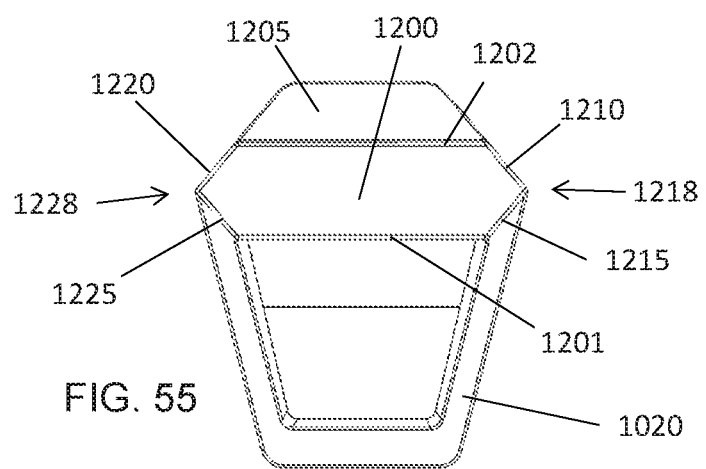
FIG. 55 is a top view of an example of a riser assembly and a base.

FIG. 55 is a top view of a support column 1200 and a base 1020 according to an example configuration of the current disclosure. The support column 1200 can be coupled to the base 1020. The support column 1200 can extend upward from the base 1020. The support column 1200 can include a front face 1201 and a rear face 1202 opposite the front face 1201.

In an example configuration, the support column 1200 can further include tapered side faces 1210, 1215, 1220, 1225 on either side of the support column 1200 between the front face 1201 and the rear face 1202. A first tapered face 1210 can be coupled to the rear face 1202, and a second tapered face 1215 can be coupled to the front face 1201. The first tapered face 1210 and the second tapered face 1215 can extend from the rear face 1202 and the front face 1201, respectively, at an angle away from the support column 1200 towards each other. The first tapered face 1210 and the second tapered face 1215 can merge to form a first V-shaped guide surface 1218 on one side of the support column 1200.

A third tapered face 1220 can be coupled to the rear face 1202, and a fourth tapered face 1225 can be coupled to the front face 1201. The third tapered face 1220 and the fourth tapered face 1225 can extend from the rear face 1202 and the front face 1201, respectively, at an angle away from the support column 1200 towards each other. The third tapered face 1220 and the fourth tapered face 1225 can merge to form a second V-shaped guide surface 1228 on the other side of the support column 1200. The front face 1201, the rear face 1202, the first V-shaped guide surface 1218, and the second V-shaped guide surface 1228 can extend along the entire length of the support column 1200.

In other example configurations, profile of the guide surfaces can be any shape including (but not limited to) tapered, round, oval, flat, and others.

Figure 56:
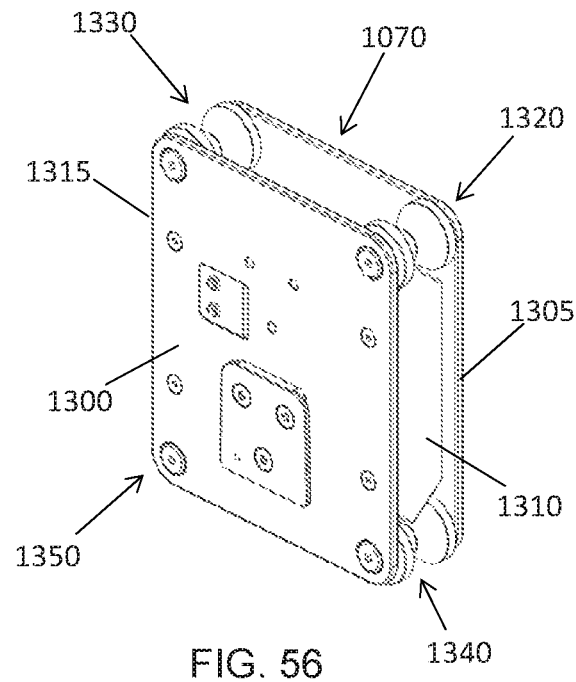
FIG. 56 is a perspective view of an example of a truck assembly.

FIG. 56 is a perspective view of the truck assembly 1070 according to an example configuration of the current disclosure. The truck assembly 1070 can include a front plate 1300 and rear plate 1305 opposite to the front plate 1300. The truck assembly 1070 can further include a first side plate 1310 and a second side plate 1315. The first side plate 1310 and the second side plate 1315 can couple the front plate 1300 with the rear plate 1305.

The truck assembly 1070 can further include a first wheel assembly 1320, a second wheel assembly 1330, a third wheel assembly 1340, and a fourth wheel assembly 1350. The wheel assemblies 1320, 1330, 1340, and 1350 can be coupled to the front plate 1300 and to the rear plate 1305. The truck assembly 1070 can be adapted to receive the support column 1200 between the front plate 1300, rear plate 1305, and the wheel assemblies 1320, 13020, 1340, 1350.

The first wheel assembly 1320 and the third wheel assembly 1340 can be located on one side of the support column 1200. The first wheel assembly 1320 and the third wheel assembly 1340 can be configured to contact the first V-shaped guide surface 1218 of the support column 1200. The second wheel assembly 1330 and the fourth wheel assembly 1350 can be located on the other side of the support column 1200. The second wheel assembly 1330 and the fourth wheel assembly 1350 can be configured to contact the second V-shaped guide surface 1228 of the support column 1200. The wheel assemblies 1320, 1330, 1340, and 1350 can roll over the respective V-shaped guide surfaces 1218 and 1228 during translation of the truck assembly 1070 relative to the support column 1200.

Figure 57:
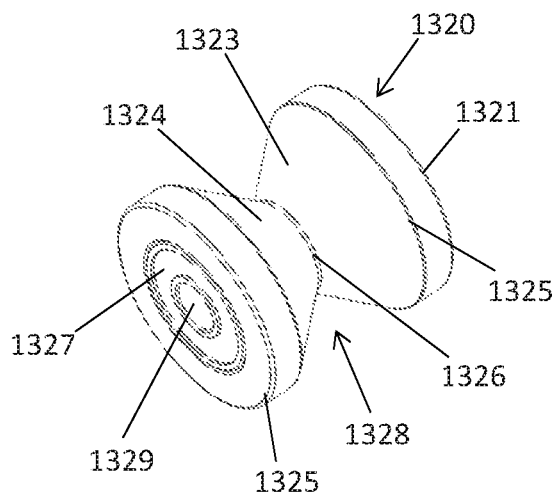
FIG. 57 is a perspective view of an example of a wheel assembly.

FIG. 57 is a perspective view of a wheel assembly (e.g., the first wheel assembly 1320) according to an example configuration of the current disclosure. In an example configuration, the first wheel assembly 1320 can have a first tapered wheel 1321 and one or more bearings 1327. The first tapered wheel 1321 can have a larger wheel diameter 1325 proximate to both ends of the first tapered wheel 1321. The first tapered wheel 1321 can have a smaller wheel diameter 1326 proximate to its center. A first tapered wheel face 1323 and a second tapered wheel face 1324 can connect the larger wheel diameter 1321 to the smaller wheel diameter 1326 on both sides of the smaller wheel diameter 1326. The first tapered wheel face 1323 and the second tapered wheel face 1324 can be formed as outer surfaces of a partial cones. The first tapered wheel face 1323 and the second tapered wheel face 1324 jointly can form a V-shaped groove 1328.

All wheel assemblies can be constructed the same as the first wheel assembly 1320. Wheel assemblies can include wheels having an outside profile to match the shape of the guide surfaces located on the sides of the support column 1200 (e.g., the first and second guide surfaces 1218 and 1228 of FIG. 55). Outside profile of the wheels can be any shape including (but not limited to) tapered (e.g., the first tapered wheel 1321 shown in FIG. 57), round, oval, flat, and others.

Figure 58:
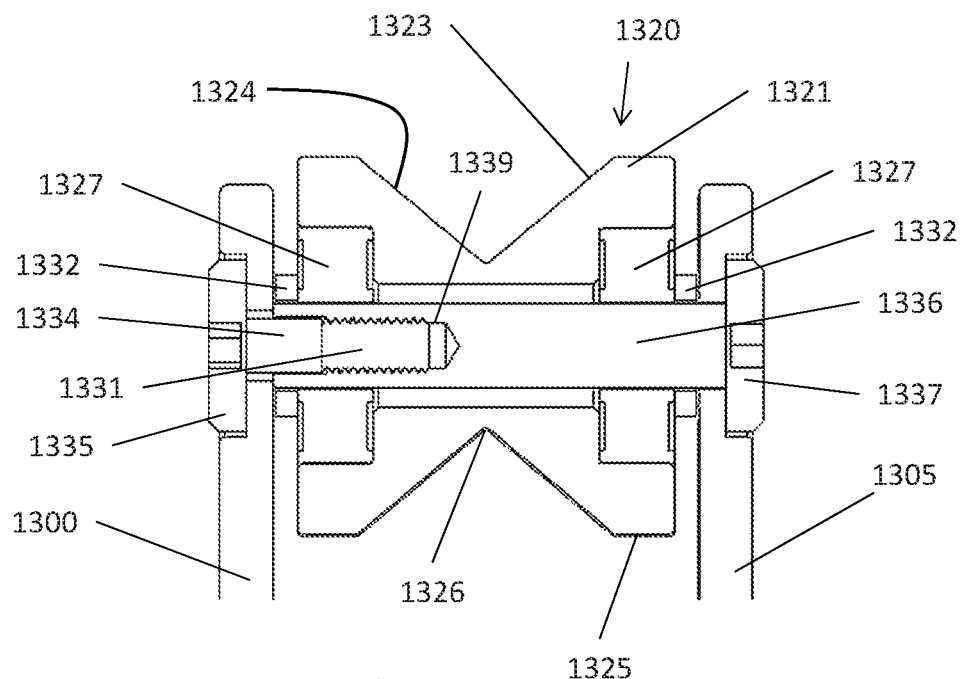
FIG. 58 is a cross-sectional side view of an example of a wheel assembly as attached to the truck assembly of FIG. 56.

FIG. 58 is a cross-sectional view of a wheel assembly (e.g., the first wheel assembly 1320) as coupled to the truck assembly 1070 according to an example configuration of the current disclosure. The wheel assembly 1320 can be located between the front plate 1300 and the rear plate 1305. In an example configuration, the wheel assembly 1320 can include a tapered wheel 1321 and one or more bearings 1327. The one or more bearings can be located proximate to the ends of the tapered wheel 1321. In other example configurations, if the width of the tapered wheel 1321 is small, a single bearing 1327 can be use.

In some example configurations, the truck assembly 1070 of FIG. 56 can include a stud 1336. One end of the stud 1336 can have a stud head 1337, and the other end of the stud 1336 can have a threaded hole 1339. The stud 1336 can be inserted through an aperture located on one of the front plate 1300 or the rear plate 1305. The stud 1336 can also be inserted through the center opening 1329 of the one or more bearings 1327. The truck assembly 1070 can further include a screw 1334. The screw 1334 can have a screw head 1335 on one end, and a threaded shaft 1331 on the other end. The screw 1334 can be inserted through an aperture located on the other one of the front plate 1300 or the rear plate 1305. The threaded shaft 1331 of the screw 1334 can be adapted to threadingly engage with the threaded hole 1339 of the stud 1336. One or more washers 1332 can be located between the wheel assembly 1320 and both the front plate 1300 and the rear plate 1305. The one or more washers 1332 can be concentric with the stud 1336 and the stud 1336 can go through the center opening of the one or more washers 1332. The assembly of the front plate 1300, washer 1332, wheel assembly 1320, washer 1332, and the rear plate 1305 can be tightened between the stud head 1337 and the screw head 1335 by rotating the screw 1334 relative to the stud 1336.

Figure 59:
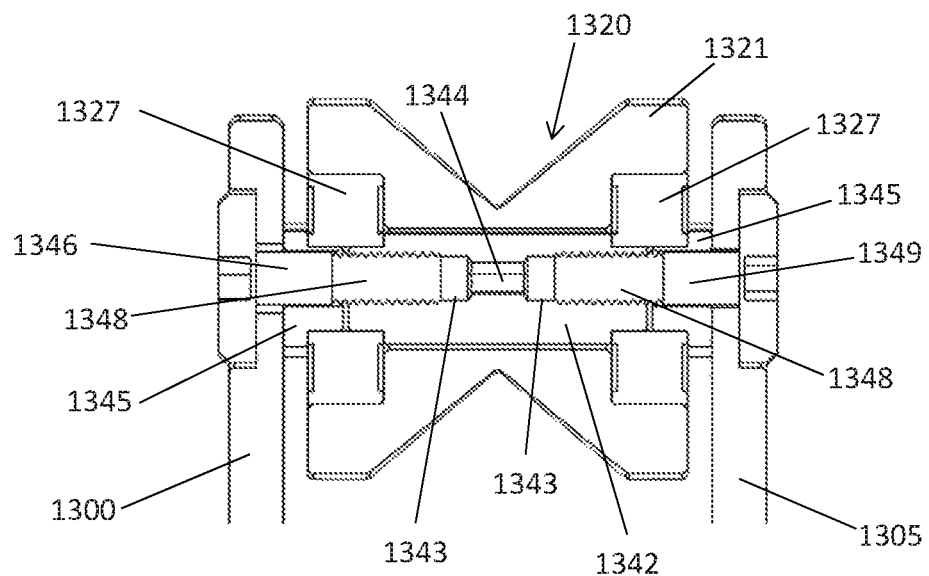
FIG. 59 is a cross-sectional side view of another example of a wheel assembly as attached to the truck assembly of FIG. 56.

FIG. 59 is a cross-sectional view of a wheel assembly (e.g., the first wheel assembly 1320) as attached to the truck assembly 1070 according to another example configuration of the current disclosure. The truck assembly 1070 can have one or more spacers (e.g., the spacer 1345 of FIGS. 60-61) and an axle (e.g., the axle 1342 of FIGS. 62-63). The truck assembly 1070 can include a first screw 1346 and a second screw 1349. The first screw 1346 can be inserted through an aperture located on the front plate 1300. The first screw 1346 can also be inserted through an inside diameter 1356 of a first spacer 1345. The second screw 1349 can be inserted through an aperture located on the rear plate 1305. The second screw can also be inserted through an inside diameter of a second spacer 1345. Both the first screw 1346 and the second screws 1349 can be adapted to threadingly engage with the axle 1342 from both ends. The assembly of the front plate 1300, the first spacer 1345, wheel assembly 1320, the second spacer 1345, and the rear plate 1305 can be tightened between heads of the first 1346 and the second 1349 screws by rotating the first and second screws relative to the axle 1342.

Figure 60:
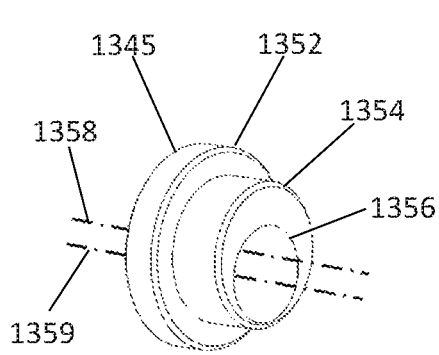
FIG. 60 is a perspective view of an example of a spacer.
Figure 61:
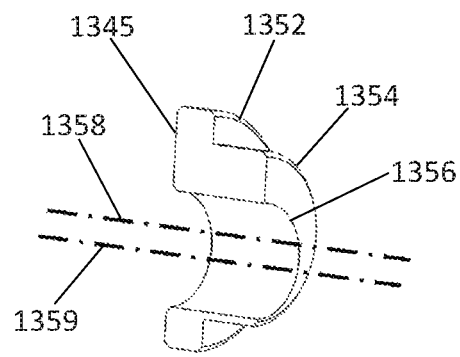
FIG. 61 is a cross-sectional view of the spacer of FIG. 60.

FIGS. 60-61 are the perspective and cross-sectional views of the spacer 1345 according to an example configuration of the current disclosure. The spacer 1345 can have a first outer diameter 1352 and a second outer diameter 1354 smaller than the first outer diameter 1352. The smaller outer diameter 1354 of the spacer 1345 can be slightly smaller than the diameter of the center opening 1329 of the bearing 1327. A portion of the spacer 1345 with the smaller outer diameter 1354 can be at least partially located inside the bearing 1327 as shown in FIG. 59. The larger outer diameter 1352 and the smaller outer diameter 1354 of the spacer 1345 can be centered around a first axis 1358. The spacer 1345 can further include a through hole with a diameter 1356. The inner diameter 1356 of the spacer 1345 can be centered around a second axis 1359. The second axis 1359 can be slightly shifted relative to the first axis 1358 (e.g., through hole 1356 is not concentric with the first 1352 and the second 1354 outer diameter of the spacer 1345).

Figure 62:
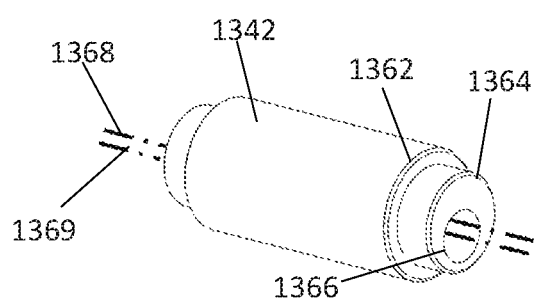
FIG. 62 is a perspective view of an example of an axle.
Figure 63:
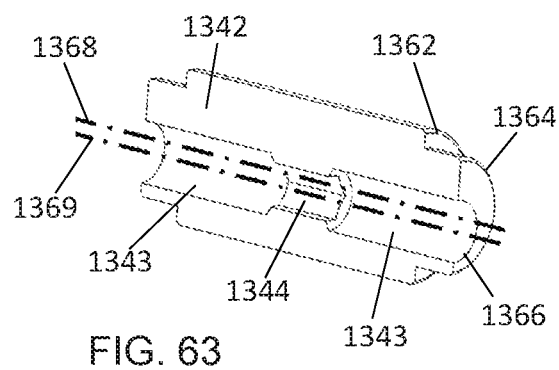
FIG. 63 is a cross-sectional view of the axle of FIG. 62.

FIGS. 62-63 are the perspective and cross-sectional views of the axle 1342 according to an example configuration of the current disclosure. The axle 1342 can have a larger outer diameter 1362 proximate to its center portion and a smaller outer diameter 1364 proximate to its one or both ends. The smaller outer axle diameter 1364 can be slightly smaller than the diameter of the center opening 1329 of the bearing 1327. A portion of the axle 1345 with the smaller outer diameter 1364 can be at least partially located inside the bearing 1327 as shown in FIG. 59. The larger outer diameter 1362 and the smaller outer diameter 1364 of the axle 1342 can be centered around a third axle 1368.

The axle 1342 can further include a through hole 1366. The through hole 1366 can be centered around a fourth axis 1369. The fourth axis 1369 can be slightly shifted relative to the third axis 1368 (e.g., the through hole 1366 is not concentric with the first 1362 and the second 1364 outer diameter of the axle 1342). A portion of an inside surface of the axle 1342 can have a hexagonal cross-section 1344. The hexagonal hole 1344 can be located proximate the center of the axle 1342. A threaded hole 1343 can be located on either side of the hexagonal hole 1344. Both the threaded holes 1343 and the hexagonal hole can be centered around the fourth axis 1369. A threaded shaft 1348 of the first and the second screws 1346 can be adapted to threadingly engage with the threaded holes 1343 of the axle 1342 to couple the wheel assembly 1320 to the truck assembly 1070.

In an example configuration of the truck assembly (e.g., the truck assembly 1070 of FIG. 59), the first axis 1358 of the spacer 1345 can coincide with the third axis 1368 of the axle 1342. The first axis 1358 and the third axis 1368 can also coincide with the center of rotation of the wheel assembly 1320. Similarly, the second axis 1359 of the spacer 1345 can coincide with the fourth axis 1369 of the axle 1342. The second axis 1359 and the fourth axis 1369 can also coincide with the axes of the first and the second screw 1346. The entire wheel assembly (e.g., the first wheel assembly 1320) can be configured to rotate around the screw axis (e.g., around the fourth axis 1360), and thereby, can shift the wheel assemblies (e.g., the first wheel assembly 1320) towards the guide surfaces (e.g., the first 1210 and the second 1215 tapered faces) of the support column 1200 to close any gaps that might occur between the guide surfaces and the wheel assemblies during the assembly of the display mounting system 1100.

Going back to the FIG. 59, the wheel assembly 1320 can be attached to the truck assembly 1070 in various ways to bias the wheel assemblies (e.g., the first wheel assembly 1320) towards the guide surfaces (e.g., the first V-shaped guide surface 1218) of the support column 1200 to take up any gap that might occur between the guide surfaces and the wheel assemblies. An assembly of the front plate 1300, the first spacer 1345, the wheel assembly 1320, the second spacer 1345, and the rear plate 1305 can be put together, and a first screw 1346 can be inserted through an aperture located on the front plate 1300. The first screw 1346 can be further inserted through the inside diameter 1356 of the second spacer 1345 and threadingly engage with the threaded hole 1343 located on one end of the axle 1342. A tool (for example a hexagonal wrench, or the like, not shown) can be inserted through an aperture located on the rear plate 1305. The wrench can be further inserted through the inside diameter 1356 of the second spacer 1345 and engage with the hexagonal hole 1344 located proximate the center of the axle 1342. Using the wrench, the wheel assembly 1320 can be rotated around the second axis 1359 to bias the first wheel assembly 1320 towards the first V-shaped guide surface 1218. After a contact is established between the first wheel assembly 1320 towards the first V-shaped guide surface 1218, the first screw 1346 can be tightened, and the wrench can be removed from the assembly. A second screw 1349 can be subsequently inserted through the aperture located on the rear plate 1305 and through the second spacer 1345, and threadingly engage with the threaded hole 1343 located on the other end of the axle 1342 to further tighten the first wheel assembly 1320 on to the truck assembly 1070.

Figure 64:
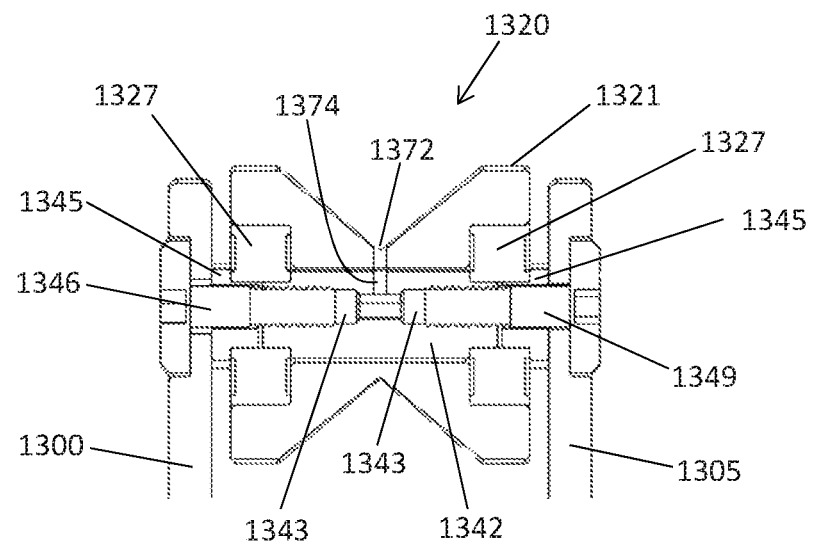
FIG. 64 is a cross-sectional side view of another example of a wheel assembly as attached to the truck assembly of FIG. 56.

FIG. 64 is a cross-sectional view of a wheel assembly (e.g., the first wheel assembly 1320) as attached to the truck assembly 1070 according to another example configuration of the current disclosure. A wheel assembly 1320 and the one or more spacers 1345 can be attached to the front plate 1300 and the rear plate 1305 using the first 1346 and the second 1349 screws inserted through apertures located on the front plate 1300 and rear plate 1305, respectively. The screws 1346, 1349 can engage with the threaded holes 1343 without being tightened. The tapered wheel 1321 can further have a first access hole 1372, and the axle can have a second access hole 1374. In an assembled configuration, the first access hole 1372 can be configured to coincide with the second access hole 1374 to form an access channel. A tool (e.g., a pin, wrench, or the like, not shown) can be inserted through the first access hole 1372 and the second access hole 1374. Using the tool, the wheel assembly 1320 can be rotated around the second axis 1359 to bias the wheel assembly 1320 towards the guide surfaces (e.g., the first V-shaped Guide surface 1218) of the support column 1200. After a contact is established between the wheel assembly 1320 and the first V-shaped guide surface 1218, the first 1346 and the second 1349 screws can be tightened, and the tool can be removed from the assembly.

Figure 65:
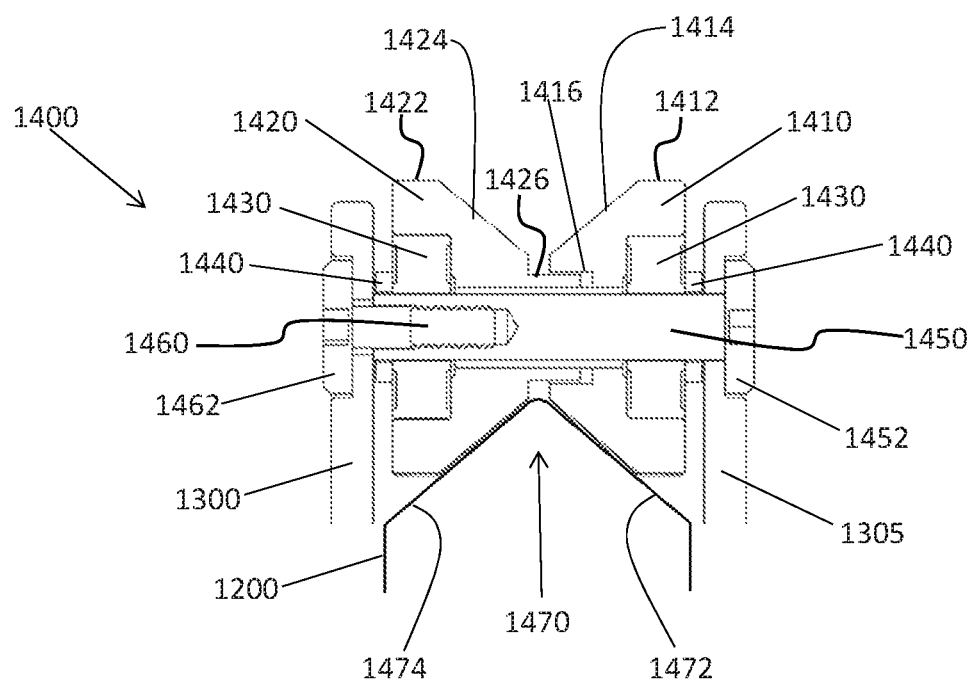
FIG. 65 is a cross-sectional side view of yet another example of a wheel assembly as attached to the truck assembly of FIG. 56.

FIG. 65 is a cross-sectional view of a wheel assembly as attached to the truck assembly 1070 according to yet another example configuration of the current disclosure. A wheel assembly 1400 can include a first conical wheel 1410 and a second conical wheel 1420. The first conical wheel 1410 and the second conical wheel 1420 can be formed separately. The first conical wheel 1410 can have a first outer wheel diameter 1412 on one end and a recess 1416 can be formed on the other end. A diameter of the recess 1416 can be smaller than the first outer wheel diameter 1412. The first conical wheel 1410 can further have a first tapered face 1414 connecting the first outer wheel diameter 1412 to the recess 1416. A bearing 1430 can be located inside the first conical wheel.

The second conical wheel 1420 can have a second outer wheel diameter 1422 on one end and an elongated section with an inner wheel diameter 1426 can be formed at the other end. The inner wheel diameter 1426 can be smaller than the second outer wheel diameter 1422. The second conical wheel 1420 can further have a second tapered face 1424 connecting the second outer diameter 1422 to the inner wheel diameter 1426. A bearing 1430 can be located inside the second conical wheel 1420.

The inner wheel diameter 1426 can be slightly smaller than the diameter of the recess 1416. The section of the second conical wheel 1420 with the inner wheel diameter 1426 can be at least partially located inside the recess 1416 in an assembled configuration. The first conical wheel 1410 and the second conical wheel 1420 can be slidingly engaged.

The wheel assembly 1400 can include a stud 1450. The stud 1450 can have a stud head 1452 on one end, and a threaded hole on the other end. During the assembly process, the stud 1450 can be inserted through an aperture located on one of the front plate 1300 or the rear plate 1305. The stud 1450 can be further inserted through a first washer 1440, the first bearing 1430, the first conical wheel 1410, the second conical wheel 1420, the second bearing 1430, and a second washer 1440 as illustrated in FIG. 65.

The wheel assembly 1400 can further have a screw 1460. The screw can have a screw head 1462 on one end, and a threaded shaft on the other end. The screw 1460 can be inserted through an aperture located on the other one of the front plate 1300 or the rear plate 1305. The threaded shaft of the screw 1460 can be configured to threadingly engage with the threaded hole located on the stud 1450.

In some sample configurations, after the support column 1200 is located inside the truck assembly 1070, the wheel assembly 1400 can be tightened between the head of the stud 1452 and the head of the screw 1462 by rotating the screw 1460 relative to the stud 1450. By tightening the wheel assembly 1400, a good contact can be achieved between the tapered surfaces of the wheels (e.g., the first conical wheel 1410 and the second conical wheel 1420) and the tapered surfaces of the V-shaped guide 1470 (e.g., the first tapered face 1414 of the first conical wheel 1410 can be in contact with the first tapered face 1472 of the V-shaped guide 1470, and the second tapered face 1424 of the second conical wheel 1420 can be in contact with the second tapered face 1474 of the V-shaped guide 1470).

Various configurations of wheel assemblies discussed above in relation to FIGS. 58, 59, 64, and 65 can be used in place of any one of the wheel assemblies shown in FIG. 56 (e.g., they can be used in place of any one of the first wheel assembly 1320, the second wheel assembly 1330, the third wheel assembly 1340, and the fourth wheel assembly 1350). In some example configurations, different types of wheel assemblies can be used in combination, for example, the wheel assembly shown in FIG. 58 can be used on one side of the truck assembly 1070 (e.g., used in place of the second 1330 and the fourth 1350 wheel assemblies) and the wheel assembly shown in FIG. 59 or 65 can be used on the other side of the truck assembly 1070 (e.g., used in place of the first 1320 and the third 1340 wheel assemblies). In other example configurations, various wheel assemblies can be used in other combinations as well.

Figure 66:
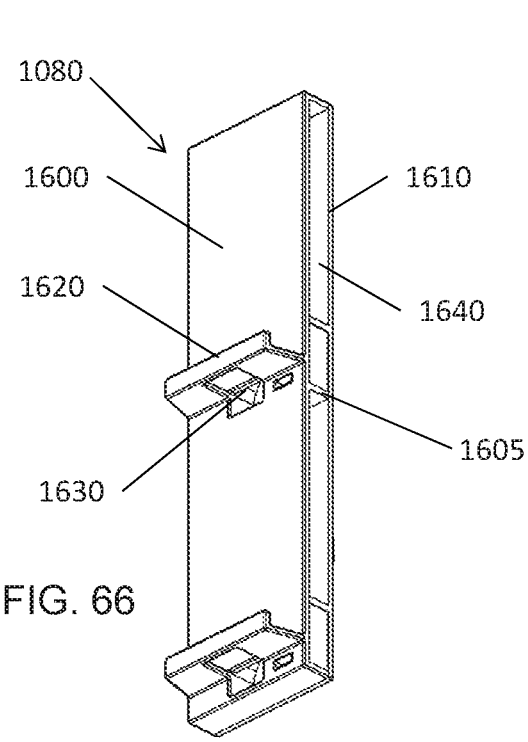
FIG. 66 is a perspective view of an example of a portable electronic device holding bracket of FIGS. 51 and 52.
Figure 67:
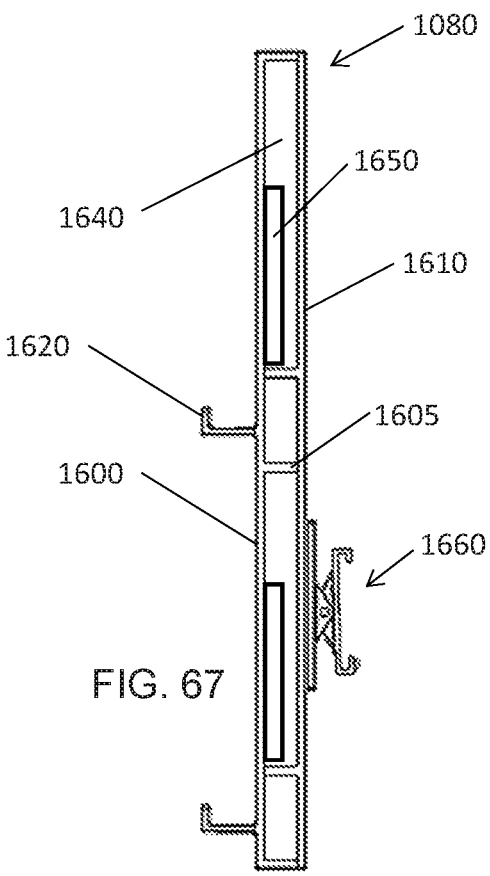
FIG. 67 is a side view of the portable electronic device holding bracket of FIG. 66.

FIGS. 66 and 67 are perspective and sides views of the device holding block 1080, respectively. The device holding block 1080 can have a front face 1600 and a rear face 1610 opposite the front face 1600. The front face 1600 and the rear face 1610 of the device holding block 1080 can be connected with one or more ribs 1605. At least one cable storage compartment 1640 can be located between the front face 1600 and the rear face 1610 of the device holding block 1080. At least a portion of cables connected to the portable electronic devices can be stored in the cable storage compartment 1640.

One or more shelves 1620 can be coupled to the front face 1600 of the device holding block 1080. One or more portable electronic devices can be placed on the one or more shelves 1620. The device holding block 1080 can further have one or more cable access holes 1630 proximate the one or more shelves 1620. One or more cables (e.g., power cables or data cables) can be coupled to the portable electronic devices and routed to the cable storage compartment 1640 via the cable access hole 1630.

In some example configurations, a charging device (e.g., a Qi charger 1650 as illustrated in FIG. 67) can be coupled to the device holding block 1080. The Qi charger 1650 can be connected to a power source and it can be used to wirelessly charge a portable electronic device placed on the device holding block 1080. In other example configurations, the charger may include a wired connection port (e.g., a USB port, and the like) for wired connection of the portable electronic device to the charger.

Figure 68:
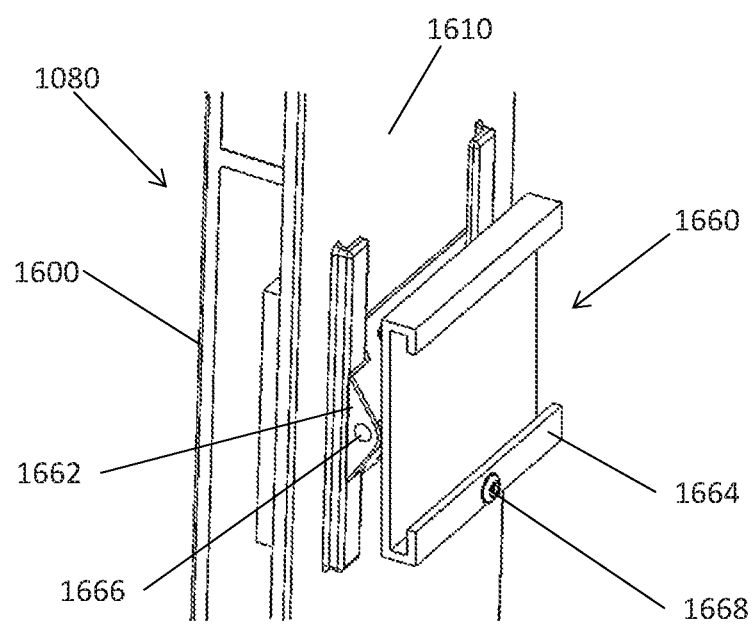
FIG. 68 is a perspective view of a portion of the portable electronic device holding bracket of FIG. 67.

In some example configurations, the device holding block 1080 can include a coupling assembly 1660. FIG. 68 shows a perspective view of the coupling assembly 1660. The coupling assembly 1660 can include a tilt bracket 1662 and an attachment bracket 1664. The tilt bracket 1662 can be coupled to the rear face 1610 of the device holding block 1080. In some configurations, the tilt bracket 1662 can be formed as an integral part of the rear face 1610 of the device holding block 1080. The attachment bracket 1664 can be coupled to the crossbar (e.g., the crossbar 590 of FIG. 36) anywhere along its length. The attachment bracket 1664 can be secured to the crossbar 590 by various known methods including (but not limited to) a screw 1668, a lever, a detent, a latch, or the like. The tilt bracket can be rotatingly coupled to the attachment bracket at a hinge 1666. The user of the display mounting system 1100 can tilt the device holding block 1080 relative to the crossbar 590 (for example to adjust the viewing angle of the portable electronic device located on the device holding block 1080).

Additional Notes and Aspects

Aspect 1 may include or use subject matter (such as an apparatus, a system, a device, a method, a means for performing acts, or a device readable medium including instructions that, when performed by the device, may cause the device to perform acts), such as may include or use an electronic display mounting system comprising: an electronic display interface; a support assembly adapted to couple to a fixed structure, the support assembly including: a support column, wherein the support column is vertically oriented; and a mounting portion movably coupled to the support column; and an articulating arm assembly operably coupled between the display interface and the mounting portion, wherein the articulating arm assembly includes at least one pair of arms; wherein the mounting portion is configured to translate the display interface in a vertical direction through a range of travel; wherein the articulating arm assembly is configured to translate the display interface between a first position proximate the support assembly and a second position spaced apart from the support assembly; and wherein the articulating arm assembly is configured to change an angle of the display interface relative to the support assembly.

Aspect 2 may include or use, or may optionally be combined with the subject matter of Aspect 1, to optionally include or use a base, wherein the base is adapted to rest on a generally horizontal support surface.

Aspect 3 may include or use, or may optionally be combined with the subject matter of Aspect 1, to optionally include or use a wall mounting interface, wherein the wall mounting interface is adapted to attach to a generally vertical support surface.

Aspect 4 may include or use, or may optionally be combined with the subject matter of Aspect 1, to optionally include or use wherein the articulating arm assembly comprises: a first pair of pivotally connected arms having a first end configured to be pivotally connected with the display interface and a second end configured to be pivotally connected with the moving portion; and a second pair of pivotally connected arms having a first end configured to be pivotally connected with the display interface and a second end configured to be pivotally connected with the moving portion.

Aspect 5 may include or use, or may optionally be combined with the subject matter of Aspect 1, to optionally include or use wherein the electronic display interface comprises: one or more display interface brackets adapted to be coupled to one or more electronic displays; and one or more tilt assemblies adapted to be coupled to the one or more display interface brackets; wherein the one or more tilt assemblies are configured to tilt the electronic display relative to the support assembly around a horizontal axis.

Aspect 6 may include or use, or may optionally be combined with the subject matter of Aspect 5, to optionally include or use wherein the electronic display interface further comprises a bow assembly, and wherein the one or more tilt assemblies are adapted to be coupled to the bow assembly.

Aspect 7 may include or use, or may optionally be combined with the subject matter of Aspect 5, to optionally include or use wherein the one or more display interface brackets are removably coupled to the one or more tilt assemblies.

Aspect 8 may include or use, or may optionally be combined with the subject matter of Aspect 2, to optionally include or use further comprising a cable management channel including: a first end rotatingly coupled to the mounting portion; a second end rotatingly coupled to the base; and a middle portion connecting the first end and the second end; wherein the middle portion is configured to flex and allow translation of the first end between a first position proximate the second end and a second position spaced apart from the second end; and wherein the cable management channel is configured to house one or more cables between the mounting portion and the base.

Aspect 9 may include or use, or may optionally be combined with the subject matter of Aspect 8, to optionally include or use a first cover adapted to be removably coupled to the cable management channel proximate to the first end; and a second cover adapted to be removably coupled to the cable management channel proximate to the second end; wherein the first cover and the second cover are configured to conceal at least a portion of cables housed inside the cable management channel.

Aspect 10 may include or use, or may optionally be combined with the subject matter of Aspect 2, to optionally include or use a cable management clip, including: abase portion, wherein the base portion is configured to couple to the base; and a clamp portion rotatingly coupled to the base portion; wherein the clamp portion is configured to rotate relative to the base portion between a closed configuration where the clamp portion is parallel to the base portion and an open configuration where the clamp portion is positioned at an angle relative to the base portion; and wherein the cable management clip, in a closed configuration, is configured to retain the one or more cables.

Aspect 11 may include or use, or may optionally be combined with the subject matter of Aspect 1, to optionally include or use a counterbalance mechanism, the counterbalance mechanism including: an energy storage member coupled to the support column; a wheel assembly rotatingly coupled to the support column; a first tensile member connecting the energy storage member to the wheel assembly; and a second tensile member connecting the wheel assembly to the mounting portion; wherein the first tensile member and the second tensile member ate configured to transfer at least a portion of the force generated by the energy storage member to the mounting portion to balance forces between the support column and the mounting portion to assist translation of the mounting portion relative to the support column.

Aspect 12 may include or use, or may optionally be combined with the subject matter of Aspect 11, to optionally include or use wherein the counterbalance mechanism further comprises: a weight adjustment mechanism; and a weight adjustment indicator coupled to the weight adjustment mechanism; wherein the weight adjustment mechanism is configured to translate an end of the energy storage member to adjust a tension of the energy storage member; and wherein the weight adjustment indicator is configured to translate with the weight adjustment mechanism.

Aspect 13 may include or use, or may optionally be combined with the subject matter of Aspect 12, to optionally include or use wherein the support column comprises a weight adjustment indicator window; wherein a portion of the weight adjustment indicator is visible through the weight adjustment indicator window; and wherein the visible portion of the weight adjustment indicator is configured to represent a magnitude of the tension of the energy storage member.

Aspect 14 may include or use, or may optionally be combined with the subject matter of Aspect 1, to optionally include or use wherein the mounting portion further comprises: a mounting body, including: a front wall; a rear wall; a first side wall; and a second side wall; wherein the first side wall and the second side wall are adapted to connect the front wall and the rear wall to form a hollow cross-section; and a plurality of wheel assemblies, including: a wheel having a concave profile; wherein the wheel is rotatingly coupled to the mounting body; one or more bearings adapted to be coupled to an inside diameter of the wheel; and an axle having a first end and a second end; wherein the axle is at least partially located inside the hollow cross-section and wherein the wheel and the one or more bearings are concentric with the axle; wherein the support column at least partially located inside the hollow cross-section; and wherein the concave profile of each wheel of plurality of wheel assemblies contacts an outside surface of the support column.

Aspect 15 may include or use, or may optionally be combined with the subject matter of Aspect 14, to optionally include or use a plurality of slots formed on a wall of the mounting body configured to receive a first cutout and a second cutout formed on the first end and the second end of the axle, respectively, to couple the plurality of wheel assemblies to the mounting body and a plurality of wheel clamps, wherein the plurality of wheel clamps are coupled to the mounting body such that the plurality of wheel clamps push against the first end and the second end of the axle of the plurality of wheel assemblies to secure the plurality of wheel assemblies to the mounting body.

Aspect 16 may include or use, or may optionally be combined with the subject matter of Aspect 15, to optionally include or use wherein the one or more of the plurality of slots are formed at an angle inclined towards the support column, and wherein the plurality of wheel assemblies are configured to translate towards the support column as the one or more axles are inserted in to the one or more slots.

Aspect 17 may include or use, or may optionally be combined with the subject matter of Aspect 14, to optionally include or use wherein the axle is a stud having a stud head on one end and a threaded hole on the other end, wherein the stud is coupled to one of the front wall or the rear wall and secured in place by a screw, wherein the screw is coupled to the other one of the front wall or the rear wall, and wherein the screw is threadingly engaged with the threaded hole.

Aspect 18 may include or use, or may optionally be combined with the subject matter of Aspect 14, to optionally include or use wherein the axle is a stud having a stud axis, wherein the stud includes a through hole having a hole axis positioned away from the stud axis, wherein the hole axis is parallel to the stud axis, wherein the axle is adapted to be rotatable around the hole axis, wherein the through hole is threaded proximate to the first end and the second end of the axle, wherein the through hole has a hexagonal shape proximate to a center of the axle, wherein the axle is coupled to the mounting body via a first screw and a second screw, wherein the first screw is coupled to the front wall and threadingly engaged with the threaded hole located proximate to the first end of the axle, and wherein the second screw is coupled to the rear wall and threadingly engaged with the threaded hole located proximate to the second end of the axle.

Aspect 19 may include or use, or may optionally be combined with the subject matter of Aspect 17, to optionally include or use wherein the wheel comprises: a first wheel portion; and a second wheel portion concentric with the first wheel portion; wherein the first wheel portion is slidably engaged with the second wheel portion; wherein the stud is at least partially located inside the first wheel portion and the second wheel portion; and wherein the first wheel portion is adapted to translate towards the second wheel portion as the screw is tightened against the stud.

Aspect 20 may include or use, or may optionally be combined with the subject matter of Aspect 1, to optionally include or use a holder; the holder including: one or more shelves, wherein the one or more shelves are configured to hold one or more portable electronic devices; one or more storage compartments, wherein the one or more storage compartments are configured to hold one or more electronic components; and a mount, wherein the mount is configured to be coupled to the display interface portion; wherein the holder is adapted to position the one or more portable electronic devices proximate to a display coupled to the display mounting system.

Each of these non-limiting examples can stand on its own, or can be combined in any permutation or combination with any one or more of the other examples.

The above detailed description includes references to the accompanying drawings, which form a part of the detailed description. The drawings show, by way of illustration, specific configurations in which the present subject matter can be practiced. These configurations are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the present subject matter should be determined with reference to the appended claims, along with the full scope of equivalents to which such claims are entitled.

The claimed invention is:

1. An electronic display mounting system comprising:
   an electronic display interface;
   a support assembly adapted to couple to a fixed structure, the support assembly including:
      a support column, wherein the support column is vertically oriented; and
      a mounting portion movably coupled to the support column, the mounting portion including:
         a mounting body, including:
            a front wall;
            a rear wall;
            a first side wall; and
            a second side wall;
            wherein the first side wall and the second side wall are adapted to connect the front wall and the rear wall to form a hollow cross-section; and
         a plurality of wheel assemblies including:
            a wheel having a concave profile; wherein the wheel is rotatingly coupled to the mounting body;
            one or more bearings adapted to be coupled to an inside diameter of the wheel; and
            an axle having a first end and a second end;
            wherein the axle is at least partially located inside the hollow cross-section; and
            wherein the wheel and the one or more bearings are concentric with the axle;
         wherein the support column at least partially located inside the hollow cross-section; and
         wherein the concave profile of each wheel of plurality of wheel assemblies contacts an outside surface of the support column; and
      an articulating arm assembly operably coupled between the display interface and the mounting portion, wherein the articulating arm assembly includes at least one pair of arms;
      wherein the mounting portion is configured to translate the display interface in a vertical direction through a range of travel;

wherein the articulating arm assembly is configured to translate the display interface between a first position proximate the support assembly and a second position spaced apart from the support assembly; and
wherein the articulating arm assembly is configured to change an angle of the display interface relative to the support assembly.

2. The electronic display mounting system of claim 1, further comprising a base, wherein the base is adapted to rest on a generally horizontal support surface.

3. The electronic display mounting system of claim 2 further comprising a cable management channel including:
a first end rotatingly coupled to the mounting portion;
a second end rotatingly coupled to the base; and
a middle portion connecting the first end and the second end;
wherein the middle portion is configured to flex and allow translation of the first end between a first position proximate the second end and a second position spaced apart from the second end; and
wherein the cable management channel is configured to house one or more cables between the mounting portion and the base.

4. The electronic display mounting system of claim 3, further comprising
a first cover adapted to be removably coupled to the cable management channel proximate to the first end; and
a second cover adapted to be removably coupled to the cable management channel proximate to the second end;
wherein the first cover and the second cover are configured to conceal at least a portion of cables housed inside the cable management channel.

5. The electronic display mounting system of claim 2, further comprising a cable management clip, including:
a base portion, wherein the base portion is configured to couple to the base; and
a clamp portion rotatingly coupled to the base portion;
wherein the clamp portion is configured to rotate relative to the base portion between a closed configuration where the clamp portion is parallel to the base portion and an open configuration where the clamp portion is positioned at an angle relative to the base portion; and
wherein the cable management clip, in a closed configuration, is configured to retain the one or more cables.

6. The electronic display mounting system of claim 1, further comprising a wall mounting interface, wherein the wall mounting interface is adapted to attach to a generally vertical support surface.

7. The electronic display mounting system of claim 1, wherein the articulating arm assembly comprises:
a first pair of pivotally connected arms having a first end configured to be pivotally connected with the display interface and a second end configured to be pivotally connected with the moving portion; and
a second pair of pivotally connected arms having a first end configured to be pivotally connected with the display interface and a second end configured to be pivotally connected with the moving portion.

8. The electronic display mounting system of claim 1, wherein the electronic display interface comprises:
one or more display interface brackets adapted to be coupled to one or more electronic displays; and
one or more tilt assemblies adapted to be coupled to the one or more display interface brackets;
wherein the one or more tilt assemblies are configured to tilt the electronic display relative to the support assembly around a horizontal axis.

9. The electronic display mounting system of claim 8, wherein the electronic display interface further comprises a bow assembly, and wherein the one or more tilt assemblies are adapted to be coupled to the bow assembly.

10. The electronic display mounting system of claim 8, wherein the one or more display interface brackets are removably coupled to the one or more tilt assemblies.

11. The electronic display mounting system of claim 1, further comprising a counterbalance mechanism, the counterbalance mechanism including:
an energy storage member coupled to the support column;
a wheel assembly rotatingly coupled to the support column;
a first tensile member connecting the energy storage member to the wheel assembly; and
a second tensile member connecting the wheel assembly to the mounting portion;
wherein the first tensile member and the second tensile member ate configured to transfer at least a portion of the force generated by the energy storage member to the mounting portion to balance forces between the support column and the mounting portion to assist translation of the mounting portion relative to the support column.

12. The electronic display mounting system of claim 11, wherein the counterbalance mechanism further comprises:
a weight adjustment mechanism; and
a weight adjustment indicator coupled to the weight adjustment mechanism;
wherein the weight adjustment mechanism is configured to translate an end of the energy storage member to adjust a tension of the energy storage member; and
wherein the weight adjustment indicator is configured to translate with the weight adjustment mechanism.

13. The electronic display mounting system of claim 12, wherein the support column comprises a weight adjustment indicator window;
wherein a portion of the weight adjustment indicator is visible through the weight adjustment indicator window; and
wherein the visible portion of the weight adjustment indicator is configured to represent a magnitude of the tension of the energy storage member.

14. The electronic display mounting system of claim 1, further comprising:
a plurality of slots formed on a wall of the mounting body configured to receive a first cutout and a second cutout formed on the first end and the second end of the axle, respectively, to couple the plurality of wheel assemblies to the mounting body; and
a plurality of wheel clamps,
wherein the plurality of wheel clamps are coupled to the mounting body such that the plurality of wheel clamps push against the first end and the second end of the axle of the plurality of wheel assemblies to secure the plurality of wheel assemblies to the mounting body.

15. The electronic display mounting system of claim 14, wherein the one or more of the plurality of slots are formed at an angle inclined towards the support column, and wherein the plurality of wheel assemblies are configured to translate towards the support column as the one or more axles are inserted in to the one or more slots.

16. The electronic display mounting system of claim 1, wherein the axle is a stud having a stud head on one end and a threaded hole on the other end, wherein the stud is coupled to one of the front wall or the rear wall and secured in place by a screw, wherein the screw is coupled to the other one of the front wall or the rear wall, and wherein the screw is threadingly engaged with the threaded hole.

17. The electronic display mounting system of claim 16, wherein the wheel comprises:
 a first wheel portion; and
 a second wheel portion concentric with the first wheel portion;
 wherein the first wheel portion is slidably engaged with the second wheel portion;
 wherein the stud is at least partially located inside the first wheel portion and the second wheel portion; and
 wherein the first wheel portion is adapted to translate towards the second wheel portion as the screw is tightened against the stud.

18. The electronic display mounting system of claim 1, wherein the axle is a stud having a stud axis, wherein the stud includes a through hole having a hole axis positioned away from the stud axis, wherein the hole axis is parallel to the stud axis, wherein the axle is adapted to be rotatable around the hole axis, wherein the through hole is threaded proximate to the first end and the second end of the axle, wherein the through hole has a hexagonal shape proximate to a center of the axle, wherein the axle is coupled to the mounting body via a first screw and a second screw, wherein the first screw is coupled to the front wall and threadingly engaged with the threaded hole located proximate to the first end of the axle, and wherein the second screw is coupled to the rear wall and threadingly engaged with the threaded hole located proximate to the second end of the axle.

19. The electronic display mounting system of claim 1, further comprising a holder; the holder including:
 one or more shelves, wherein the one or more shelves are configured to hold one or more portable electronic devices;
 one or more storage compartments, wherein the one or more storage compartments are configured to hold one or more electronic components; and
 a mount, wherein the mount is configured to be coupled to the display interface portion;
 wherein the holder is adapted to position the one or more portable electronic devices proximate to a display coupled to the display mounting system.

* * * * *

UNITED STATES PATENT AND TRADEMARK OFFICE
CERTIFICATE OF CORRECTION

PATENT NO. : 11,112,057 B2
APPLICATION NO. : 17/261829
DATED : September 7, 2021
INVENTOR(S) : Janechek et al.

It is certified that error appears in the above-identified patent and that said Letters Patent is hereby corrected as shown below:

In the Specification

In Column 5, Line 55, delete "10" and insert --100-- therefor

In Column 6, Line 14, after "base", insert --20--

In Column 6, Line 36, after "bracket", insert --45--

In Column 7, Line 42, delete "side" and insert --guide-- therefor

In Column 8, Line 6, delete "support column support column" and insert --support column-- therefor In Column 13, Line 38, delete "340" and insert --350-- therefor In Column 15, Line 12, delete "330" and insert --340-- therefor In Column 16, Line 35, delete "535.)" and insert --535).-- therefor In Column 18, Line 32, delete "70." and insert --60.-- therefor In Column 19, Line 34, delete "590" and insert --596-- therefor In Column 20, Line 5, delete "593." and insert --590.-- therefor In Column 20, Line 35, after "bracket", insert --45--

In Column 20, Line 40, delete "702" and insert --704-- therefor

In Column 20, Line 46, after "assembly", insert --40--

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,112,057 B2

In Column 21, Line 19, delete "70" and insert --60-- therefor

In Column 21, Line 59, delete "800)" and insert --800-- therefor

In Column 22, Line 44, delete "804" and insert --806-- therefor

In Column 23, Line 25, delete "90." and insert --900.-- therefor

In Column 23, Line 29, delete "901" and insert --921-- therefor

In Column 23, Line 29, delete "902" and insert --922-- therefor

In Column 26, Line 3, delete "use." and insert --used.-- therefor

In Column 26, Line 59, delete "1352" and insert --1362-- therefor

In Column 27, Line 8, delete "1345" and insert --1342-- therefor

In Column 27, Line 12, delete "axle" and insert --axis-- therefor

In Column 27, Line 25, delete "1346" and insert --1349-- therefor

In Column 27, Line 36, delete "1346." and insert --1346, 1349.-- therefor

In Column 27, Line 39, delete "1360)," and insert --1369),-- therefor

In Column 31, Line 47, delete "abase" and insert --a base-- therefor

In Column 32, Line 36, after "cross-section", insert --;--

In Column 32, Line 49, after "body", insert --;--

In the Claims

In Column 34, Line 45, in Claim 1, after "assemblies", insert --,--

In Column 35, Line 26, in Claim 4, after "comprising", insert --:--